US012748239B1

(12) United States Patent
Lucey

(10) Patent No.: US 12,748,239 B1
(45) Date of Patent: *Sep. 29, 2026

(54) SYSTEMS AND METHODS FOR PREDICTION OF DECREASE IN SEA SURFACE TEMPERATURE

(71) Applicant: John Lucey, Novato, CA (US)

(72) Inventor: John Lucey, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/323,431

(22) Filed: Sep. 9, 2025

Related U.S. Application Data

(63) Continuation of application No. 19/220,051, filed on May 27, 2025, now Pat. No. 12,468,067.

(51) Int. Cl.
*G01W 1/10* (2006.01)

(52) U.S. Cl.
CPC .................................... *G01W 1/10* (2013.01)

(58) Field of Classification Search
CPC ...................................................... G01W 1/10
See application file for complete search history.

(56) References Cited

U.S. PATENT DOCUMENTS

2020/0125471 A1* 4/2020 Garvey ................. G06F 18/217
2020/0348448 A1 11/2020 Tocornal et al.
2022/0343221 A1 10/2022 Cook

OTHER PUBLICATIONS

Huang et.al., Extended Reconstructed Sea Surface Temperature Version 4. Part 1: Upgrades and Intercomparisons, ERSST.v4, American Meteorological Society, Asheville, NC, USA, dated Feb. 1, 2015, pp. 911-930.
Livingston, Climate Variability According to Triple Saros Gravity Cycles, Cornell University, Ithaca, NY, USA, dated Mar. 2, 2013, pp. 1-6.

* cited by examiner

*Primary Examiner* — Yoshihisa Ishizuka
(74) *Attorney, Agent, or Firm* — FP; Sikander M. Khan

(57) ABSTRACT

Systems and methods for predicting decrease in average sea surface temperature (SST) are disclosed. The method includes setting a value of a Boolean flag to true when at least one of an eclipse season start date and an eclipse season end date in a particular calendar year occur in a first predefined number of days preceding a timestamp for a particular partition segmenting the particular calendar year. The method includes inputting to a trained machine learning model the value of the first Boolean flag. The method includes predicting, using the trained machine learning model, a probability of decrease in the average SST for a predefined time interval in particular calendar year. The method includes invoking a weather prediction system to predict occurrence of an extreme weather event in the predefined time interval and a climate prediction system to predict occurrence of an extreme climate event in the predefined time interval.

20 Claims, 28 Drawing Sheets

Schematic of an encoder-decode architecture

Schematic representation of calculation of self-attention showing one attention head Schematic of several attention heads in a Transformer block Schematic of one encoder layer of a Transformer network Vision Transformer (ViT)

905

910

Example software code that implements a Transformer block

```
batch_size = tf.shape(x)[0]
x = self.rescale(x)
patches = self.extract_patches(x)
x = self.patch_proj(patches)

class_emb = tf.broadcast_to(
    self.class_emb, [batch_size, 1, self.d_model]
)
x = tf.concat([class_emb, x], axis=1)
x = x + self.pos_emb

for layer in self.enc_layers:
    x = layer(x, training)

return  self.mlp_head(x[:, 0])
```

FIG. 11

Annual Changes in Moon's Orbit 2/3

Annual Changes in Moon's Orbit 3/3

Examples of Occurrences of Extreme Climate Events

| El Niño - 27 | | | | La Niña - 25 | | |
|---|---|---|---|---|---|---|
| Weak - 11 | Moderate - 7 | Strong - 6 | Very Strong - 3 | Weak - 12 | Moderate - 6 | Strong - 7 |
| 1952-53 | 1951-52 | 1957-58 | 1982-83 | 1954-55 | 1955-56 | 1973-74 |
| 1953-54 | 1963-64 | 1965-66 | 1997-98 | 1964-65 | 1970-71 | 1975-76 |
| 1958-59 | 1968-69 | 1972-73 | 2015-16 | 1971-72 | 1995-96 | 1988-89 |
| 1969-70 | 1986-87 | 1987-88 | | 1974-75 | 2011-12 | 1998-99 |
| 1976-77 | 1994-95 | 1991-92 | | 1983-84 | 2020-21 | 1999-00 |
| 1977-78 | 2002-03 | 2023-24 | | 1984-85 | 2021-22 | 2007-08 |
| 1979-80 | 2009-10 | | | 2000-01 | | 2010-11 |
| 2004-05 | | | | 2005-06 | | |
| 2006-07 | | | | 2008-09 | | |
| 2014-15 | | | | 2016-17 | | |
| 2018-19 | | | | 2017-18 | | |
| | | | | 2022-23 | | |

FIG. 15A

SYSTEMS AND METHODS FOR PREDICTION OF DECREASE IN SEA SURFACE TEMPERATURE

PRIORITY APPLICATION

This application is a continuation of U.S. Non-provisional patent application Ser. No. 19/220,051, entitled "MACHINE LEARNING-BASED PREDICTION OF DECREASE IN SEA SURFACE TEMPERATURE", filed on May 27, 2025.

BACKGROUND

Field

The technology disclosed relates to artificial intelligence type computers and digital data processing systems and corresponding data processing methods and products for emulation of intelligence (i.e., knowledge-based systems, reasoning systems, and knowledge acquisition systems); and includes systems for reasoning with uncertainty (e.g., fuzzy logic systems), adaptive systems, machine learning systems, and artificial neural networks. In particular, the technology disclosed relates to machine learning-based prediction of fluctuations in sea surface temperatures and machine learning-based prediction of extreme climate events.

Description of Related Art

Weather forecasts are used by most people on a daily basis to plan their activities. While many weather forecasting systems provide relatively reliable forecasts for short time horizons such as a day, a week or up to two weeks, it is very difficult to reliably predict climate events such as hurricanes, droughts, floods, that can occur farther away in the future. Existing weather forecasting or weather prediction systems are not designed to predict climate related activities or climate events farther out in the future such as after six months, one year, two years, etc. Predicting such climate events can be very valuable for saving lives, crops, etc.

It is desirable to provide a system that can reliably predict changes in climate activity or that can predict extreme climate events. The outputs from such a system can then be used to improve the reliability of weather forecasts for time periods even farther out in the future.

BRIEF DESCRIPTION OF THE DRAWINGS

FIG. 11 shows example software code that implements a Transformer block.

FIG. 15A presents examples of occurrences of extreme climate events classified in various categories.

DETAILED DESCRIPTION

Figure 1:
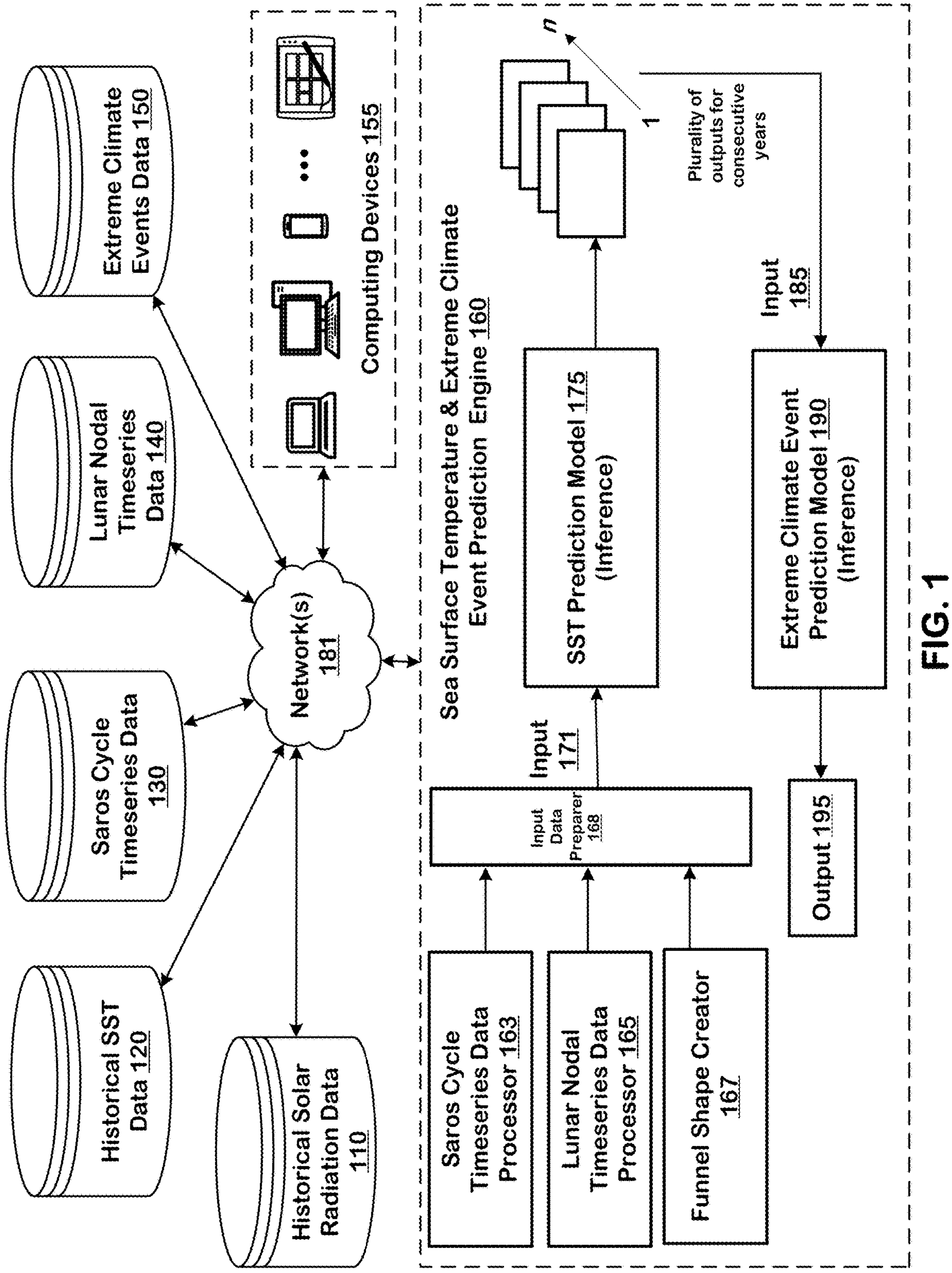
FIG. 1 illustrates an example architectural-level schematic of a system that uses a trained machine learning model to predict fluctuations in sea surface temperatures and predicts probability of occurrences of extreme climate events.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

The disclosed technology provides machine learning-based predictions of sea surface temperature fluctuations and extreme climate events. Beyond sea surface temperatures, the technology is applicable to a range of different climate and atmospheric variables. Modeling a broad range of variables is essential for improving the accuracy and reliability of climate predictions. It can uncover hidden correlations and provide deeper insight into the complex interactions within the climate system, including processes across both the lower and upper atmosphere.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

INTRODUCTION

The disclosed technology leverages machine learning to forecast sea-surface temperature variability and extreme climate events by analyzing historical climate data alongside lunar orbital parameters. It can be integrated into many existing weather and climate forecasting systems to improve accuracy, reliability, and extend forecast horizons, shifting weather predictions from the typical 3-7-day (three to seven days) window into the sub-seasonal range (two to six weeks) and expanding climate forecasts from 2-3 (two to three) months out to 2-3 (two to three) years or more.

Accurate short-term weather and long-term climate forecasts affect a wide range of economic sectors. Meteorological services translate atmospheric observations and model outputs into actionable guidance, enabling industries to optimize operations, manage risk, and protect life and property.

Agriculture and forestry operations depend heavily on forecasts of precipitation, temperature, and wind. In agriculture, these forecasts guide planting schedules, irrigation planning, pest and disease management, and harvest timing. In forestry, they inform controlled-burn decisions, pest-control measures, and timber transport logistics, where wind speed and humidity profiles critically influence fire behavior and logging safety.

Renewable generators such as wind farms, solar arrays and hydroelectric plants rely on forecasts to predict output and balance grid supply. Fossil-fuel plants adjust fuel procurement and dispatch schedules based on temperature-driven demand (for example, heat waves driving up air-conditioning load). Utilities also plan maintenance and manage transmission loads in advance of storms that could damage lines or cause outages.

Transportation and logistics depend on accurate weather forecasts across all modes. Aviation uses wind, visibility, icing and thunderstorm forecasts to optimize flight routing, fuel planning and safety procedures. Maritime shipping adjusts routes to avoid storms and improve fuel efficiency, while port authorities schedule loading and unloading around tidal and wave forecasts. Surface transportation agencies deploy de-icing crews, issue travel advisories and plan road maintenance based on forecasts of snow, ice or heavy rain.

Construction and infrastructure projects rely on weather forecasts to schedule outdoor activities such as concrete pours, crane operations and earthworks, around expected precipitation and wind conditions. Major undertakings, such as bridges and highways, incorporate seasonal weather trends into long-term planning to reduce delays and cost overruns.

Property and casualty underwriters use forecast data to assess imminent loss exposures from hail, flooding or high-wind events. Weather derivatives are financial contracts linked to temperature or precipitation indices, which enable energy companies, agribusinesses and other firms to hedge against adverse weather variability.

Tourism, recreation and sports depend on forecast accuracy to safeguard visitors, maximize attendance and protect revenues. Ski resorts adjust snow-making and lift operations based on temperature and snowfall. Outdoor event planners schedule concerts, marathons and festivals around expected weather. Coastal resorts monitor marine forecasts to ensure safe water-based activities.

Emergency management agencies and non-governmental organizations (NGOs) depend on forecast products, such as severe-weather outlooks, hurricane tracks and flood projections to plan evacuations, pre-position relief assets and issue community alerts. Fire management agencies use forecasts of wind, humidity and fuel moisture to anticipate wildfire spread and allocate firefighting resources.

Supply chains and retailers adjust inventories of seasonal items such as heating oil, snow shovels and air conditioners, based on anticipated weather patterns. Logistics providers sequence shipments to minimize weather-related delays, while perishable-goods supply chains (produce, dairy) maintain cold-chain integrity using temperature and humidity forecasts.

Emergency response operations depend on National Weather Service (NWS) watches, warnings and advisories for severe weather, tornadoes, hurricanes, flash floods and heat waves, to inform Federal Emergency Management Agency (FEMA) and state and local emergency protocols. Coastal evacuation orders, National Guard flood-response activations and pre-positioning of relief supplies rely on NWS's probabilistic track and intensity forecasts for tropical cyclones, as well as quantitative precipitation forecasts for inland flooding.

ENSO shapes global rainfall patterns, monsoon intensity, and seasonal temperature anomalies. A predictable drop in spring reduces lead time for drought or flood preparedness in vulnerable regions, and the resulting errors cascade through downstream forecasts, impacting the Indian monsoon, North American summer thunderstorms, and even Atlantic hurricane-season outlooks.

By extending the ENSO forecast lead time by one month, climate-sensitive sectors gain a longer planning horizon. Improved forecast accuracy produces earlier warnings and advisories, which in turn allow more time for operational adjustments, ultimately reducing losses and optimizing resource use.

Each additional month of reliable ENSO forecasting enables agencies, such as agricultural extension services and water authorities to issue advisories, distribute bulletins, and hold training well before critical planting or reservoir-management periods. In turn, farmers can choose crop varieties matched to anticipated conditions (drought-tolerant versus moisture-demanding), adjust planting dates, pre-position seed and fertilizer supplies, and optimize irrigation schedules. This extended lead time not only strengthens water-resource planning but also enhances resilience to climate extremes, yielding substantial socioeconomic gains.

Reservoir operators adjust releases and storage to buffer against droughts or floods, optimizing hydropower output and municipal water supplies. Emergency managers pre-position personnel and resources, conduct community outreach, and execute contingency plans, such as relocating livestock or reinforcing levees. Utilities hedge fuel procurement (e.g., natural gas contracts and planned hydro releases) using seasonal temperature forecasts, which stabilizes energy prices and reduces dependence on expensive peaking plants. Agricultural traders and distributors similarly secure alternative suppliers or build inventory buffers to offset anticipated regional yield shortfalls.

Scientists can quantify the economic and societal benefits of extending forecasts by just one month. Research shows that each extra month of reliable ENSO prediction reduces crop-failure risk by 5-15%, depending on region and crop type. For a major cereal producer, this reduction equates to tens of millions of dollars in avoided losses each season.

Optimized water-revenue trade-offs including hydropower reservoirs managed with seasonal inflow forecasts can increase generation efficiency by up to 10%, yielding millions in additional revenue while maintaining flood protection.

Reduced disaster relief costs by pre-emptive evacuations and infrastructure fortification reduce emergency response expenditures and loss of life; for hurricanes influenced by ENSO, one extra month's warning can lower relief spending by an estimated 20%.

Risk reduction from shrinking the SPB and extending ENSO lead time directly lowers vulnerability to floods, droughts, and heat extremes, particularly in regions with tight seasonal agricultural calendars or constrained water infrastructure.

Extended planning horizons boost adaptive capacity by allowing communities and utilities to confidently invest in long-term resilience measures, such as drought-resistant crop varieties, expanded reservoirs, and reinforced levees.

By smoothing supply-chain disruptions and reducing climate-driven energy-market volatility, economic stability helps societies sustain growth and protect livelihoods-even as climate change raises baseline risks.

Policies and investments are improved by reliable seasonal forecasts which underlie water-allocation agreements, insurance premium setting (weather derivatives), and climate adaptation funding; each extra month of certainty sharpens cost-benefit analyses and mobilizes capital more effectively.

Extending the reliable ENSO forecast horizon by one month enables earlier advisories, more effective resource management, and timely pre-emptive investments. These improvements reduce economic losses, strengthen food and water security, and bolster resilience to climate extremes.

Integrating this technology into existing weather and climate forecasting systems significantly enhances ENSO forecast skill, improves prediction accuracy and reliability, and extends the horizon over which forecasts remain trustworthy.

Weather impacts the lives of billions of people across the globe. It not only impacts the day-to-day lives of people, but it also has great influence on plants and animals. Extreme weather events such as floods, droughts, snowstorms, hurricanes, wildfires etc. can destroy crops, disrupt human lives and thus can have a huge impact on local and global economies. Even minor increase or decrease in temperatures can change the amount of rains in a geographical region, affect flow of water in rivers, change the rate at which glaciers melt, etc. Due to the massive impact of weather conditions on our daily lives, numerous systems have been developed to predict the weather. Typically, weather prediction systems use a large number of inputs, such as up to hundreds of data points or more to predict temperature, probability of rains, snowfall, etc. The weather prediction systems can also predict to some extent, extreme weather events such as hurricanes, rainstorms, hailstorms and snowstorms, etc.

Existing weather prediction systems have many deficiencies. These systems have limited visibility into future weather conditions. For example, existing weather prediction systems may be able to predict weather conditions in the near future such as the next day, next week, or up to next two weeks. As we go farther into the future, the reliability of predictions from existing weather prediction systems decreases. These systems have limited visibility into the future and any predictions beyond one or two months in future are very unreliable.

Another limitation of existing weather prediction systems is related to the amount of computing power required to make predictions. Existing weather prediction systems often rely on a large number of input data points and require immense computing power to process such data. Therefore, most of these systems are developed, maintained and operated by government agencies, universities and/or other large research institutions. Examples of such entities include National Oceanic and Atmospheric Administration (NOAA), National Aeronautics and Space Administration (NASA), National Weather Service (NWS), National Center for Atmospheric Research (NCAR), Ball State University's Cardinal Weather Service (CWS), etc. Many such entities generate weather predictions using supercomputers with large computing, memory and storage resources. Some of these entities also share data with each other. These systems require huge set up and operational costs.

The limitations of the existing weather prediction systems highlight the need for design and development of a light-weight weather prediction systems that can not only provide reliable weather predictions for a longer time horizon but also require fewer computing resources to generate such weather predictions. There is a large amount of historical weather data publicly available including average temperatures at various locations around the globe, extreme weather events, etc. However, selection of high value data that have the most impact on weather conditions and/or occurrence of extreme climate events, is important for design and development of a reliable system to predict sea surface temperatures and extreme climate events system. The outputs from such a system can be used to predict weather patterns farther in future with higher reliability.

Weather and climate are both parts of the Earth's atmosphere, but they differ mainly in how long they last. Weather refers to short-term conditions like temperature, humidity, rain, and wind, happening over hours or days in a specific place. Climate, on the other hand, is the average pattern of weather in a region over a long period-usually decades or more. It gives us a big picture of what kind of weather to expect over time, while weather tells us what's happening right now.

Weather forecasts give short-term predictions about what the weather will be like, based on current conditions in the atmosphere. They use computer models called Numerical Weather Prediction (NWP) models, which start with the current state of the atmosphere and calculate how it will change over time. These models depend on detailed, real-time data and are very sensitive to small changes in the starting conditions. Weather forecasts usually focus on specific areas and cover time periods from a few hours up to several days.

Unlike weather forecasts, climate predictions focus on long-term patterns and trends rather than short-term events. Instead of telling us what the weather will be like tomorrow, they estimate how the climate might change over decades or centuries. These predictions come from complex computer models called General Circulation Models (GCMs) or Earth System Models (ESMs), which simulate how the atmosphere, oceans, land, and ice, interact over time. These models include the effects of things like greenhouse gas emissions, changes in the Sun's energy, and shifts in land use. Rather than giving exact outcomes, climate models provide probabilities of different long-term climate outcomes.

Teleconnections are climate patterns where changes in one part of the world can affect the weather in distant regions. This happens through large-scale processes in the atmosphere and oceans. For example, during an El Niño event, unusually warm ocean temperatures in the tropical Pacific can change wind and pressure patterns. These changes can shift the jet stream, which may lead to extreme weather like heatwaves, droughts, or heavy rain, in places as far away as the United States. Studying teleconnections helps scientists better understand how different parts of the climate system are connected and improves long-term weather and climate predictions.

Teleconnections describe how climate anomalies in one region affect weather and circulation worldwide. For example, strong El Niño events in the equatorial Pacific drive enhanced deep convection and cloud cover that modify large scale atmospheric circulation, increasing vertical wind shear over the tropical Atlantic and thereby suppressing hurricane development, reducing both storm frequency and intensity. In contrast, La Niña's weaker Pacific convection leads to reduced Atlantic wind shear and a moister troposphere, creating conditions that favor more frequent and intense hurricanes.

Climate forcings are external factors that change the balance of energy in the Earth's climate system. These can be natural, like changes in the Sun's energy or particles from volcanic eruptions, or human-caused, like greenhouse gas emissions and pollution from industry. Unlike climate feedbacks, which are reactions within the climate system itself, climate forcings come from outside the system and act as the main drivers of change. They usually result from physical processes related to radiation, space, or the atmosphere.

The troposphere, the lowest layer of the atmosphere near Earth's surface where most weather phenomena occur, is typically analyzed for variables such as temperature, humidity, precipitation, solar radiation, wind speed, and wind direction.

The stratosphere, which lies above the troposphere, features key atmospheric dynamics that influence global climate. The Brewer-Dobson circulation is a large-scale pattern that transports chemical species and aerosols, including ozone, throughout the stratosphere. Another important phenomenon is the Quasi-Biennial Oscillation, characterized by alternating easterly and westerly winds in the tropical lower stratosphere.

The ionosphere is a layer of the atmosphere located above the stratosphere that behaves differently because it contains charged particles. One key feature is the Equatorial Ionization Anomaly (EIA), which appears as two bands of high electron density about 15 degrees north and south of the magnetic equator, with a lower-density area in between. This pattern is created by the interaction of electric fields, winds, and the movement of charged particles (plasma) in the upper atmosphere.

Earth's magnetic field is a large, protective force generated deep in the planet's outer core. It stretches far beyond the atmosphere into space and helps shield the Earth from harmful solar radiation and the solar wind. However, disturbances from space, known as space weather, can still affect satellites and power systems on Earth. One important pattern, called the Russell-McPherron effect, explains why geomagnetic activity and northern lights (auroras) are often stronger around the spring and fall equinoxes. During these times, Earth's magnetic field lines line up in a way that allows more solar particles to enter the space around Earth, increasing geomagnetic activity.

The Equatorial Pacific region referred to as "Nino 3.4 region" is one of the most extensively studied geographical areas on the Earth due to the occurrence of El Niño and La Niña weather patterns in this region. During neutral conditions in the Pacific Ocean, trade winds blow west along the equator, taking warm water from South America towards Asia. To replace that warm water, cold water rises from the depths, this process is known as upwelling. El Niño and La Niña are two opposing climate patterns that break these normal conditions. Scientists call these phenomena the El Niño-Southern Oscillation (ENSO) cycle or ENSO events. El Niño and La Niña can both have global impacts on weather, wildfires, rainfall, ecosystems, and economies. El Niño and La Niña events are the warm and cool phases of a natural climate pattern across the Niño 3.4 region. The pattern shifts back and forth irregularly every two to seven years bringing predictable changes in ocean temperatures and causing higher than normal rainfall and/or drought conditions in other geographical regions such as the tropics and some parts of the United States and Canada.

During El Niño warm water is pushed back east, toward the west coast of the Americas. El Niño can affect global weather significantly. The warmer waters cause the Pacific jet stream to move south of its neutral position. With this shift, areas in the northern United States and Canada are dryer and warmer than usual. But in the U.S. Gulf Coast and Southeast, these periods are wetter than usual and have increased flooding.

La Niña has the opposite effect of El Niño. During La Niña events, trade winds are even stronger than usual, pushing more warm water toward Asia. Off the west coast of the Americas, upwelling increases, bringing cold water to the surface. These cold waters in the Pacific push the jet stream northward. This tends to lead to drought in the southern U.S. and heavy rains and flooding in the Pacific Northwest and Canada. During a La Niña year, winter temperatures are warmer than normal in the South and cooler than normal in the North. La Niña can also lead to a more severe hurricane season.

Extreme El Niño events involve a pronounced eastward shift of tropical Pacific convection and precipitation. As sea surface temperatures (SSTs) rise in the Niño 3.4 region (5° N-5° S, 170° W-120° W), deep convection and high cloud cover become markedly enhanced. Satellite measurements from the 1997-98 El Niño and 2015-16 El Niño, indicate that cloud fractions over the central Pacific were well above climatology. These convective anomalies correspond to strongly negative outgoing longwave radiation (OLR) departures.

At the December 2015 peak of the 2015-16 El Niño, satellites observed outgoing longwave radiation (OLR) over the central Pacific that was markedly below the climatological mean-even lower than at the height of the 1997-98 event. This reflects the fact that the anomalously warm waters in the Niño 3.4 region were overlain by deep convective clouds, which effectively "capped" heat loss to space. Consistently, the NOAA OLR El Niño Index, defined as the mean OLR anomaly over 160° W-110° W and 5° S-5° N, shows its largest negative excursions during these strong events, confirming the intensification of tropical convection.

Figure 15B:
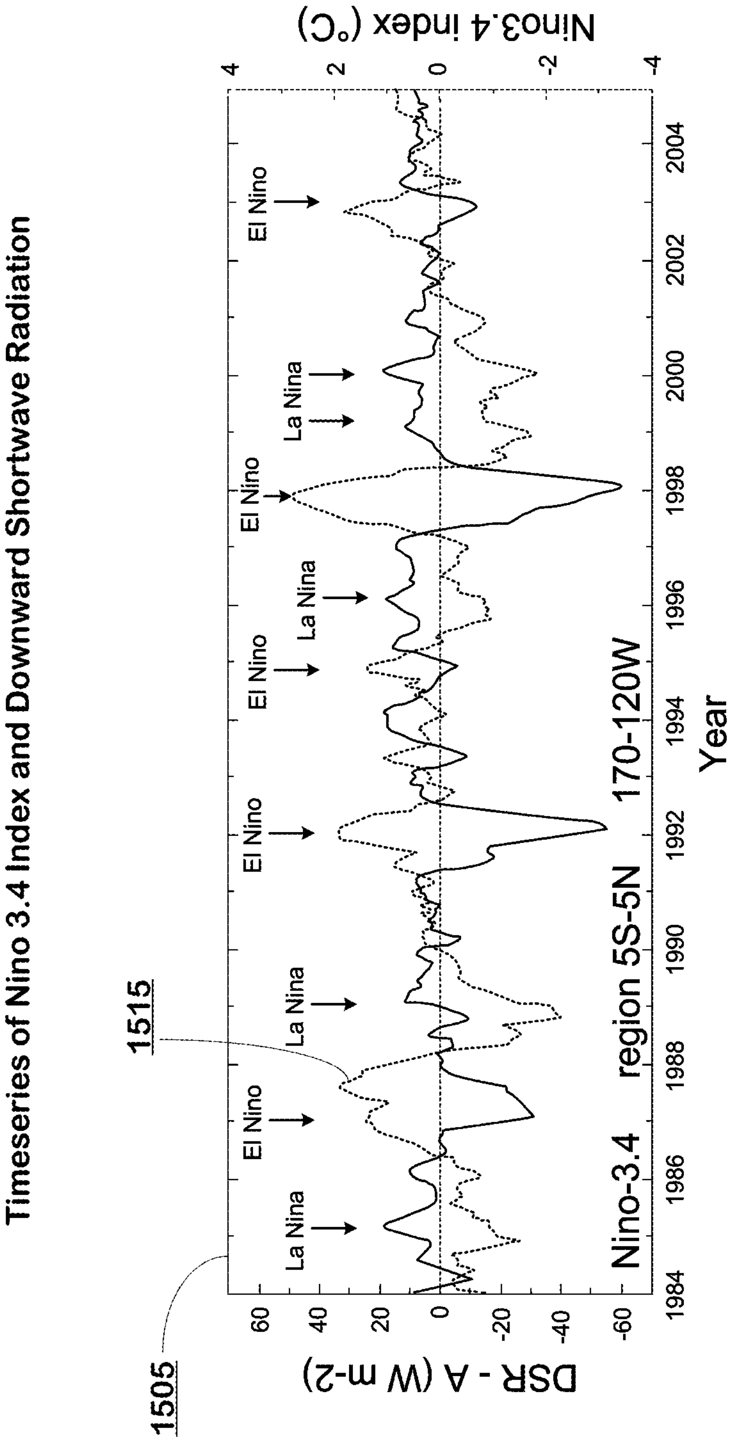
FIGS. 15B and 15C present graphical illustrations of annual solar heat radiation and occurrences of El Niño and La Niña events for a period of twenty years.
Figure 15C:
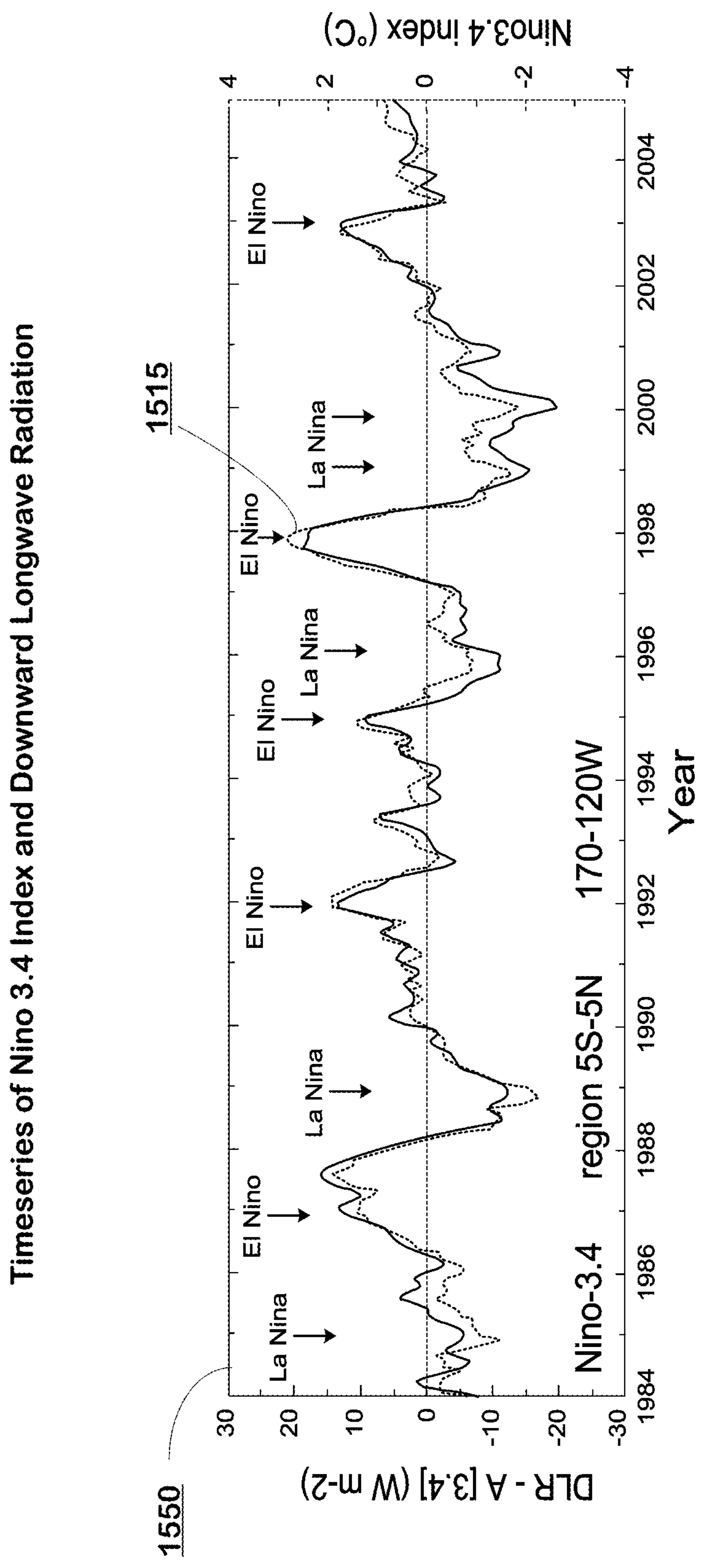

During El Niño, enhanced deep convection produces extensive high altitude anvil clouds that both raise albedo by reflecting incoming shortwave radiation and, via their cold, ice laden, infrared opaque tops, intercept outgoing longwave emission from the warm ocean and lower troposphere, whereas low level clouds in warmer air emit IR more efficiently, promoting heat loss to space. Acting as a "radiative cap" over the warm central Pacific, these anvils create an inverse relationship: satellite observations and reanalysis products show increased downward longwave flux at the sea surface, driven by a moister, cloud laden atmosphere, alongside reduced surface solar heating-characterized by low OLR and diminished insolation alongside enhanced atmospheric IR back radiation, as illustrated in FIGS. 15B and 15C.

In the Niño 3.4 region, expansive high altitude anvil clouds act like a greenhouse blanket. By suppressing outgoing longwave radiation, they slow the ocean's heat loss to space and retain energy within the ocean-atmosphere column. At the same time, the moister, cloud filled atmosphere boosts downward longwave flux at the surface, warming and stabilizing the lower troposphere and providing extra nocturnal surface heating. Under clear sky conditions, a warmer sea surface would radiate more infrared energy, a classic negative feedback. During strong El Niño events, however, this convective cloud shield interrupts that cooling: its longwave trapping behaves as a positive feedback, reinforcing the initial SST anomaly and producing a smaller net heat loss than would occur without the clouds.

Cloud radiative effects during strong El Niño involve a balance between shortwave cooling and longwave warming. An expansive cirrus canopy over the Niño 3.4 region reflects incoming solar radiation, reducing surface insolation, while simultaneously trapping outgoing infrared. Although these competing processes yield a nuanced net radiative change, enhanced deep convection generally decreases the efficiency of oceanic heat loss. By damping thermal emission more than they block solar input, high clouds prolong the warm SST anomaly. Thus, even if cloud feedbacks are not the initial trigger for El Niño, their longwave trapping and resulting reduction in radiative damping help amplify and sustain strong events.

During the 1997-98 El Niño, Niño 3.4 SSTs rose over 2.5° C. above average, triggering intense deep convection in the central and eastern Pacific. Satellite data show OLR anomalies below −20 W m 2 across that region, anomalously high cloud cover and rainfall, while the western Pacific near Indonesia experienced clear skies, drought, and positive OLR departures. Globally, OLR anomalies peaked at +5 to +8 W m 2, but this heat release occurred mainly outside Niño 3.4, where subsidence prevailed; above the warm pool, high altitude anvils maintained a radiative "lid," suppressing local OLR and allowing SSTs to stay elevated until subsurface heat was depleted. In the middle of the year 1998, strengthened trade winds and cooling anomalies finally pierced the cloud cap, ending the event. Model and observational analyses indicate that this longwave cloud feedback was instrumental in sustaining the extreme SST anomalies through the winter and enabling the event's record peak.

The 2015-16 El Niño attained Niño 3.4 SST anomalies near +2.3° C., on par with 1997-98, but its atmospheric response lagged early in the season: during the first half of 2015, sea surface warming outpaced deep convection and westerly wind anomalies, delaying the event's maturation. By December 2015, however, convection suddenly intensified. This late season surge in high cloud anvil cover strengthened the cloud-radiation feedback, more effectively capping OLR and reinforcing the SST anomaly.

Analysts characterized this as a pronounced "blocking" of outgoing longwave radiation over the Niño 3.4 region, a clear demonstration of the radiative cap at work. NOAA satellite imagery for December 2015 reveals strong OLR deficits centered on the Pacific convective core. Concurrently, the Equatorial Southern Oscillation Index and other atmospheric metrics reached unprecedented values, underscoring the atmosphere's vigorous response once deep convection fully developed.

The 2015-16 El Niño persisted through the winter of 2015-16 with substantial climatic impacts. Although OLR anomalies were strongly negative, reflecting enhanced convection, they did not quite reach the record minima of the 1997-98 event, confirming that 1997-98 remains the benchmark for convective intensity.

Both the 1997-98 and 2015-16 episodes demonstrate that deep convection and OLR suppression are fundamental to extreme El Niño dynamics. Radiative trapping by high clouds amplified peak SST anomalies, while the subsequent release of stored heat, via enhanced longwave emission and oceanic heat transport, helped drive the rapid transition into the following La Niña.

A warm SST anomaly in the central-eastern Pacific must exceed a threshold to initiate deep convection outside its climatological region. If the anomaly is weak, convection remains confined to the western basin, as in aborted El Niño episodes, so reduced cloud cover permits greater OLR loss and curtails further warming. Thus, a marginal SST anomaly may never engage the convective-radiative feedback necessary for full El Niño development. Once convection shifts eastward and suppresses OLR, the enhanced radiative trapping strengthens the ocean-atmosphere coupling and sustains the SST anomaly, thereby prolonging the event's peak.

The ENSO "pattern effect" arises because convective warming is concentrated beneath high-cloud regions, slowing the climate system's radiative response and allowing stronger ocean-atmosphere coupling. Ocean heat content builds during El Niño growth and is then released, but much of that radiative discharge to space lags behind the SST peak, sometimes occurring only as the event decays. This delayed heat loss constitutes a positive feedback during the mature phase, since the ocean can continue warming the atmosphere without immediately shedding energy to space.

Extreme El Niño events, such as 1997-98 and 2015-16, are marked by exceptionally intense convection and high cloud cover in the central and eastern Pacific. Under these conditions, the usual negative feedbacks (radiative cooling, enhanced evaporation) are weakened, allowing SST anomalies to grow to larger amplitudes and persist through the peak boreal winter season. Once this convective threshold is crossed, however, the system accumulates vast heat that must eventually be released. The resulting surge of longwave radiation to space, and the consequent transition to La Niña, completes the Pacific recharge-discharge cycle.

Enhanced deep convection over the Niño 3.4 region during El Niño produces extensive high-level cloud cover that suppresses outgoing longwave radiation (OLR), effectively creating a radiative "cap" that reduces ocean heat loss and reinforces ocean-atmosphere coupling. Satellite measurements of OLR, top-of-atmosphere fluxes, and cloud cover, together with model analyses, confirm that this high-cloud lid traps infrared emissions, amplifying and sustaining sea surface temperature anomalies. These cloud-radiation interactions critically modulate El Niño's amplitude and duration, and case studies of the 1997-98 and 2015-16 events demonstrate that El Niño reaches its peak intensity when this cloud radiative feedback is fully engaged.

The Spring Predictability Barrier (SPB), the period from roughly May through July, marks a sharp decline in ENSO forecast skill. Models initialized just before or during this window typically incur much larger errors in both the timing and magnitude of the ensuing El Niño or La Niña event. As a result, the effective lead time for reliable predictions shrinks from about nine (9) to twelve (12) months to just three (3) to four (4) months when forecasts are launched within the SPB. Because skill does not recover until the barrier subsides (around June), any forecasts made before or during spring are generally viewed as unreliable. Yet, given ENSO's profound influence on rainfall patterns, drought frequency, wildfire risk and tropical cyclone activity, there is a strong incentive to push the prediction horizon well beyond the seasonal scale. A forecasting or predicting system is therefore desired that would anticipate ENSO events one year, or even several years in advance. In practice, however, current weather and ENSO models typically yield dependable guidance only up to a few weeks, or at best one month, before the event's onset.

The technology disclosed provides a system that can predict an increase in sea surface temperatures, decrease in sea surface temperature and predict probability of occurrence of ENSO events for any time period in the future. This is because the technology disclosed uses various characteristics of the lunar orbit as input to multiple machine learning models that are trained to predict fluctuations in sea surface temperature (SST) and predict probability of occurrence of ENSO events (also referred to as extreme climate events). ENSO events (such as fluctuations in SST and occurrences of extreme climate events) can be used to reliably predict weather-related events such as rainfall, drought, hurricanes, etc. Reliably predicting ENSO events in turn increases the reliability of weather forecasts. The output from the technology disclosed herein, can be provided to weather forecasting systems to improve the reliability of weather forecasts and enable these systems to predict weather conditions farther in the future with higher reliability.

The lunar orbit characteristics can be defined with respect to two repeating patterns that describe the orbits of the Moon, Earth and Sun system with respect to one another. A first repeating pattern is referred to as a lunar nodal cycle (also referred to as nodal precession cycle) and a second repeating pattern is referred to as a Saros cycle.

The Moon's orbit is tilted about 5 degrees relative to Earth's orbit around the Sun. An imaginary plane containing Earth's orbit around the Sun is referred to as the ecliptic plane. The points where the Moon's orbital plane around Earth intersects the ecliptic plane are called the "nodes." The two nodes are referred to as the "ascending node" and "descending node". The "ascending node" is the point in the Moon's orbit where the Moon crosses the ecliptic plane moving from south to north, while the "descending node" is the opposite point where it crosses the same plane moving from north to south. As the Moon orbits, its nodes slowly shift, completing a full cycle in about 18.6 years. This is known as the lunar nodal cycle or a nodal precession cycle. As the Moon's tilted orbit rotates, the lunar nodes slowly shift and eventually line up with the points where the ecliptic plane intersects the Earth's equator, known as the equinoxes. This alignment of the lunar nodes and the equinoxes happens twice during the 18.6-year cycle, about every 9.3 years.

The tilt of the Moon's orbit relative to Earth's path around the Sun (the ecliptic) stays nearly constant at about 5 degrees. However, the angle between the Moon's orbit and Earth's equator, known as lunar declination, changes over time throughout the 18.6-year cycle. During a major lunar standstill, the Moon's declination reaches its maximum range. About 9.3 years later, during a minor standstill, its declination range is at a minimum, meaning the Moon's orbital plane is more closely aligned with Earth's equatorial plane.

The Saros cycle lasts about 18 years and 11 days. It is the period required for the Earth, Moon, and Sun to almost realign in the same way, producing nearly identical solar and lunar eclipses. This recurring alignment enables precise predictions of future eclipses.

The lunar orbit characteristics comprise a plurality of different characteristics related to the position of the Moon with respect to the position of Earth and the Sun. For example, lunar orbit characteristics identify a position of the Moon in space and time with respect to the position of the Earth at occurrences of a plurality of solar eclipses and a plurality of lunar eclipses in respective plurality of eclipse seasons. An eclipse season occurs twice a year and is about thirty-five (35) days in duration. The eclipse season comprises at least one lunar eclipse and at least one solar eclipse. In some instances, more than one solar and/or lunar eclipse can occur in one eclipse season.

The technology disclosed includes logic to identify a plurality of other lunar orbit characteristics from the Saros cycle for input to machine learning models to predict increase in sea surface temperature and decrease in sea surface temperature and to predict probability of occurrence of extreme climate events. For example, the occurrences of the eclipse seasons with respect to the March and September equinoxes and June and December solstices are used as one of the inputs to a trained machine learning model.

The lunar orbit characteristics also include identification of the Moon's phase as a New Moon or a Full Moon. The lunar orbit characteristics include distance of the Moon from the Earth. The lunar orbit characteristics include distance of the Moon from lunar perigee. The lunar perigee is a point in the lunar orbit where the Moon is positioned nearest to the Earth. The lunar orbit characteristics include distance of the Moon from lunar apogee. The lunar apogee is a point in the lunar orbit where the Moon is positioned farthest to the Earth.

The technology disclosed includes logic to identify a plurality of other lunar orbit characteristics from the lunar nodal cycle for input to machine learning models to predict increase in sea surface temperature and decrease in sea surface temperature and to predict probability of occurrence of extreme climate events. For example, an "ecliptic longitude of the ascending node," measured from the vernal equinox (also referred to as spring equinox or March equinox) to the ascending node along the ecliptic plane. The other lunar orbit characteristics identified from the lunar nodal cycle include a "longitude of perigee" describing the orientation of the Moon's major axis relative to a fixed reference direction (typically the vernal equinox), and an "argument of perigee," as the angle from the ascending node to the perigee within the orbital plane.

The technology disclosed uses a plurality of lunar orbit characteristics to generate at least two overlapping sinusoidal waves that are out of phase with each other by a hundred and eighty degrees (180 degrees). The sinusoidal waves are generated using a plurality of lunar orbit characteristics identifying a position of the Moon in space and time with respect to the position of the Earth at occurrences of a plurality of solar eclipses and a plurality of lunar eclipses in respective plurality of eclipse seasons. Each of these two sinusoidal waves repeats at least every 6.2 years in the 18.6 years lunar nodal cycle. The first sinusoidal wave starts at a peak position corresponding lunar apogee, troughing at 3.1 years from the start date at a trough position corresponding to lunar perigee and ends at 3.1 years from the date corresponding to the trough position at a peak position corresponding to the lunar apogee. The second sinusoidal wave starts at a trough position corresponding lunar perigee, peaking at 3.1 years from the start date at a peak position corresponding to lunar apogee and ending at 3.1 years from the date corresponding to the peak position at a trough position corresponding to the lunar perigee. The first sinusoidal wave and the second sinusoidal wave, intersect each other, at a first intersection, at 1.55 years from the start of the first sinusoidal wave and the start of the second sinusoidal wave. The intersection of the first sinusoidal wave and the second sinusoidal wave is repeated every 3.55 years from the first intersection of the first sinusoidal wave and the second sinusoidal wave.

The technology disclosed includes logic to identify values of so-called funnel shape indicators for pre-defined time intervals using the formation the two overlapping sinusoidal waves that are out of phase by 180 degrees. The classification value of the funnel shape indicator can be set as "open" or "close" for a given pre-defined time interval, and an additional weighted value can also be assigned to the funnel shape indicator based on its alignment and timing relative to the equinoxes and solstice The value of the funnel shape indicator is provided as input to a machine learning model, along with one or more other lunar orbit characteristics to predict a probability of occurrence of an extreme climate event during a pre-define time interval in future.

The value of the funnel shape indicator is set as an opened-shaped funnel (or simply as "open") when the starting date of the predefined time interval is after a date corresponding to a particular intersection of the two sinusoidal waves and the starting date of the predefined time interval is before a date corresponding to the peak or the trough of the first and/or the second sinusoidal wave following the particular intersection of the two sinusoidal waves.

The value of the funnel shape indicator is set as a closed-shaped funnel (or simply as "close") when the starting date of the predefined time interval is before a particular intersection of the two sinusoidal waves and the starting date of the predefined time interval is after a date corresponding to the peak or the trough of the first and/or the second sinusoidal wave preceding the particular intersection of the two sinusoidal waves.

A weighted value can be assigned to the funnel shape indicator based on its alignment and timing relative to the equinoxes and solstice. For example, if an open funnel shape precedes an eclipse season that coincides with equinox (or occurs within a predefined time duration of the equinox), the funnel shape indicator can have a higher weighting.

The technology disclosed includes logic to use lunar nodal cycle time series data, Saros cycle time series data, historical sea surface temperature data, historical sea level data, historical solar radiation data and historical extreme climate events time series data to extract lunar orbit characteristics, eclipse data and other features to train a machine learning model to predict increase in sea surface temperatures, decrease in sea surface temperatures or to predict a probability of occurrence of an extreme climate event. Note that changes in sea level (or sea surface level) can be considered as a consequence of (or proxy for) changes in sea surface temperature (or SST). For example, when the sea surface temperature increases, the warm water expands thus increasing the sea level or sea surface level. Similarly, when the sea surface temperature decreases, the water becomes cold and reduces in volume leading to a decrease in the sea level or sea surface level.

In one implementation, the technology disclosed uses Principal components analysis (PCA) for dimensionality reduction. PCA can detect correlation between variables. This technique can find directions of maximum variance in high-dimensional data and project it onto a smaller dimension subspace while retaining most of the information. The output from PCA is provided as input to classifiers. The classifiers can provide an output e.g., a probability value indicating the likelihood that the sea surface temperatures will increase, a probability value indicating the likelihood that the sea surface temperatures will decrease and a probability value indicating the likelihood that an extreme climate event will occur in a predefined time interval. The predefined time interval in the future can range from one minute, one hour, twelve hours, one day, two days, three days up to one week, one month, one year or more. The machine learning model can be used to produce the above outputs for multiple time intervals in future, e.g., for multiple months in a year or for multiple years in the future.

In another implementation, the technology disclosed provides separate trained machine learning models for predicting fluctuations across a range of climate variables and for prediction of probability of occurrence of extreme climate events. In this implementation, a plurality of outputs from a first machine learning model that predicts fluctuations across a range of climate variables for a predefined time interval are provided as input to the second machine learning model. The second machine learning model outputs a probability of occurrence of an extreme climate event during a predefined time interval in future.

A range of climate variables can be substituted for sea surface temperatures, including air temperature, humidity, precipitation, wind speed and direction, solar radiation, sea level, downward shortwave radiation (DSR), downward longwave radiation (DLR), and outgoing longwave radiation (OLR). A broad range of climate variables can be applied to the disclosed technology, depending on the desired model output and the specific climate phenomena being analyzed.

In another implementation, the technology disclosed provides separate trained machine learning models for predicting fluctuations in sea surface temperature and for prediction of probability of occurrence of extreme climate events. In this implementation, a plurality of outputs from a first machine learning model that predicts fluctuations in sea surface temperatures for a predefined time interval are provided as input to the second machine learning model. The second machine learning model outputs a probability of occurrence of an extreme climate event during a predefined time interval in future. Examples of classifiers that can be applied include random forest, K-nearest neighbors (KNN), multinomial logistic regression, analog forecasting, support vector machines (SVM), gradient boosted trees, random forest, Naïve Bayes, etc. An example implementation using gradient boosted trees (XGBoost) is provided for illustration.

System Overview

A system and various implementations of the technology to predict fluctuations in sea surface temperature and to predict extreme climate events is described with reference to FIGS. 1-19.

FIG. 1 illustrates an example architectural-level schematic of a system that uses a trained machine learning model to predict increase in sea surface temperatures and decrease in sea surface temperatures. The system further includes another trained machine learning model to predict occurrences of extreme climate events. Because FIG. 1 is an architectural diagram, certain details are omitted to improve the clarity of the description. The discussion of FIG. 1 is organized as follows. First, the elements of the system are described, followed by their interconnections. Then, the use of the elements in the system is described in greater detail.

Weather impacts the lives of billions of people on a daily basis. Current weather prediction systems have numerous limitations and are unable to provide reliable weather predictions farther in future than a few weeks. FIG. 1 presents a system that can be used to predict fluctuations in sea surface temperatures and occurrences of extreme climate events during any time period in future.

This paragraph names labeled parts of the system presented in FIG. 1. The system includes a sea surface temperature and extreme climate event prediction engine 160 (also referred to as a prediction engine 160). The prediction engine 160 is connected via network(s) 181 to a plurality of databases. A historical solar radiation database 110, a historical sea surface temperature (SST) database 120, a Saros cycle time series database 130, a lunar nodal time series database 140, an extreme climate events database 150 are connected to the prediction engine 160 via the network(s) 181. A plurality of computing devices 155 are in communication with the prediction engine 160 via the network(s) 181. The prediction engine 160 comprises a plurality of data processors (also referred to as data processing engines) to process the data from various database for input to the machine learning models. A Saros cycle time series data processor 163, a lunar nodal time series data processor 165, a funnel shape creator 167 comprises the logic to process the time series data from various databases listed above. An input data preparer 168 comprises the logic to process the time series data from the data processors 163, 165 and 167 to prepare an input data (171) for the sea surface temperature (SST) prediction model 175. A plurality of outputs (178) from the SST prediction model are provided as input (185) to an extreme climate event prediction model 190 to output (195) a probability of occurrence of an extreme climate event. In one implementation, the technology disclosed uses one machine learning model to predict occurrence of an extreme climate event instead of two machine learning models arranged sequentially as shown in FIG. 1. Further details of the various databases in FIG. 1 and components of the prediction engine 160 are presented below.

The El Niño Southern Oscillation (ENSO) is a natural climate fluctuation and involves interaction between tropical Pacific Ocean and overlying atmosphere. The impact of ENSO events are, however, global. The warm phase of ENSO (i.e., El Niño) is associated with unusual surface water warming of the equatorial Pacific while the cold phase of ENSO (i.e., La Niña) is the counterpart of El Niño characterized by the opposite effects. Earth's climate system comprises radiative energy balance between the solar shortwave radiation (SW) absorbed by the atmosphere and the surface of the Earth and the thermal longwave radiation (LW) emitted by the Earth to space. The ENSO events are expected to be associated with the variability of the radiative energy balance over the equatorial Pacific Ocean. The technology disclosed accesses historical solar radiation data stored in the historical solar radiation database 110 and includes logic to use that data for prediction of fluctuations in sea surface temperatures and for prediction of occurrences of extreme climate events. Further details of the solar radiation data are provided with reference to FIGS. 6A and 6B.

The historical sea surface temperature (SST) database 120 stores time series data illustrating fluctuations in the sea surface temperatures. The historical SST database 120 also stores a time series data illustrating Oceanic Niño Index (also referred to as ONI). The ONI measures sea surface temperature anomalies in the central equatorial Pacific within the Niño 3.4 region. The Niño 3.4 region is defined as the area in the central equatorial Pacific between 5°N and 5°S latitude and 120° W to 170° W longitude. The ONI is calculated as the three-month running mean of temperature deviations relative to a long-term (typically 30-year) baseline. The ONI helps identify and monitor El Niño events, which are marked by warmer-than-average conditions, and La Niña events, marked by cooler-than-average conditions. National Oceanic and Atmospheric Administration (or NOAA) considers El Niño conditions to be present when the Oceanic Niño Index is +0.5 or higher, indicating the east-central tropical Pacific is significantly warmer than usual. La Niña conditions exist when the Oceanic Niño Index is −0.5 or lower, indicating the region is cooler than usual. Further information is available at <<origin.cpc.ncep.noaa.gov/products/analysis_monitoring/ensostuff/ONI_v5.php>> and <<climate.gov/news-features/understanding-climate/climate-variability-oceanic-nino-index>>. The technology disclosed can use historical time series SST data such as the ONI data for training the machine learning models for predicting increase in SST, decrease in SST and to predict probability of occurrence of extreme climate events for any time period in future. In addition, sea level data can be substituted and used as a proxy for SST data. Further details of the machine learning models are presented below with reference to FIGS. 8A and 8B.

Saros cycle time series data is stored in the Saros cycle time series database 130. A Saros cycle is a period of approximately 18 years, 11 days and 8 hours after which similar solar and lunar eclipses repeat. After one cycle, the geometry of the Earth, Moon, and Sun is nearly identical, leading to similar eclipse conditions. This cycle is important for predicting eclipses and understanding the periodic nature of celestial events. The slight discrepancy in the cycle's length (the additional 8 hours) means that each subsequent eclipse in a Saros series occurs approximately one-third of the way around the Earth from the previous one. Further details of the Saros cycle and eclipse seasons are presented below with reference to FIGS. 12A, 12B, 12C, 13A and 13B.

Lunar nodal time series data is stored in the lunar nodal time series database 140. The lunar nodal cycle is 18.6 years in duration and is also referred to as nutation period. The lunar nodal cycle represents the time it takes for the ascending and descending nodes of the Moon's orbit to complete one full rotation around the ecliptic plane. This cycle influences several lunar phenomena defining lunar orbit characteristics, presented below.

Precession of the lunar nodes: The points where the Moon's orbit crosses the ecliptic plane (the lunar nodes) slowly rotate westward along the ecliptic, completing one full cycle every 18.6 years. This precession affects the timing and frequency of solar and lunar eclipses.

Lunar standstills: The lunar nodal cycle causes variations in the Moon's declination range, resulting in major and minor lunar standstills. During a major standstill, the Moon's maximum declination reaches about ±28.6 degrees, causing it to rise higher and set lower in the sky than usual. During a minor standstill, the maximum declination is about ±18.3 degrees.

Nutation in Earth's axis: The gravitational interaction between the Earth and the Moon causes a small oscillation, or nutation, in the tilt of the Earth's axis. This nutation has a period of 18.6 years and slightly affects Earth's climate and tidal patterns.

While the Saros cycle and the lunar nodal cycle have similar lengths, they are fundamentally different in their causes and effects. The Saros cycle is more directly tied to the periodicity of eclipses due to the interplay of multiple lunar orbital periods, while the Lunar nodal cycle is related to the regression of the Moon's nodes and its impact on the Moon's declination and tidal influences. Understanding these distinctions is essential for appreciating their respective roles in lunar and terrestrial phenomena.

Some important properties of Saros cycle are presented below:

Duration of Saros cycle: Approximately 18 years, 11 days, and 8 hours.

Mechanism: The Saros cycle results from the combination of three lunar orbital periods, presented below:

- Synodic month: The period of 29.53 days for the Moon to return to the same phase (new moon to a following new moon).
- Draconic month: The period of 27.21 days for the Moon to return to the same node (the points where the Moon's orbit crosses the ecliptic plane).
- Anomalistic month: The period of 27.55 days for the Moon to return to perigee (the closest point to Earth in its orbit).

Significance of Saros cycle: This cycle is crucial for predicting solar and lunar eclipses. After one Saros cycle, the Earth, Moon, and Sun return to approximately the same relative geometry, making similar eclipses occur.

Some important properties of lunar nodal cycle are presented below:

Duration of lunar nodal cycle: Approximately 18.6 years.

Mechanism: The lunar nodal cycle is driven by the precession of the lunar nodes.

Precession of the nodes: The nodes (points where the Moon's orbit intersects the ecliptic plane) regress westward along the ecliptic at a rate of about 19.4 degrees per year, completing a full 360-degree cycle in about 18.6 years.

Significance of lunar nodal cycle: This cycle influences the declination of the Moon and the timing of lunar standstills (major and minor). It affects tidal patterns and certain long-term climate oscillations due to changes in the Moon's gravitational influence on Earth.

Similarities between Saros cycle and lunar nodal cycle are presented below:

Similar Duration: Both cycles are close in length, around 18 to 19 years, which might lead to the perception that they are related or have similar effects.

Influence on Eclipses: Both cycles have roles in the occurrence and prediction of eclipses, although through different mechanisms.

Differences between Saros cycle and lunar nodal cycle are presented below:

A First difference is with respect to orbital elements as described below:

The Saros cycle combines the synodic, draconic, and anomalistic months, directly influencing eclipse cycles.

The lunar nodal cycle is specifically about the precession of the lunar nodes and does not directly involve the synodic or anomalistic months.

A second difference is with respect to phenomena governed as described below:

The Saros cycle is primarily concerned with the periodicity and prediction of eclipses.

The lunar nodal cycle affects the Moon's declination range and the long-term tidal effects on Earth.

A third difference is with respect to underlying mechanisms as described below:

The Saros cycle is a result of the alignment of the Moon's orbit with the Sun and Earth, combining different orbital periods.

The lunar nodal cycle arises from the gravitational perturbations causing the regression of the lunar nodes.

In the following paragraphs we describe alignment of lunar nodes during equinoxes.

Lunar nodal cycle and standstills are described below:

The lunar nodal cycle is an approximately 18.6-year period during which the Moon's orbital nodes, the points where its orbit crosses the ecliptic plane, complete a full 360° (360 degree) regression. This cycle influences the geometry of solar and lunar eclipses.

Major Standstill: A Major Standstill occurs when the Moon's orbit reaches its maximum tilt relative to the Earth's equator, resulting in the greatest range of lunar declinations. This event happens roughly every 18.6 years as part of the lunar nodal cycle.

Minor Standstill: A minor standstill is the point in the lunar nodal cycle when the Moon's maximum declination is at its minimum. This means that during a minor standstill, the Moon does not travel as far north or south relative to the celestial equator as it does during a major standstill. The lunar nodal cycle lasts about 18.6 years, and major and minor standstills alternate approximately every 9.3 years.

Eclipse season and standstill synchronization are described below:

Approximately every 9.3 years, the regression of the lunar nodes causes them to align with the equinoxes. When this alignment happens, an eclipse season coincides with the period when the Moon's declination reaches its extreme values (either major or minor standstill).

During this period, eclipses are more likely to occur near the equinoxes, enhancing the orbital and gravitational effects of the standstills.

Combined effects of Saros cycle and lunar nodal cycle and their periodic synchronization are described below:

The Saros cycle, lunar nodal cycle and anomalistic month interact in a way that periodically brings eclipse seasons, major or minor standstills and perigee or apogee into approximate alignment. The near-synchronization effect leads to observable periodic patterns.

A plurality of lunar orbit characteristics are presented below that are used by the technology disclosed to train the machine learning model for predicting increase in average sea surface temperatures and to train the machine learning model for predicting decrease in average sea surface temperatures. The technology disclosed also uses these lunar orbit characteristics to train the machine learning model for predicting probability of occurrence of extreme climate events. The following lunar orbit characteristics are also referred to as lunar configurations.

A spatiotemporal lunar orbit characteristic (or lunar configuration) identifies multiple factors that describe the Moon's orbit within the Earth-Moon-Sun system, which also includes other planets in the solar system. This dynamic system is characterized by the spatial and temporal interactions, as well as the orbital and gravitational forces, among all its components. Over time, these interactions cause orbital perturbations, leading to changes in the spatial arrangements of the planetary bodies as they continuously influence one another.

An orbital lunar orbit characteristic (or lunar configuration) identifies a series of phases of the Moon, a distance between the Moon and Earth for each phase of the Moon, a distance between the Moon and Earth in the Moon's elliptical orbit around Earth, occurrences of the Moon's elliptical orbit perigee and apogee, a position and orientation of the moon as it orbits around the Earth and Sun.

An ecliptic lunar orbit characteristic (or lunar configuration) identifies occurrences of eclipses relative to the Moon's orbit around Earth, an alignment of the Earth-Moon-Sun system, occurrences of eclipses relative to a distance between the Moon and Earth, occurrences of eclipses relative to the Moon's perigee and apogee, occurrences of eclipses relative to equinoxes and solstices, and a recurring ecliptic Saros Cycle of 6,585.321 days (18 years and 10 to 12 days).

A precession lunar orbit characteristic (or lunar configuration) identifies an orientation and location of lunar nodes relative to a vernal equinox, a precession of lunar nodes with a cycle of 18.6-years, an axial precession of the Moon with a cycle of 18.6-years, an apsidal precession of the Moon's elliptical orbit around Earth with a period of 8.85 years, a planetary precession of the Moon caused by the gravitational influence of other planets in the solar system, and changes in the Moon's obliquity (the tilt of its rotational axis relative to its orbital plane) resulting in lunar libration.

A planar lunar orbit characteristic (or lunar configuration) identifies a lunar declination and angular distance of the Moon north or south of the celestial equator that changes over time due to the tilt of the Moon's orbit relative to Earth's equator and follows an 18.6-year cycle, an angle of the Moon relative to Earth's equatorial plane, an angle of the Moon relative to an ecliptic and an ecliptic plane, an angle of the Moon relative to a magnetic equatorial plane of the Earth, an angle and orientation of a lunar orbital plane relative to an equatorial plane of the Earth, an angle and orientation of a lunar orbital plane relative to a magnetic equatorial plane of the Earth, an angle and orientation of an elliptical orbit within a lunar orbital plane and relative to an ecliptic plane, an angle and orientation of a plurality of planes including, an orbital plane of the Moon, an orbital plane of the Earth, an ecliptic plane, an equatorial plane of the Earth, and a magnetic equatorial plane of the Earth.

A standstill lunar orbit characteristic (or lunar configuration) identifies a series of lunar standstills, a monthly lunar standstill when the Moon reaches its maximum and minimum declinations within a single lunar month (a 27.3-day period known as the sidereal month), a major lunar standstill when the Moon's maximum declination reaches its greatest extremes, approximately +28.6° north and south of the celestial equator, occurring every 18.6 years due to the precession of the lunar nodes, which gradually changes the tilt of the Moon's orbital plane relative to the celestial equator and during which the tilt aligns to its maximum inclination relative to the celestial equator, and a minor lunar standstill when the Moon's maximum declination is at its minimum range, approximately ±18.3° north and south of the celestial equator, which occurs approximately 9.3 years after a major standstill, as part of the same 18.6-year precessional cycle of the lunar nodes, and during which the tilt of the Moon's orbital plane aligns more closely with the Earth's equator.

Referring back to FIG. 1, the extreme climate events database 150 stores time series data for various for various extreme climate events. One example of such time series is the El Niño and La Niña climate events. In one instance, the extreme climate events database 150 stores the intensities of the respective extreme climate events. In the case of El Niño and La Niña climate events the intensities of the respective events can be determined based on the Oceanic Niño Index (or ONI). The ONI values can be used to categorize El Niño and La Niña climate events in various categories. Examples of such categories are presented with reference to FIG. 15A.

The data processors 163, 165 and 167 are used to process the time series data from various databases and extract features for input to the machine learning models. Details of the logic implemented by data processors (also referred to as data processing engines) are presented with reference to FIGS. 12A, 12B, 12C, 13A, 13B, 14A and 14B. Training of the machine learning models using labeled training data is presented with reference to FIG. 18A. Training of an example machine learning model to predict increase and/or decrease in sea surface temperatures is presented with reference to FIG. 18B.

The outputs from the prediction engine 160, i.e., output 178 and output 195 can be sent via the network(s) 181 to the plurality of computing devices 155. Computing devices 155 can comprise desktop computers, laptop computers, mobile devices, tablets, etc. The technology disclosed includes logic to display the outputs in a graphical form with user interface elements that can be selected to invoke various actions. In one implementation, the output data is automatically sent to external systems to invoke various actions at the external systems. Examples of external systems include weather forecasting systems, city and local government systems, computing systems at emergency response organizations, computing systems at insurance companies, computing systems at agriculture departments, computing systems at freight management companies or shipping lines, etc. Further details are presented with reference to FIG. 16.

Completing the description of FIG. 1, the components of the system in FIG. 1, described above, are all coupled in communication with the network(s) 181. The actual communication path can be point-to-point over public and/or private networks. The communications can occur over a variety of networks, e.g., private networks, VPN, MPLS circuit, RFID, or Internet, and can use appropriate application programming interfaces (APIs) and data interchange formats, e.g., Representational State Transfer (REST), Electronic Data Interchange (EDI), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, satellite network, point-to-point network, star network, token ring network, hub network, Internet, inclusive of the mobile Internet, via protocols such as EDGE, 3G, 4G LTE, Wi-Fi and WiMAX. The engines, data processors or system components of FIG. 1 are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

In the following section, examples of inputs to the machine learning models for prediction of increase in sea surface temperatures, decrease in sea surface temperatures and for prediction of probability of occurrences of extreme climate events are presented.

The following discussion is presented to enable any person skilled in the art to make and use the technology disclosed and is provided in the context of a particular application, i.e., the sea surface temperature and extreme climate event prediction engine 160. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Some implementations of the technology disclosed relate to using a Transformer model to provide an AI system. In particular, the technology disclosed proposes an AI management system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLAMA versions, BERT, SpanBERT, ROBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the disclosed AI system (i.e., the prediction model 175) is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

In the following sections, examples of machine learning models 175 are presented with reference to FIGS. 2 to 11 that can be used to implement the sea surface temperature and extreme climate event prediction engine 160.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 2:
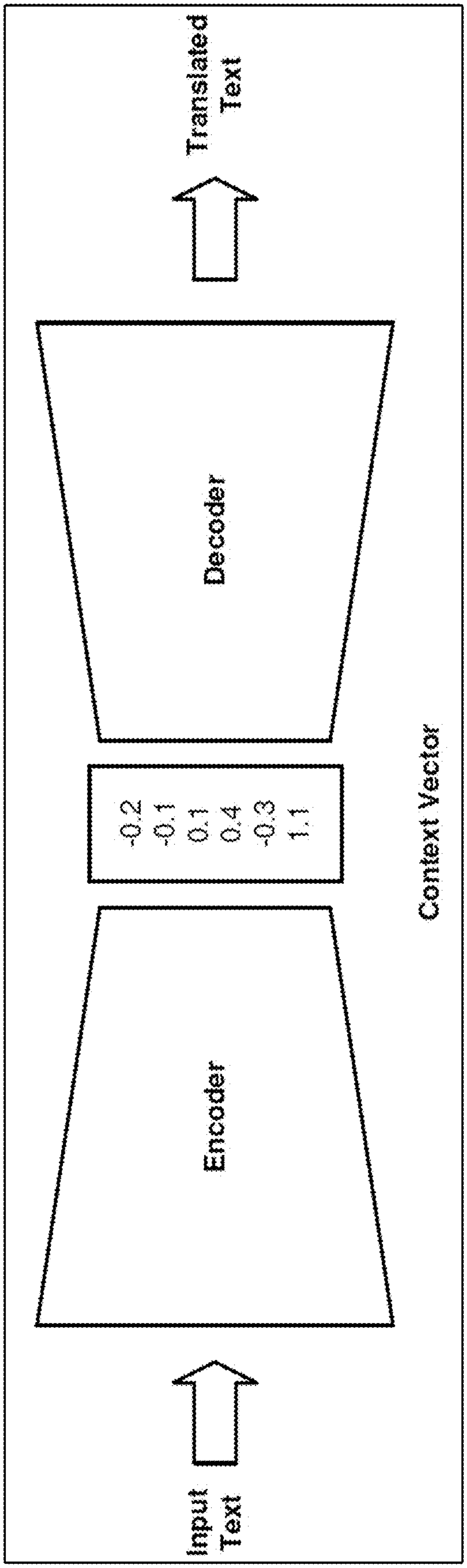
FIG. 2 is a schematic representation of an encoder-decoder architecture.

FIG. 2 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t−1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t−1, and the output generated at time step, t−1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 3:
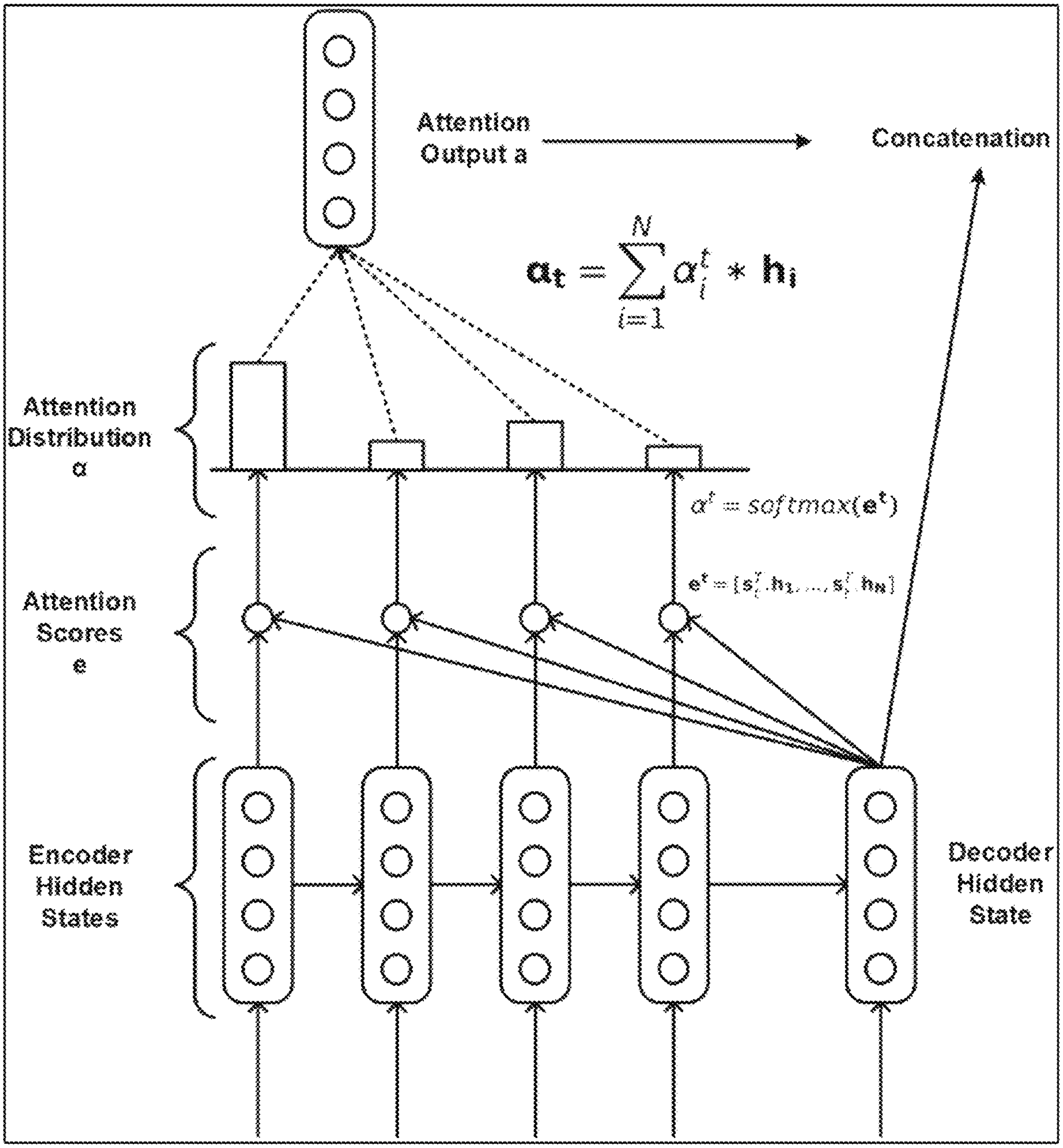
FIG. 3 shows an overview of an attention mechanism added onto an RNN encoder-decoder architecture.

Attention mechanisms distinguish Transformers from other machine learning models. The attention mechanism provides a solution for the vanishing gradient problem. FIG. 3 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 4:
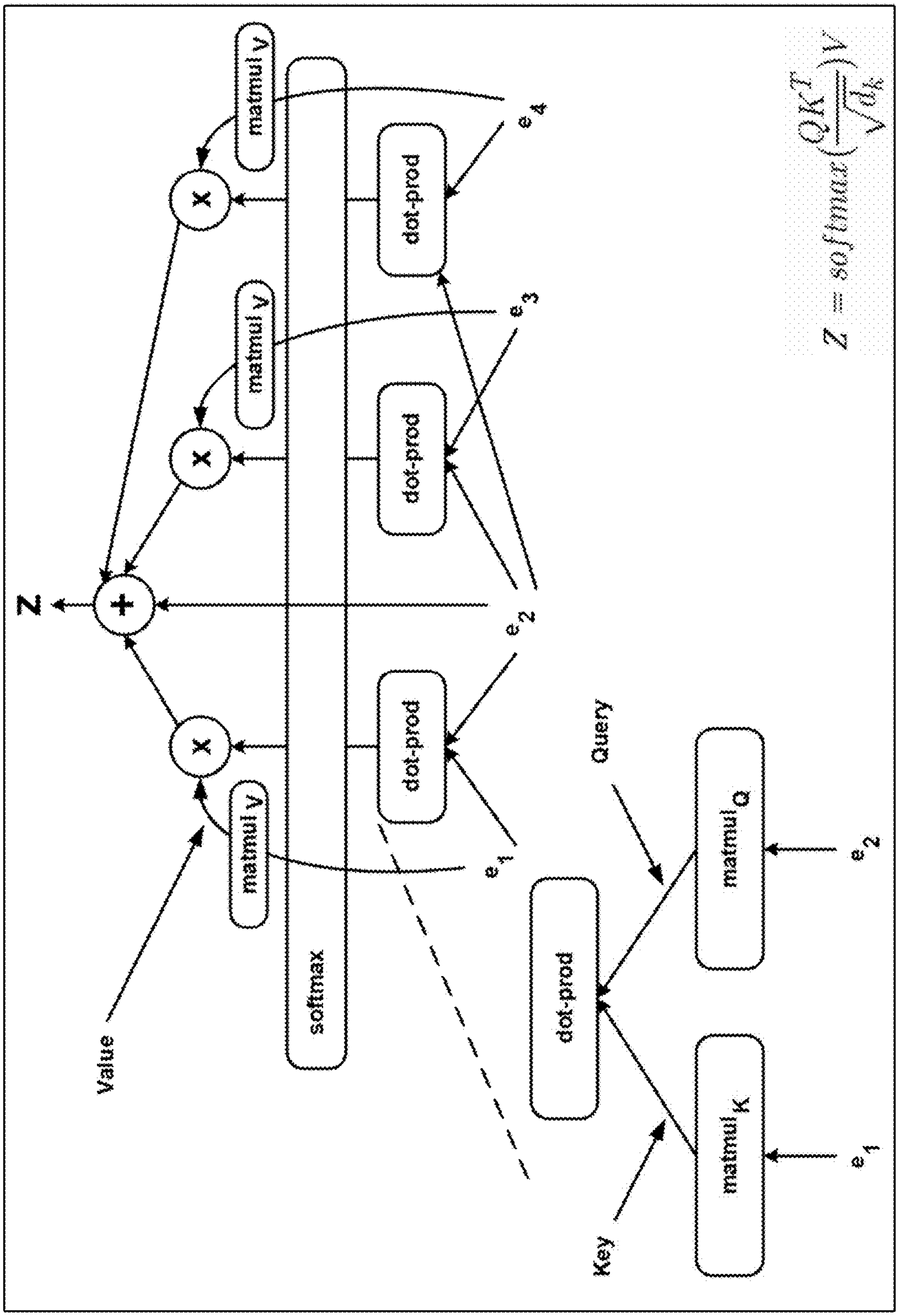
FIG. 4 is a schematic representation of the calculation of self-attention showing one attention head.

Multi-headed attention is executed in the Transformer. FIG. 4 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 5:
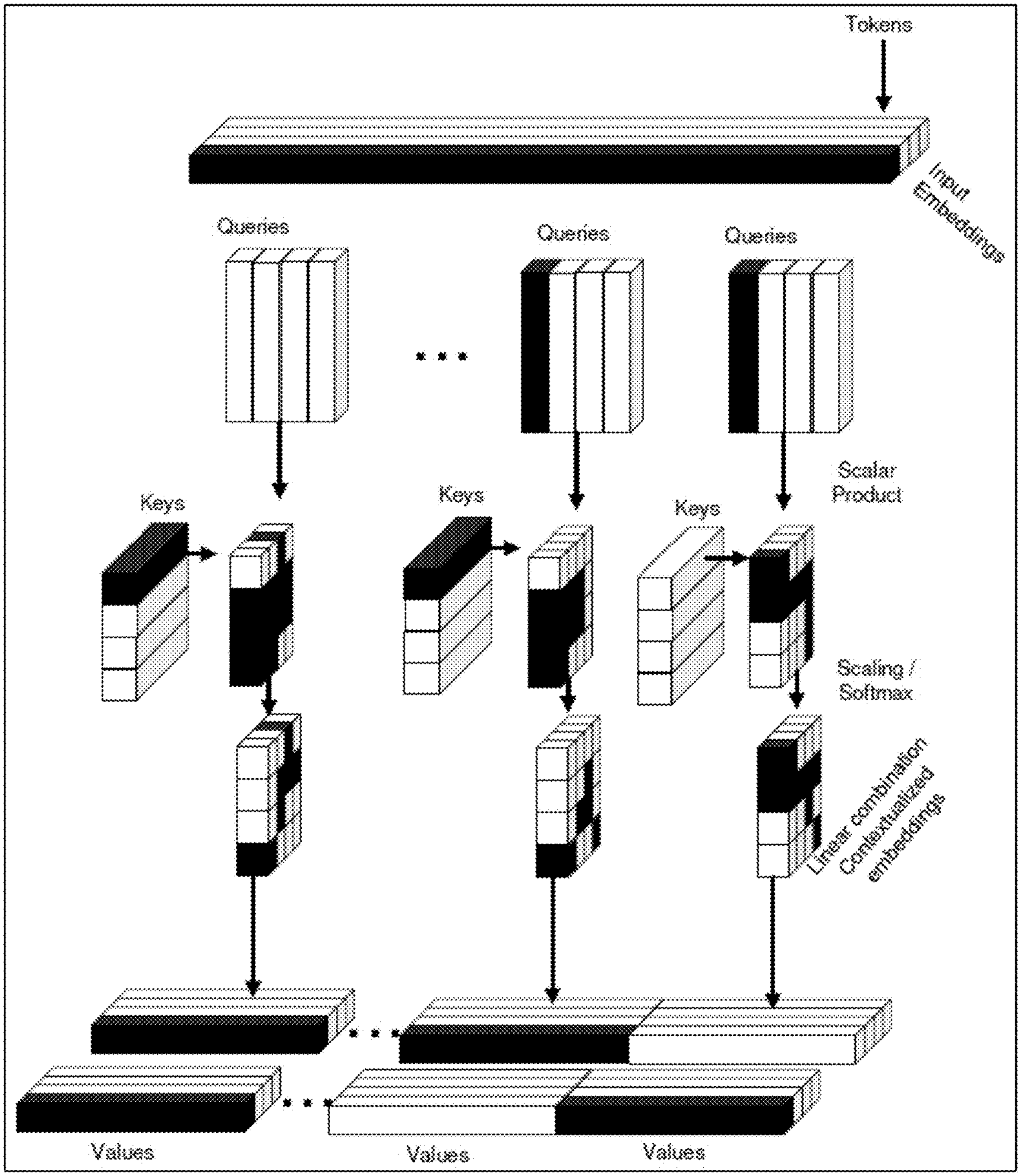
FIG. 5 is a depiction of several attention heads in a Transformer block.

FIG. 5 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

$$\text{Attention }(Q, K, V) = \text{SoftMax}\left(\frac{QK^T}{\sqrt{dk}}\right)V$$

where Q, K, V are computed as:

$X \cdot W_Q$, $X \cdot W_K$, $X \cdot W_V$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

MultiHeadAttention (Q, K, V)=[$\text{head}_1, \ldots, \text{head}_h$] $W_0$ where $$\text{head}_i = \text{Attention }\left(QW_i^Q, KW_i^K, VW_i^V\right)$$

The outputs of all heads are concatenated together and projected again using the learned weights matrix $W_0$ to match the dimensions expected by the next block of heads or the output of the Transformer. Using the multi-head attention instead of the simpler scaled dot-product attention enables Transformers to jointly attend to information from different representation subspaces at different positions.

Figure 6:
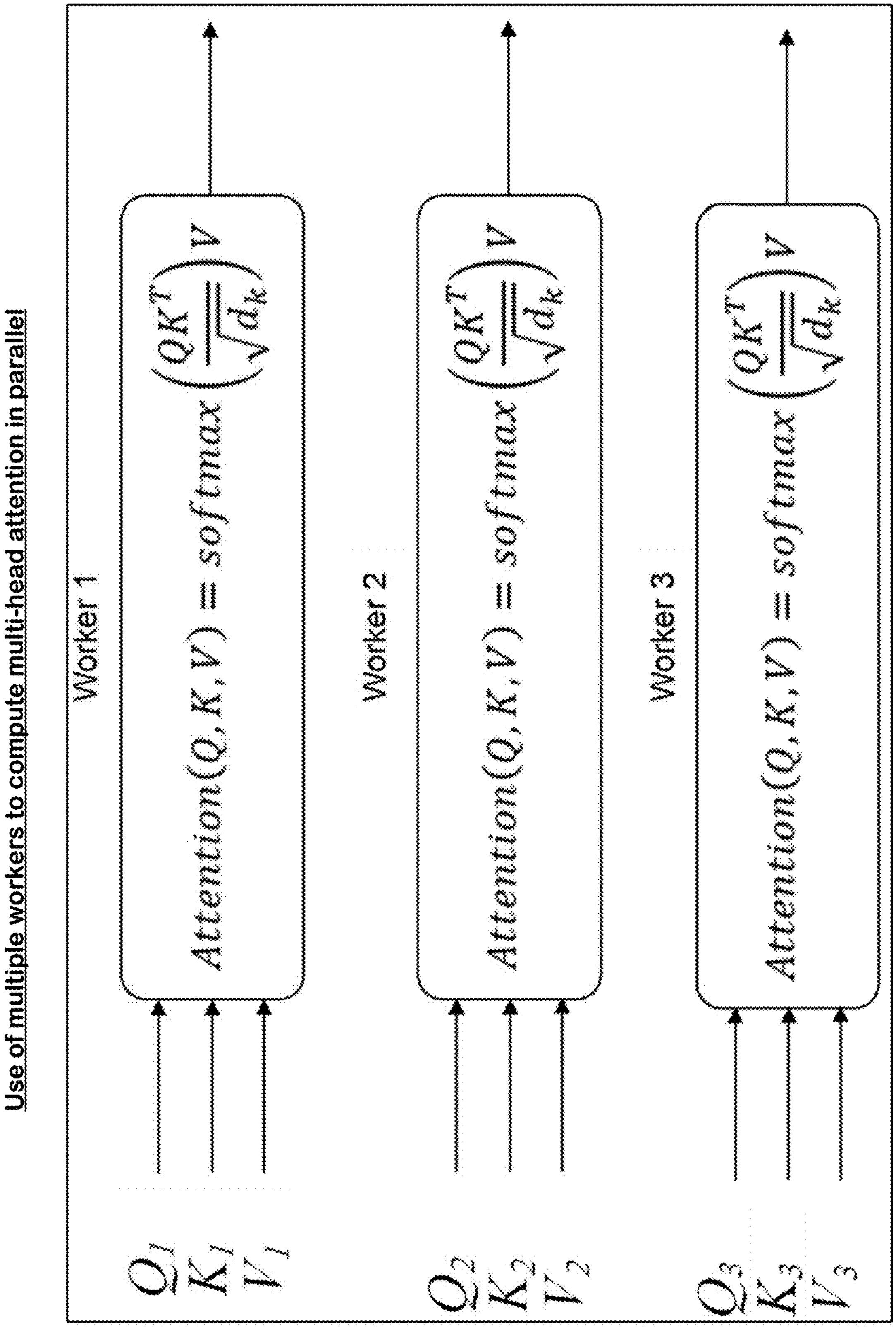
FIG. 6 is an illustration that shows how one can use multiple workers to compute the multi-head attention in parallel, as the respective heads compute their outputs independently of one another.

As shown in FIG. 6, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot W_Q, X \cdot W_K, X \cdot WV$$

The matrix X is of shape (n, d) where n is the number of patches and d is the hidden vector dimension. The weights $W_0$, $W_K$, $W_V$ are all of shape (d, d). Omitting the constant factor 3, the resulting complexity is:

$$n \cdot d^2$$

We can proceed to the $_{estimation}$ of the complexity of the attention function itself, i.e., of $$\text{SoftMax}\left(\frac{QK^T}{\sqrt{dk}}\right)V.$$

The matrices Q and K are both of shape (n, d). The transposition operation does not influence the asymptotic complexity of computing the dot product of matrices of shapes (n, d)·(d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product $$\text{SoftMax}\left(\frac{QK^T}{\sqrt{dk}}\right)\cdot V$$

is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d.$$

The asymptotic complexity of multi-head attention is the same since the original input matrix X is projected into h matrices of shape $$\left(n, \frac{d}{h}\right),$$

where n is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 7:
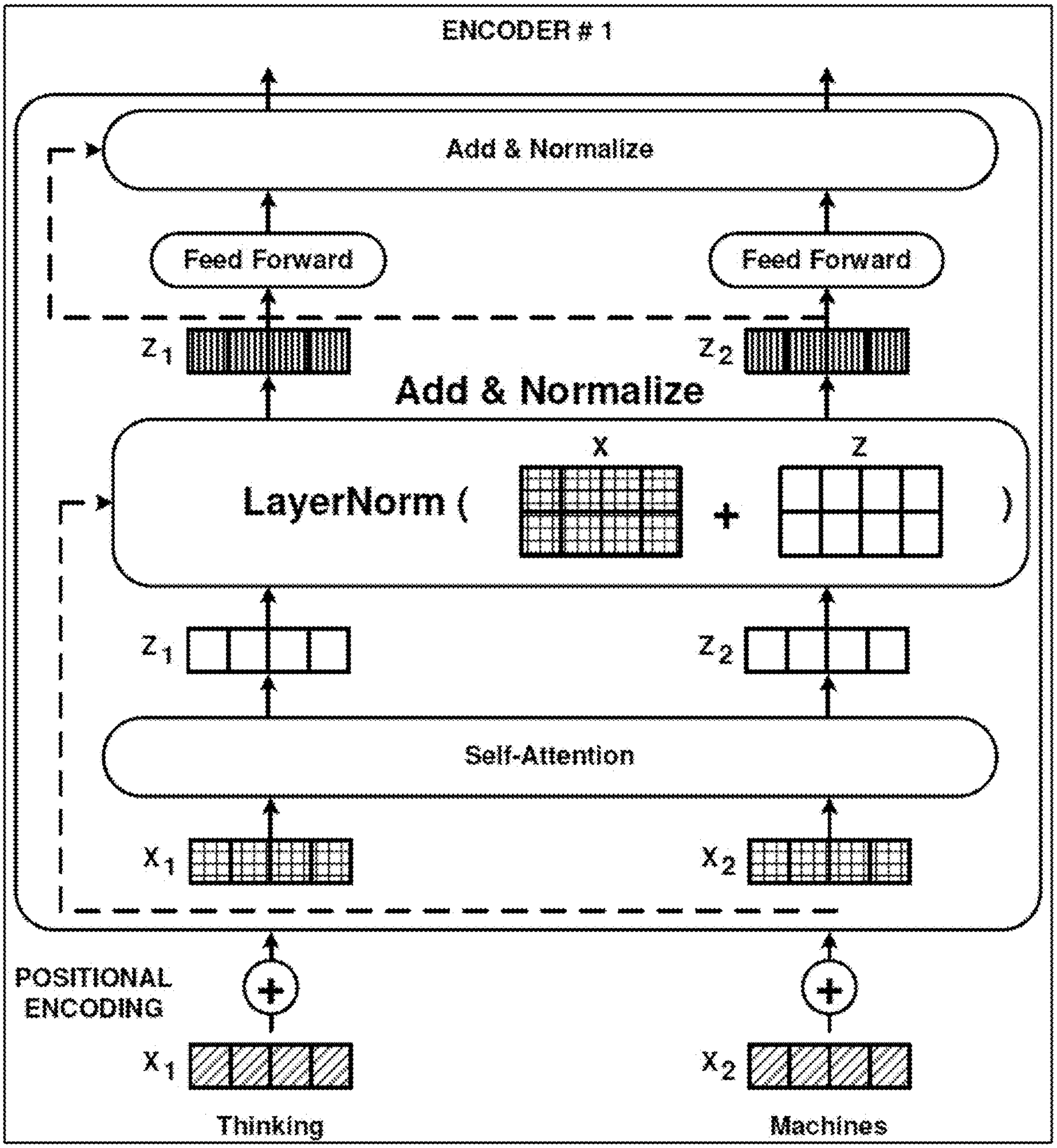
FIG. 7 is a portrayal of one encoder layer of a Transformer network.

FIG. 7 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 8:
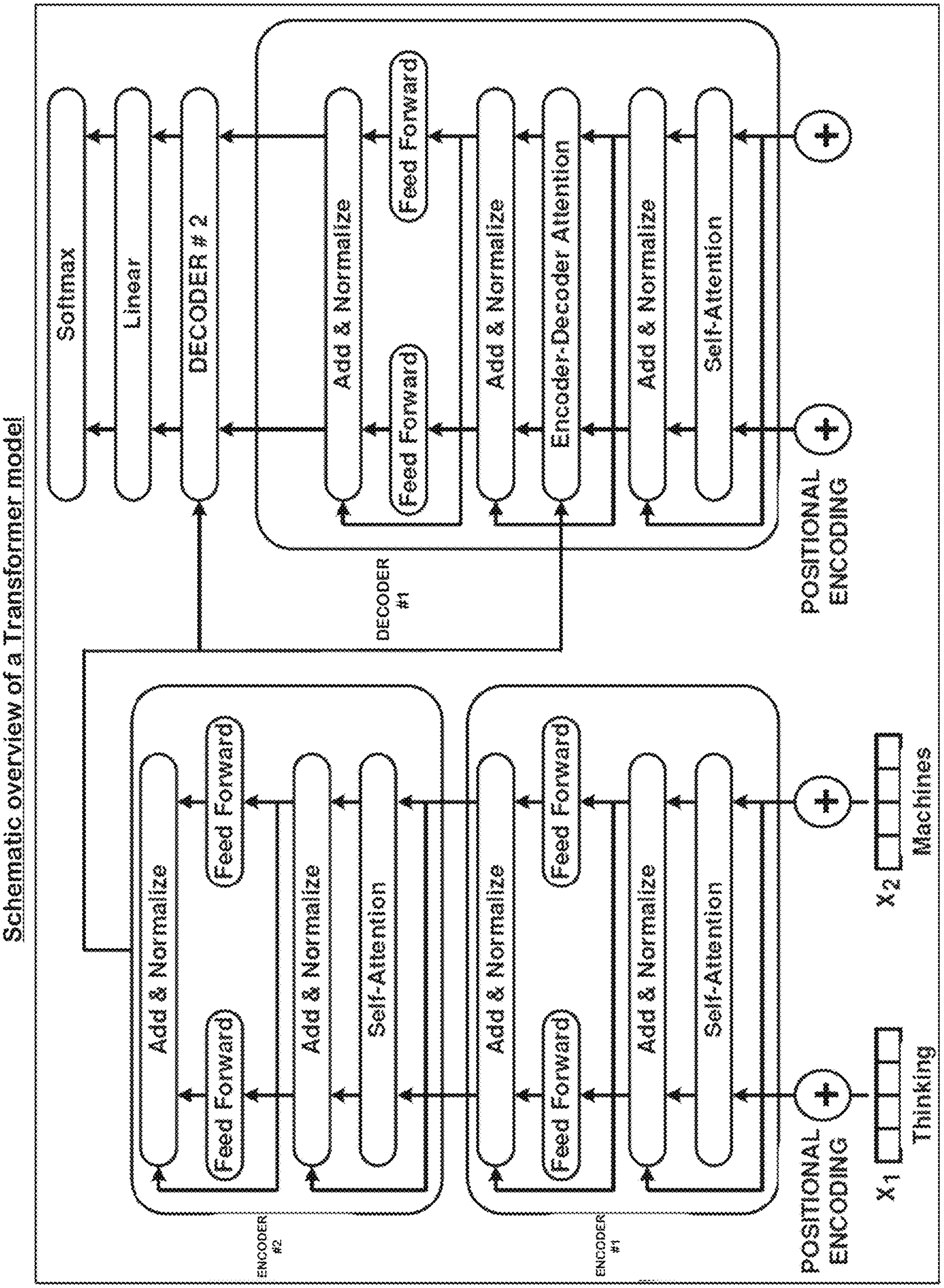
FIG. 8 shows a schematic overview of a Transformer model.

FIG. 8 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Figure 9:
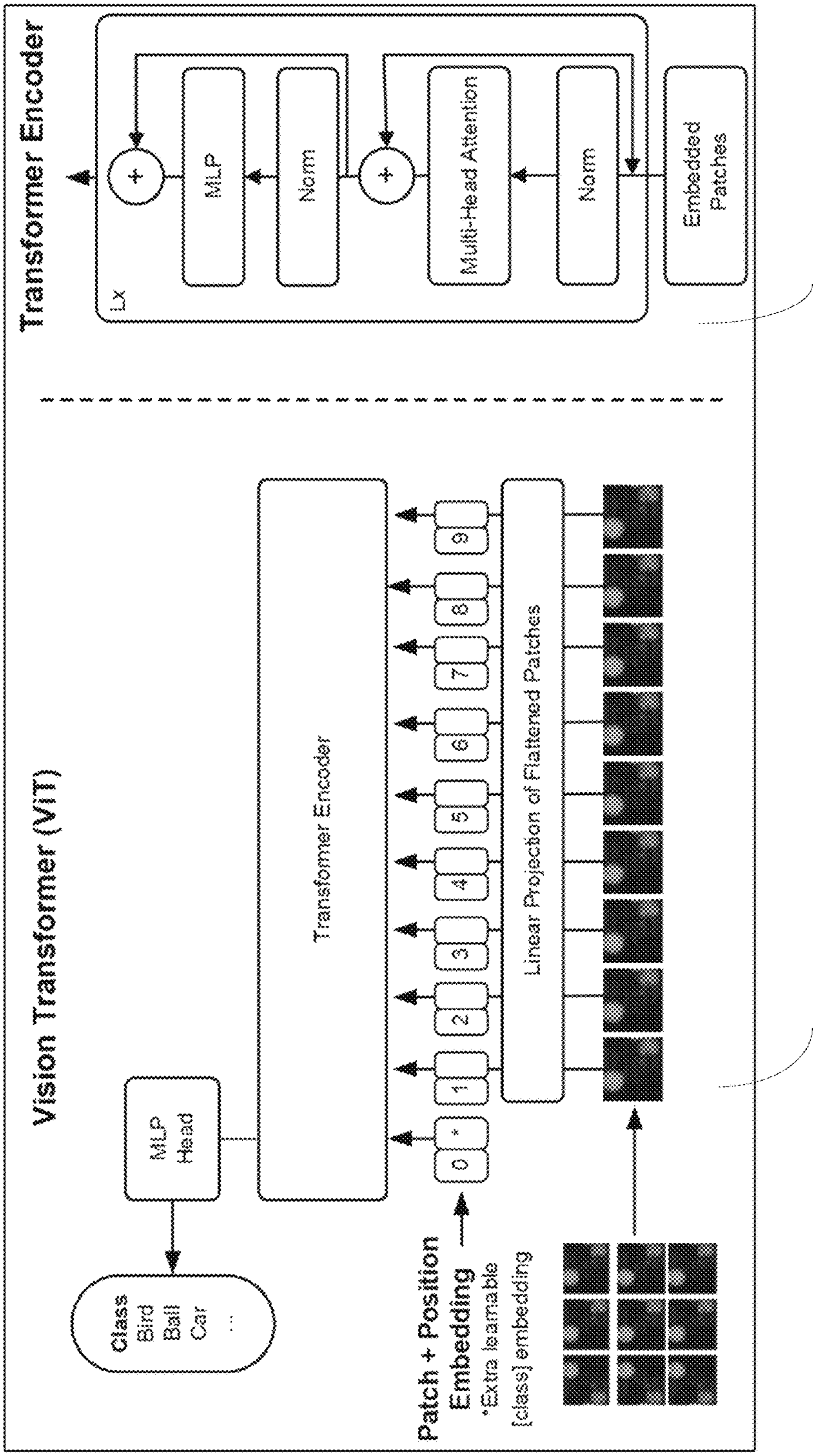
FIG. 9 is a depiction of a Vision Transformer (ViT).
Figure 10:
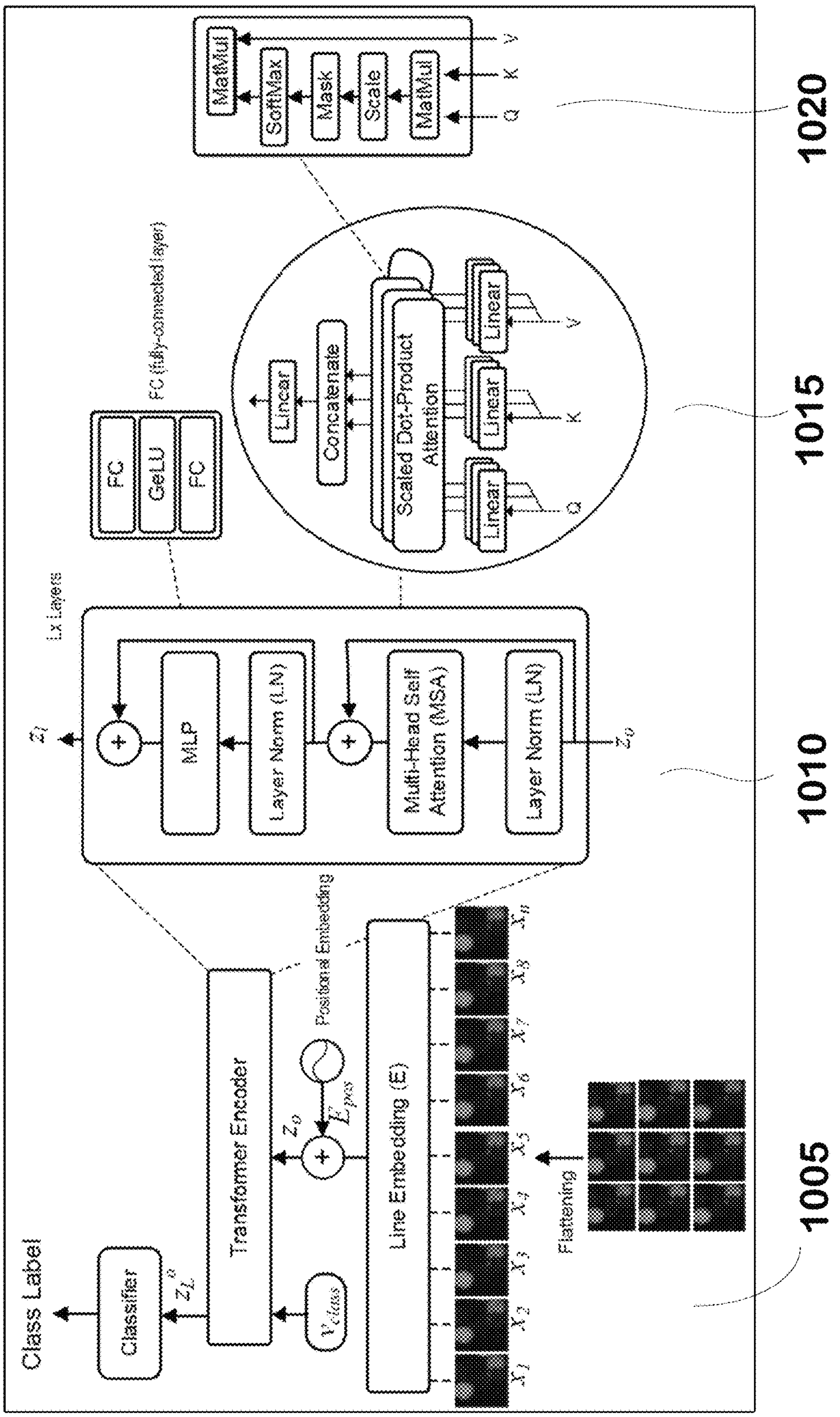
FIG. 10 illustrates a processing flow of the Vision Transformer (ViT).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIG. 9 (905, 910) and FIG. 10 (1005, 1010, 1015, 1020). Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (905 in FIG. 9). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 11.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block 910 in FIG. 9, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

In the following sections, we present additional machine learning, agentic AI and evolutionary techniques that can be used to implement the technology disclosed.

Artificial Intelligence (AI) Pipeline for Climate Forecasting

In one implementation, the technology disclosed provides a novel climate forecasting pipeline for the Niño 3.4 region that combines data analytics and expert reasoning. The system aims to automatically identify key oscillatory patterns (notably the ~5-year ENSO cycle and ~18-year Saros cycle) in climate data and determine if similar periodicities appear in other variables, then use those insights to inform multi-horizon forecasts. The technology disclosed can implement a team of AI agents that can perform various tasks in a collaborative manner.

Architecture: The pipeline is composed of multiple specialized AI agents, each responsible for a stage of analysis, under the direction of a central Large Language Model (LLM) acting as a master controller. The primary agents include:

Data Ingestion AI Agent: This AI agent can retrieve Niño 3.4 SST anomaly data, solar activity indices, and other relevant climate time series, performing preprocessing.

Pattern Detection AI Agent: This agent can apply spectral and time-series analysis to detect recurring cycles (e.g. identifying the quasi-5-year ENSO oscillation and the ~18-year Saros cycle) and checks other datasets for similar patterns.

Model Selection AI Agent: This agent can choose appropriate forecasting models (ARIMA, machine learning models, etc.) based on detected patterns and data characteristics, possibly integrating cyclical components corresponding to ENSO or solar rhythms.

Hyperparameter Tuning AI Agent: This agent can optimize model parameters through automated searches to improve forecast skill.

Forecasting AI Agent: This agent can generate forecasts for ONI and related variables across multiple time horizons (seasonal to multi-year), incorporating the patterns and models identified earlier.

The LLM Master Controller (also referred to as a master AI agent) can orchestrate the above-mentioned AI agents. It breaks down the overall task into sub-tasks, provides domain-informed guidance to each AI agent (e.g. prompting the pattern detection AI agent to look for certain cycle lengths), and integrates the outputs into a coherent analysis. The LLM also produces human-readable explanations of the findings and the reasoning behind model choices and predictions.

Methodology: Upon receiving a forecasting query, the pipeline operates as follows: The data integration AI agent gathers historical ONI data (3-month running mean SST anomalies) and solar indices (sunspot numbers, etc.). The pattern detection AI agent then discovers significant periodicities—for example, confirming ENSO's approximately three (3) to seven (7) year cycle and detecting the eighteen (18) year Saros cycle in the data. These findings are passed to the model selection AI agent, which may choose a model that accounts for these cycles (such as a seasonal ARIMA model or an LSTM with a periodic component). The hyperparameter tuning AI agent refines the model, and the forecasting AI agent uses it to predict future ONI values, possibly under different scenarios (e.g. with/without solar cycle input). Throughout, the LLM monitors progress, making real-time decisions if an agent's outcome is unexpected (it can loop back or switch strategies as needed). Finally, the LLM composes a report integrating all results-describing the identified cycles, whether other variables (like regional rainfall) exhibit those cycles, and the forecast outcomes with context.

Key Features of the technology disclosed presented above:

LLM-Orchestrated Modularity: Introduction of a large language model to coordinate specialized AI agents in a scientific analysis pipeline. This yields a highly modular system where each component is interchangeable and upgradable, while the LLM ensures seamless collaboration.

Automated Pattern Discovery: The disclosed pipeline can autonomously detect and leverage climate cycles (ENSO, solar, etc.) from data, rather than requiring hard-coded inputs. It evaluates other climate time series for the presence of these cycles, enabling a data-driven confirmation of known teleconnections or discovery of new ones.

Multi-Horizon Forecasting: By incorporating both fast and slow oscillatory drivers, the technology disclosed can produce forecasts on multiple time scales within one framework. For instance, it blends interannual ENSO forecasting with decadal trend outlooks (influenced by solar cycle or low-frequency ocean variability), which traditionally are handled separately.

Interpretability and Knowledge Integration: Each step of analysis is transparent—the LLM provides explanations for patterns found ("a 5-year cycle likely linked to ENSO") and for model decisions ("including an 18-year Saros cycle due to solar influence"). The LLM's built-in climate knowledge helps ensure the analysis is physically plausible and aligned with existing science. This interpretability is important for trust in forecasts and for scientific validation.

Adaptive Analysis: The technology disclosed is not a static pipeline but comprises one or more intelligent AI agents that can adapt the processing method based on intermediate results. If unusual data patterns emerge, the LLM can instruct agents to investigate further. This mimics a human expert's adaptive analytical process and makes the pipeline robust to surprises or regime shifts in the climate data.

The proposed AI agent pipeline represents an advanced approach to climate analysis, using a collaborative multi-agent system enhanced by an LLM's reasoning ability. In tests focusing on the Niño 3.4 region, it successfully identified the expected ENSO and solar cycles and confirmed their presence (or lack thereof) in related climate variables. It then delivered ENSO forecasts that were consistent with those patterns, all while detailing the reasoning behind each step. This level of automation, adaptability, and clarity is a step toward AI-augmented climate science, where complex phenomena can be analyzed comprehensively and communicated clearly to both experts and stakeholders. The framework is extensible to other climate indices and can incorporate additional agents (for assimilation, uncertainty analysis, etc.), highlighting its potential as a general tool for climate variability and change studies.

Symbolic Regression Techniques

Symbolic regression techniques offer a way to improve climate models by generating interpretable equations that capture key climate processes. Symbolic regression uses evolutionary algorithms, such as genetic programming, to discover mathematical expressions that best fit a dataset. It starts with a random population of expressions built from operators, functions, constants, and variables. Each is evaluated using a fitness metric (e.g., mean squared error), and top performers are refined through crossover, mutation, and reproduction. This process repeats over generations until a concise, accurate expression emerges.

Symbolic regression is valuable for producing explicit, human-readable equations, offering greater interpretability than black-box models. It can uncover physical laws or empirical relationships directly from data without predefined model structures. By generating nonlinear transformations of inputs, it also enhances feature engineering and model performance. In climate science, it's useful for detecting nonlinear teleconnections, deriving simplified dynamical models, and identifying equations governing processes like heat transfer, fluid dynamics, and radiative forcing.

Symbolic regression is a regression technique that searches for both the structure and parameters of mathematical expressions to model the relationship between inputs and a target variable. Unlike traditional regression, it does not assume a fixed model form. This data-driven approach is especially useful for uncovering governing relationships in complex systems, offering interpretable models and supporting hypothesis generation in scientific and engineering contexts.

Data-driven and machine learning methods are essential for identifying hidden climate forcings that traditional models may miss. Techniques such as Principal Component Analysis (PCA), Empirical Orthogonal Function (EOF) analysis, and optimal fingerprinting help detect unexplained variability or residual trends in climate data. More advanced tools, including autoencoders, clustering algorithms, and explainable Artificial Intelligence AI methods like SHAP (Shapley Additive Explanations) and LIME (Local Interpretable Model-agnostic Explanations), can reveal anomalies and clarify which variables are driving observed patterns. When these methods detect influences not linked to known forcings, they point to potentially unrecognized drivers in the climate system.

Input Data for Prediction of Fluctuations in Sea Surface Temperature

Figure 12A:
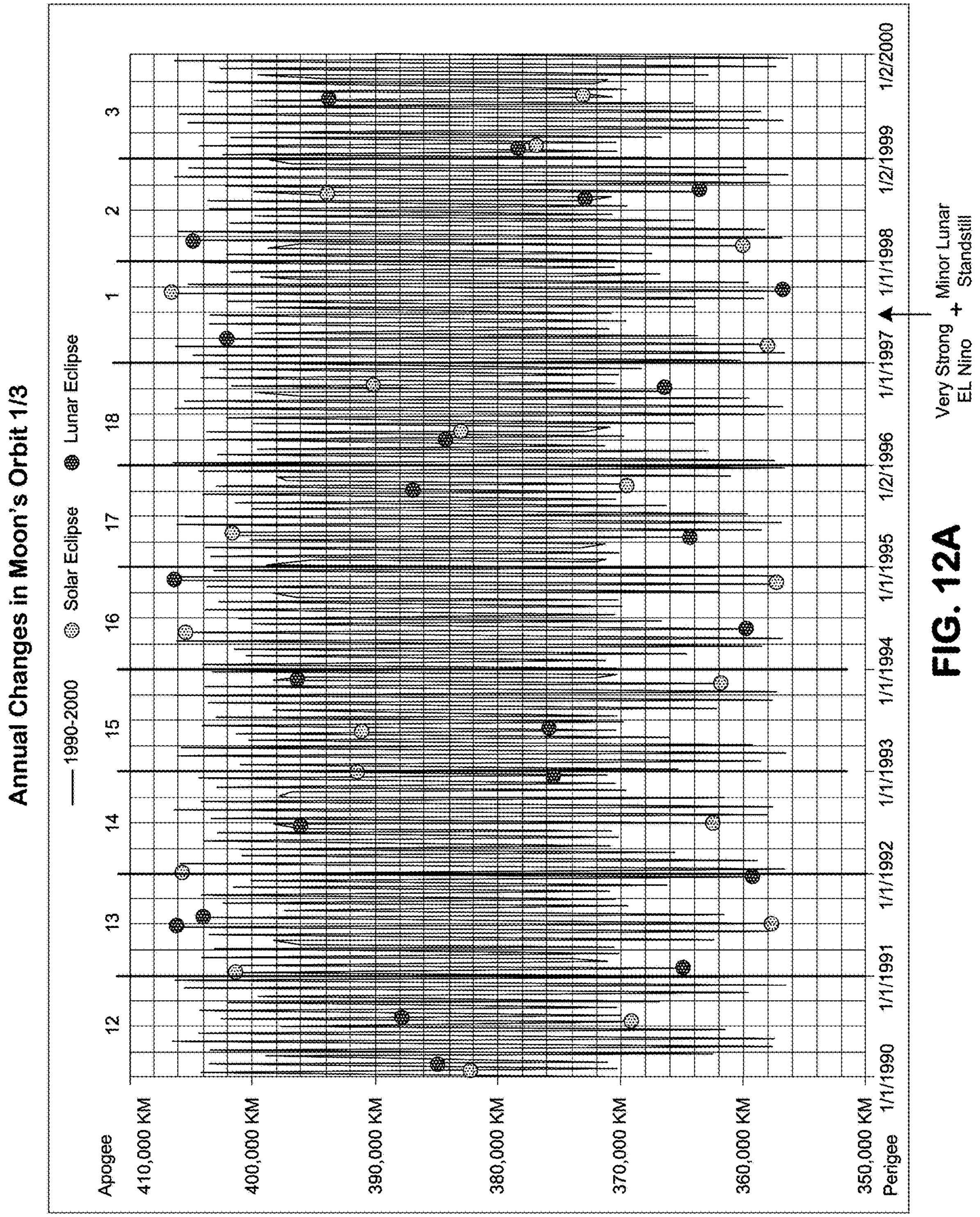
FIGS. 12A, 12B and 12C present an illustration of annual changes in Moon's orbit and occurrences of solar and lunar eclipses in an eighteen-year Saros cycle.
Figure 12B:
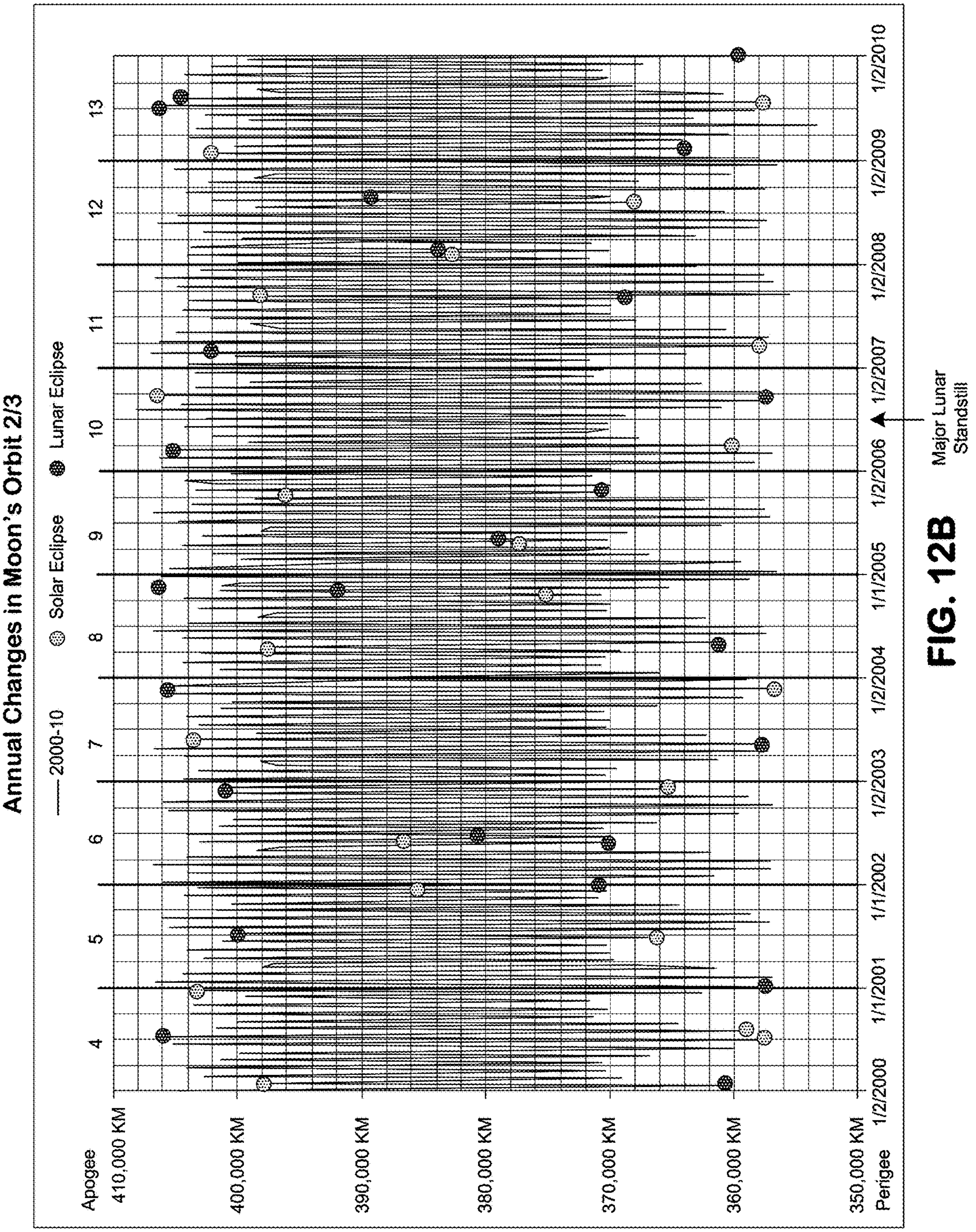
Figure 12C:
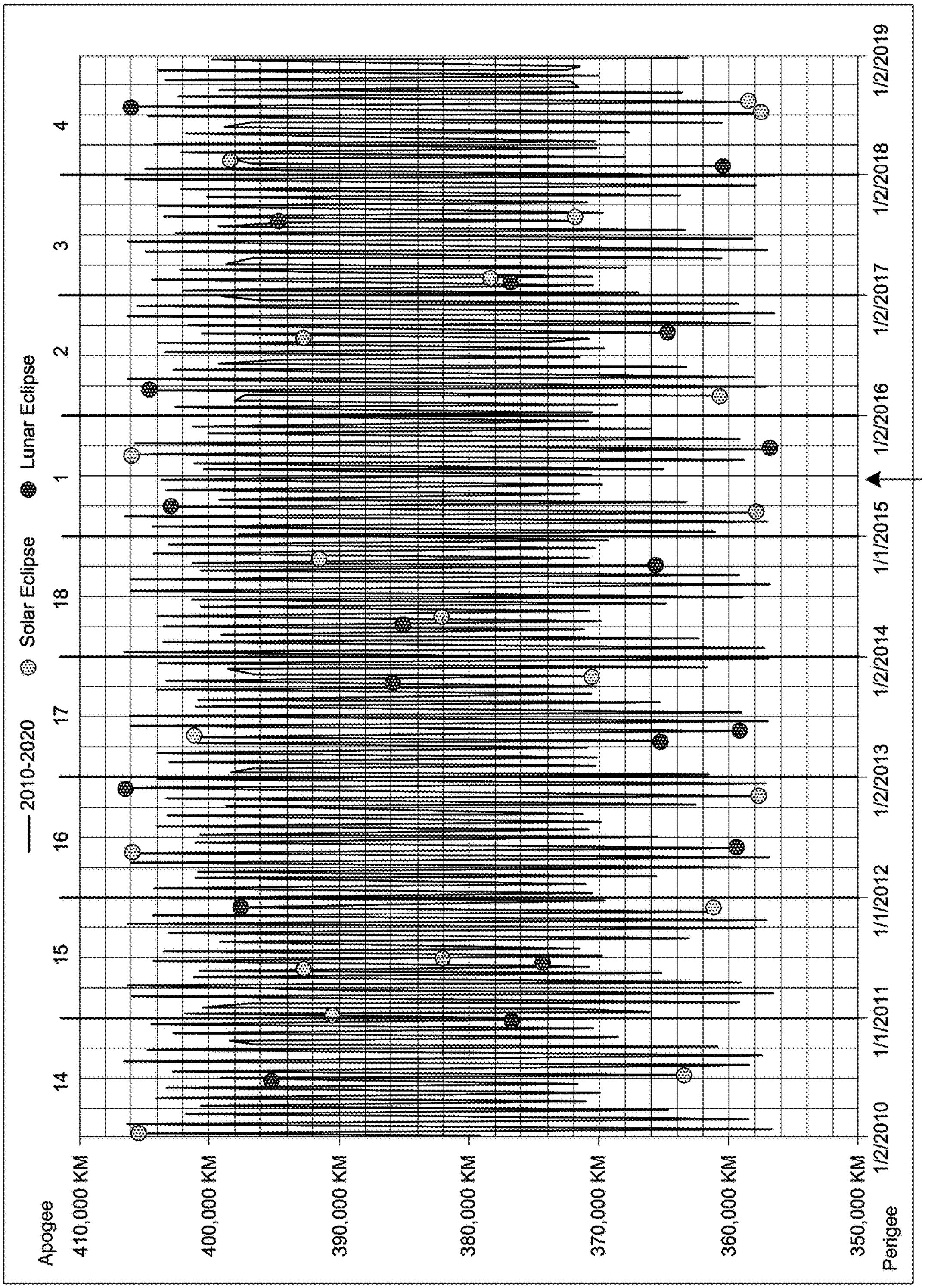

FIGS. 12A, 12B and 12C present annual changes in Moon's orbit over a period of twenty-nine years, starting from January 1990 to December 2019.

The horizontal axes on graphs shown in FIGS. 12A, 12B and 12C represent time and the vertical axes on graphs in FIGS. 12A, 12B and 12C represent distance (in Kilometers) of the Moon's orbit from the Earth. The distance between the Moon and the Earth varies over time as the Moon moves in the lunar orbit around the Earth. The maximum distance of the Moon from the Earth is referred to as apogee (labeled on the top of the vertical axes in FIGS. 12A, 12B and 12C). The minimum distance of the Moon from the Earth is referred to as perigee (labeled on the bottom of the vertical axes in FIGS. 12A, 12B and 12C). The Moon moves in its orbit around the Earth where the distance of the Moon varies between the Apogee and the Perigee. The vertical lines in the graphs in FIGS. 12A, 12B and 12C represent a movement of the Moon around Earth in the lunar orbit in one month. The distance between the Moon and the Earth is used as one of the inputs to the machine learning model to predict increase in average sea surface temperatures and decrease in average sea surface temperatures. The distance between the Moon and the Earth is also used as one of the inputs to the machine learning model to predict a probability of occurrence of extreme climate events.

The time and position of the Moon in the lunar orbit when lunar eclipses and solar eclipses occurred are marked by dark colored (lunar eclipse) and light colored (solar eclipse) circles respectively. Along the horizontal axis, each calendar year is marked by a label along the top of the graphs in FIGS. 12A, 12B and 12C. These labels range from "1" to "18". After that the labels repeat in the same eighteen-year cycles. Each calendar year is divided into four parts. The partitions between the four parts of a calendar year are aligned with four quarters in a calendar year. The first quarter starts from $1^{st}$ of January and ends at $31^{st}$ of March. The second quarter starts from $1^{st}$ of April and ends at $30^{th}$ of June. The third quarter starts from $1^{st}$ of July and ends on $30^{th}$ of September. The fourth quarter starts from $1^{st}$ of October and ends on $31^{st}$ of December. The first quarter contains the spring equinox (March equinox) that falls on $20^{th}$ or $21^{st}$ of March. The second quarter contains the summer solstice (June solstice) that falls on $20^{th}$ or $21^{st}$ of June. The third quarter contains the fall equinox (September equinox) that falls on $22^{nd}$ or $23^{rd}$ of September. The fourth quarter contains winter solstice (December solstice) that falls on $21^{st}$ or $22^{nd}$ of December. It is understood that other partitioning of the calendar years can be performed such as dividing the calendar years into two, three, six or twelve segments.

In one implementation, FIGS. 12A, 12B, and 12C illustrate how the calendar year is partitioned into four segments aligned with the spring equinox, summer solstice, fall equinox, and winter solstice. These figures also indicate eclipses occurring near the equinoxes and solstices, near apogee and perigee, and near major and minor standstills.

The equinoxes always occur around March 20-21 and September 22-23 each year. While equinoxes happen at nearly the same time each year, eclipse seasons gradually shift and complete a full cycle roughly every 18.6 years. Eclipses can only happen when the Sun, Earth, and Moon align in a way that makes an eclipse possible. A solar eclipse can occur only during a new Moon, when the Moon passes between Earth and the Sun. A lunar eclipse can occur only during a full Moon, when Earth is between the Sun and the Moon.

When an eclipse season aligns with the March or September equinox, several lunar patterns (also described as lunar configurations) can occur at the same time. These include a major or minor lunar standstill, alignment of the Moon's orbital nodes with the equinoxes, and the Moon reaching its maximum or minimum declination.

For example, during a major standstill year, the nodes align with the equinoxes and eclipses tend to occur around the equinox dates. About 9.3 years later, a minor standstill again aligns the nodes with the equinoxes, so eclipse seasons repeat near the equinoxes. Between these standstill years, the eclipse seasons shift by about three months, causing eclipses to occur near the June and December solstices. Over the full 18.6-year cycle, the timing of eclipse seasons gradually cycles through all months and eventually returns to the original alignment.

FIG. 12B shows that a major standstill occurred around 2006, and the eclipses occurred near the March and September equinoxes. In 2006, four eclipses occurred near the equinoxes, which always fall in March and September. There was a penumbral lunar eclipse on March 14, a total solar eclipse on March 29, a partial lunar eclipse on September 7, and an annular solar eclipse on September 22.

FIGS. 12B and 12C show that about 9.3 years after the major lunar standstill in 2006, there was a minor standstill in 2015, and the eclipses again aligned with the equinoxes. In 2015, four eclipses occurred near the equinoxes. There was a total solar eclipse on March 20, a total lunar eclipse on April 4, a partial solar eclipse on September 13, and a total lunar eclipse on September 28.

FIGS. 12B and 12C also indicate that around 2010, the eclipse seasons shifted to align with the June and December solstices. In 2010, there were two solar eclipses and two lunar eclipses. The solar eclipses were an annular eclipse on January 15 and a total eclipse on July 11. The lunar eclipses included a partial eclipse on June 26 and a total eclipse on December 21.

FIGS. 12A, 12B, and 12C also show that a minor lunar standstill occurred in 1997 and then, roughly 18.6 years later, the next minor lunar standstill occurred in 2015. The figures show that during both minor lunar standstills in 1997 and 2015, eclipses occurred near the March and September equinoxes.

For example, in 1997, there was a total solar eclipse on March 9, and a partial lunar eclipse on March 24, a partial solar eclipse on September 2, and a total lunar eclipse on September 16. In 2015, there were two solar eclipses and two total lunar eclipses: a total solar eclipse on March 20, a total lunar eclipse on April 4, a partial solar eclipse on September 13, and a total lunar eclipse on September 28. The minor lunar standstills in 1997 and 2015 also coincided with very strong El Nino events.

Figure 13A:
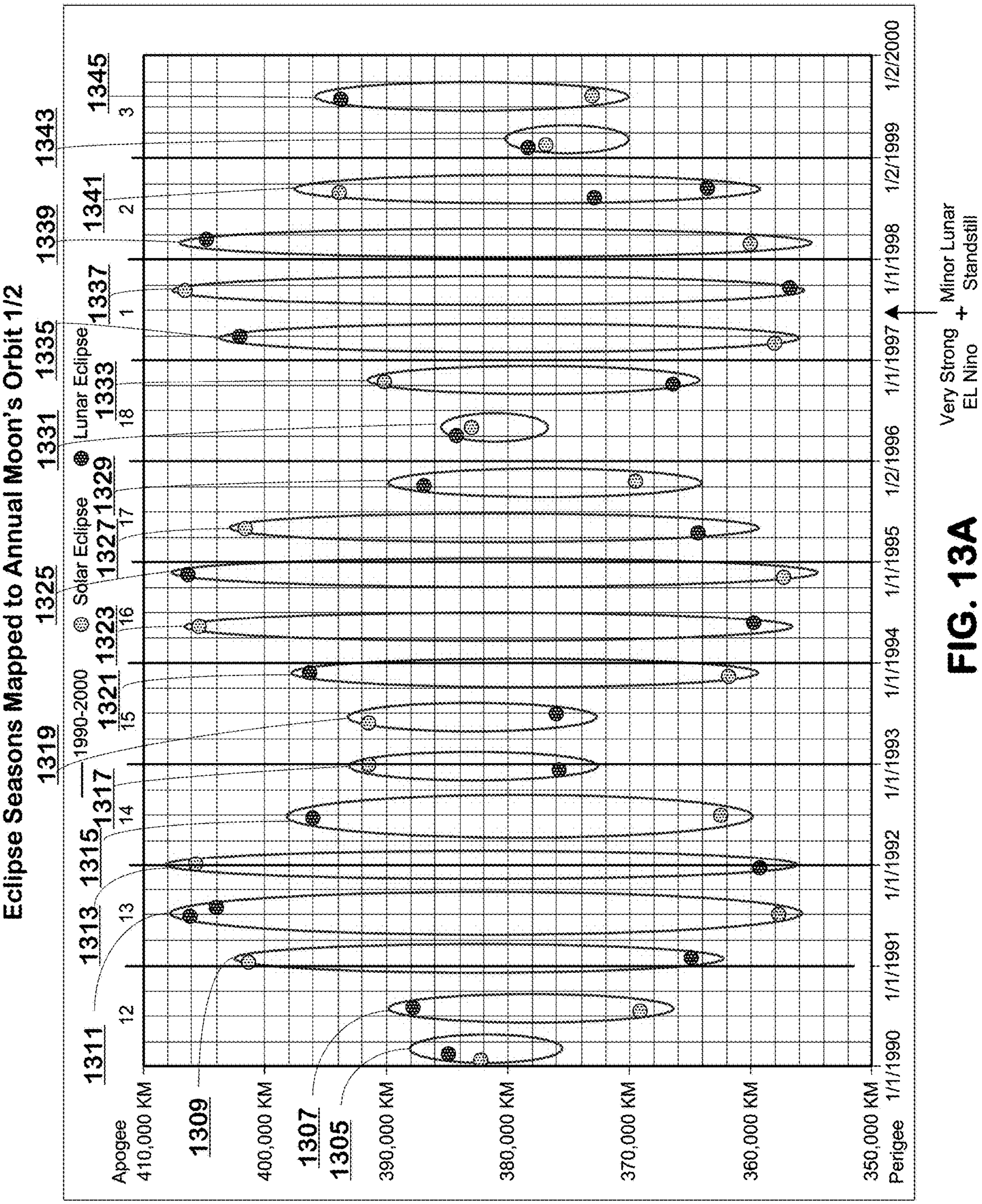
FIGS. 13A and 13B present annotated FIGS. 12A and 12B illustrating occurrences of eclipse seasons in an example eighteen-year Saros cycle.

FIG. 13A corresponds to FIG. 12A and includes annotations depicting eclipse seasons for illustrative purposes. Each eclipse season occurs after approximately six months. There are typically two eclipse seasons in one calendar year. An eclipse season comprises one lunar eclipse and one solar eclipse. In some instances, more than one lunar and/or solar eclipses can occur during one eclipse season. FIG. 13A shows lunar eclipse seasons from Jan. 1, 1990, to Jan. 1, 2000. The labeled ellipses indicate eclipse seasons that are generally six months apart. Each labeled ellipse comprises at least one solar eclipse indicated by a light-colored circle and one lunar eclipse indicated as dark colored circle. The eclipse seasons in FIG. 13A are indicated by labels 1305, 1307, 1309, 1311, 1313, 1315, 1317, 1319, 1321, 1323, 1325, 1327, 1329, 1331, 1333, 1335, 1337, 1339, 1341, 1343 and 1345. The eclipse season indicated by a label 1311 comprises two lunar eclipses indicated by two dark colored circles.

Figure 13B:
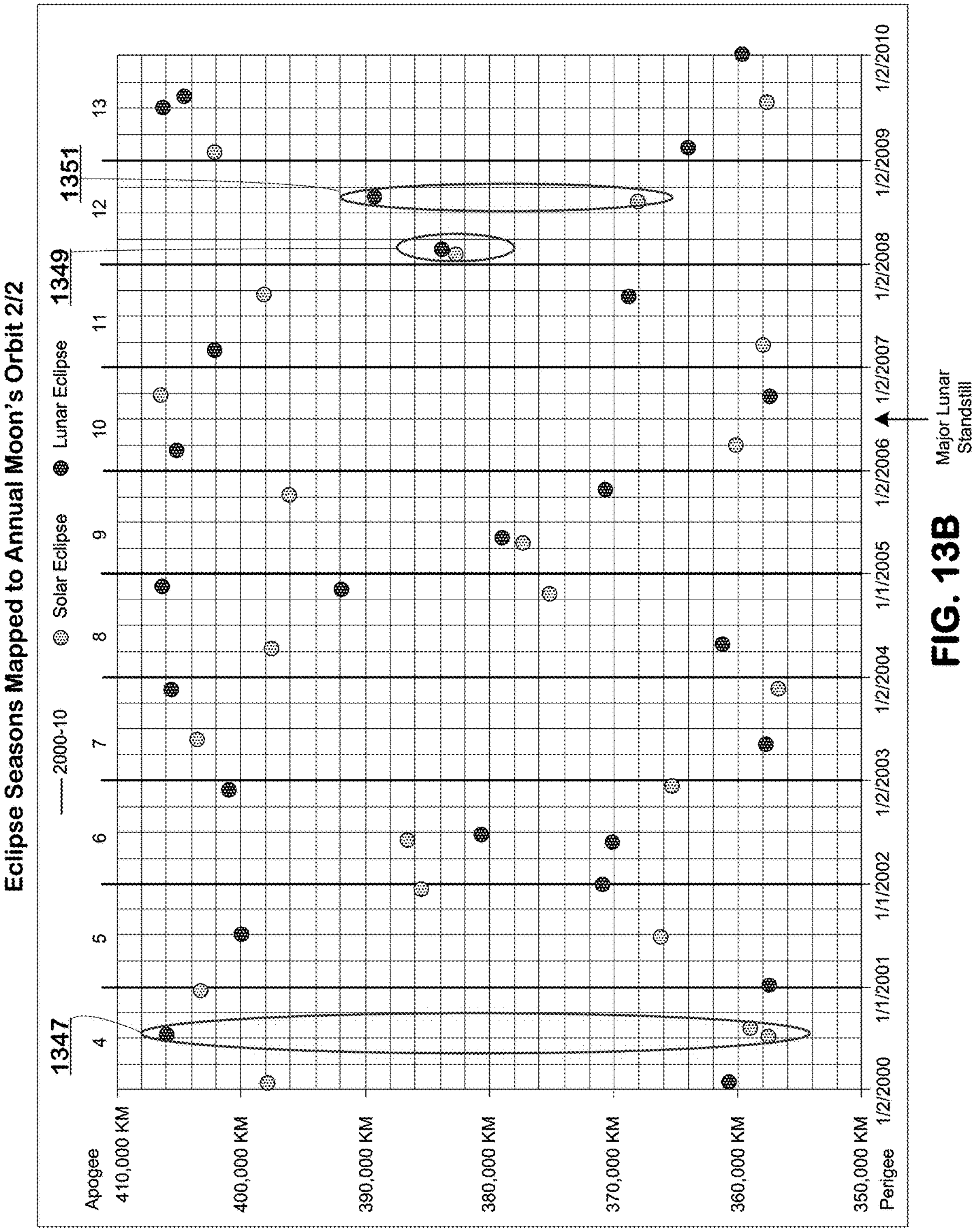

FIG. 13B corresponds to FIG. 12B and includes annotations depicting selected eclipse seasons for illustration purposes. An ellipse labeled 1347 shows an eclipse season that comprises two solar eclipses illustrated using two light colored circles. Note that the pattern of eclipse seasons repeats after about 18 years. For example, the eclipse seasons 1305 and 1307 in calendar year 1990 (labeled as "12") in FIG. 13A have similar signature (or pattern) as the eclipse seasons labeled as 1349 and 1351 in the year 2008 (also labeled as "12") in FIG. 13B. The two calendar years "1990" and "2008" are eighteen years apart and therefore the eclipse season pattern (or signature) is almost the same in these two calendar years as described by the Saros cycle, which repeats about every 18 years and 11 days.

FIG. 15A presents a table illustrating various extreme climate events, i.e., El Niño and La Niña events along with the respective calendar years in which these events occurred. The table in FIG. 15A also presents a classification of the respective climate events ranging from "weak", "moderate", "strong" to "very strong". The extreme climate events date from 1951 to 2023 calendar years.

The graphical illustrations in FIG. 13A show that the timing of the eclipse season start date has an impact on the probability of occurrence of an extreme climate event. For example, the eclipse season 1311 (as shown in FIG. 13A) started close to the June Solstice, i.e., it started on 27th of June 1991. This eclipse season had two lunar eclipses and one solar eclipse. The first lunar eclipse in this eclipse season occurred on 27th of June 1991, a solar eclipse occurred on $11^{th}$ of July 1991 and a second lunar eclipse occurred on 26th of July 1991. As the eclipse season started close to the June solstice ($21^{st}$ of June) i.e., less than ten days after the equinox, and simultaneously occurred during an extreme apogee and perigee, it has a great impact on the occurrence of an extreme climate event. An El Niño extreme climate event occurred after this eclipse season in the year 1991. Referring to the table in FIG. 15A, the El Niño extreme climate event in the year 1991-92 is classified in the "strong" category. This El Niño event is also shown in FIG. 14A (labeled as 1467) along the horizontal axis, starting after the eclipse season and continuing to middle of the following year, 1992.

Figure 14A:
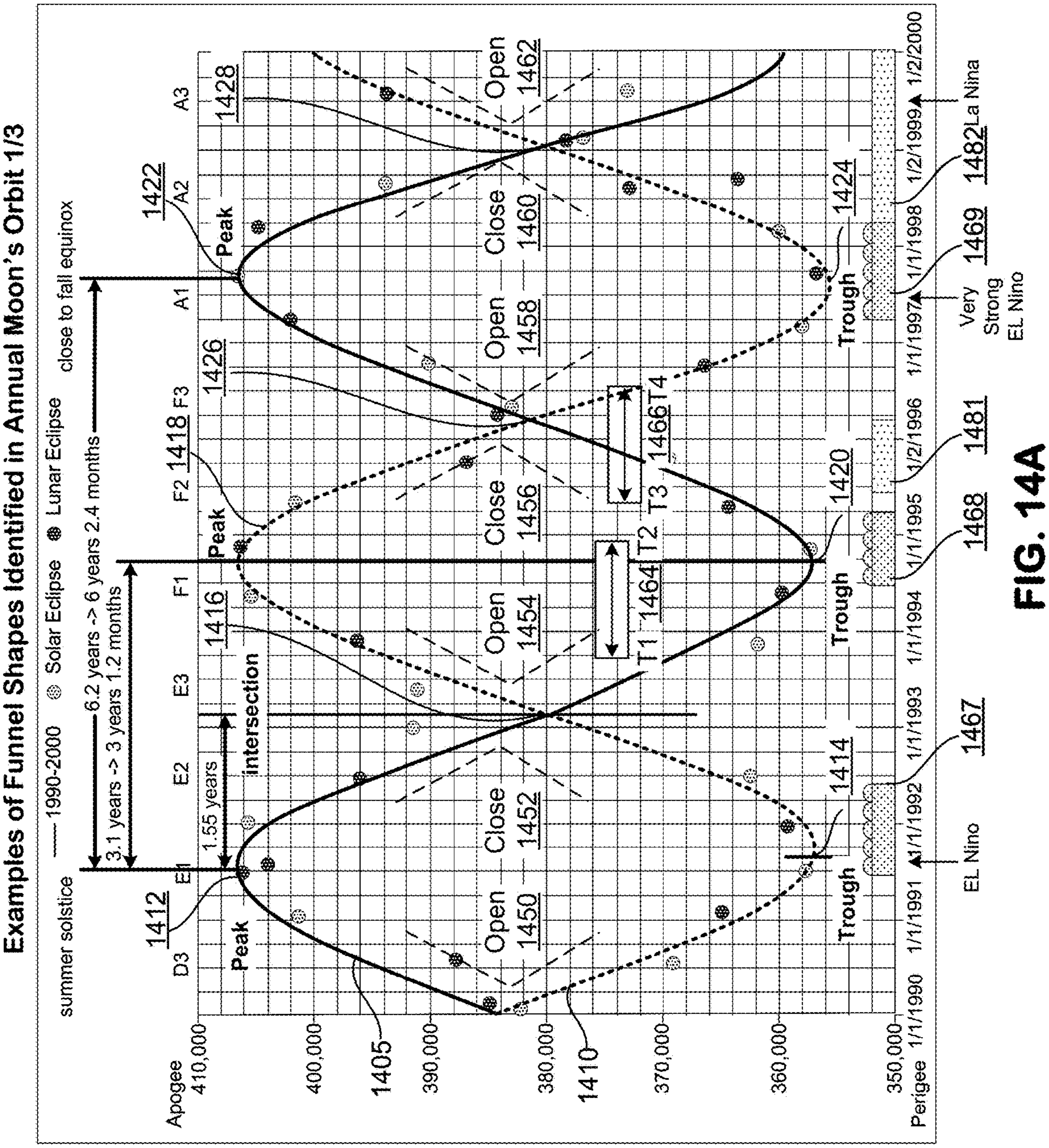
FIGS. 14A, 14B and 14C present an example of two overlapping sinusoidal waves mapped to Moon's orbit as shown in FIGS. 12A, 12B and 12C, respectively.

FIG. 14A shows how El Niño events will often occur near the coincident trough and peak of the opposing sinusoidal waves that correspond with extreme apogee and perigee of the Moon's orbit around Earth.

The eclipse season labeled as 1323 in the year 1994 in FIG. 13A started on 10th of May 1994 with a solar eclipse on this date and included a lunar eclipse on 25th of May 1994. As this eclipse season started close to apogee and perigee and about a month before the June Solstice ($21^{st}$ of June), it had an impact on the occurrence of an extreme climate event that started around the middle of the same calendar year, 1994. This El Niño extreme climate event is classified as a "moderate" event in the table in FIG. 15A.

When a sequence of eclipse seasons occurs near consecutive equinoxes, it can lead to extreme climate events of higher intensity. For example, an El Niño extreme climate event classified as a "very strong" event (as shown in FIG. 15A) occurred in the year 1997. Prior to the occurrence of this extreme climate event in 1997, multiple eclipse seasons consecutively occurred close to equinoxes and the occurrence of extreme apogee and perigee. For example, moving backward in time from the year 1997, a solar eclipse occurred on 2nd of September 1997 and a lunar eclipse occurred on 16th of September 1997. These two eclipses are labeled as eclipse season 1337 in FIG. 13A. Next, a solar eclipse occurred on 9th of March 1997 and a lunar eclipse occurred on 24th of March 1997. These two eclipses are labeled as eclipse season 1335 in FIG. 13A. The eclipse season 1335 started around twelve days before March solstice on $21^{st}$ of March. Moving further backward in time, a lunar eclipse occurred on $27^{th}$ of September 1996 and a solar eclipse occurred on $12^{th}$ of October 1996. These two eclipses are labeled as eclipse season 1333 in FIG. 13A. In this instance, the eclipse season started within a week of September equinox on September 21. Moving further back in time, a solar eclipse occurred on $17^{th}$ of April 1996 and a lunar eclipse occurred on $4^{th}$ of April 1996. These eclipses are labeled as the eclipse season 1331 in FIG. 13A. In this instance, the eclipse season started about two weeks after March equinox on March 21. Moving further back in time, a lunar eclipse occurred on $8^{th}$ of October 1995, and a solar eclipse occurred on $24^{th}$ of October 1995. These eclipses are labeled as the eclipse season 1329 in FIG. 13A. In this instance, the eclipse season started after about twenty days from September equinox on $21^{st}$ of September. Moving further back in time, a lunar eclipse occurred on $15^{th}$ of April 1995 and a solar eclipse occurred on $29^{th}$ of April 1995. These eclipses are labeled as the eclipse season 1327 in FIG. 13A. In this instance, the eclipse season occurred in less than thirty days after the March equinox on March 21. Due to these consecutive eclipse seasons around equinoxes and the occurrence of extreme apogee and perigee, enough energy is built up during the consecutive eclipse seasons leading up to an extreme climate event of a "very strong" El Niño in the year 1997 (FIG. 15).

Similar patterns of occurrences of extreme climate events can be observed at other times. For example, a strong El Niño extreme climate event classified as a "very strong" event (as shown in FIG. 15) occurred in the year 2015, which is approximately 18 years after the very strong El Niño in 1997. Prior to the extreme climate events in 1997 and 2015, consecutive eclipse seasons occurred close to equinoxes and near extreme apogee and perigee. A lunar eclipse occurred on $8^{th}$ of October 2014 and a solar eclipse occurred on $23^{rd}$ of October 2014. This eclipse season occurred within about two weeks of September equinox ($21^{st}$ of September). Going further back in time, another eclipse season started on 15th of April 2014 comprising a lunar eclipse occurring on $15^{th}$ of April 2014 and a solar eclipse happening on and $29^{th}$ of April 2014. This eclipse season started within thirty days of a March equinox ($21^{st}$ of March).

The technology disclosed includes predicting an increase in sea surface temperature, a decrease in sea surface temperature and predicting a probability of occurrence of an extreme climate event (such as El Niño and La Niña events) using a trained machine learning model. The machine learning model is trained using a plurality of time series data. Examples of time series data comprise (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle. The plurality of partitions segmenting the particular calendar year can include at least a March equinox, a June solstice, a September equinox and a December solstice. Predicting the increase in sea surface temperature, the decrease in sea surface temperature and the probability of occurrence of an extreme climate event comprise setting a value of a first Boolean flag when at least one of an eclipse season start date and an eclipse season end date in a particular calendar year occurs in a period of thirty days preceding a timestamp for a particular partition in a plurality of partitions segmenting the particular calendar year. The eclipse season comprises at least one lunar eclipse and at least one solar eclipse within a predefined eclipse season duration starting from the eclipse season start date and ending at the eclipse season end date. The first Boolean flag is provided as input to the machine learning model. The trained machine learning model outputs a probability of an increase in the average sea surface temperature for a predefined time interval in the particular calendar year. The output from the trained machine learning model can be further provided as input to a weather prediction system for use in forecasting weather. In another implementation, the first Boolean flag is provided as input to another trained machine learning model. The other trained machine learning model outputs a probability of a decrease in the average sea surface temperature for a predefined time interval in the particular calendar year.

In another implementation, when the eclipse season start date and/or the eclipse season end date is farther away from an equinox or a solstice by more than thirty days but less than forty-five days than a value of a second Boolean flag can be set for input to the trained machine learning model.

The trained machine learning model is trained to assign higher weightage to value of the first Boolean flag as compared to the value of the second Boolean flag.

In another implementation, the trained machine learning model is trained to assign (a higher) at least a 2× (double or two times) weightage to the value of the inputted first Boolean flag for the predicting of the probability of increase in the average sea surface temperature or the decrease in the average sea surface temperature or for predicting a probability of occurrence of an extreme climate event when a difference between the eclipse season start date and the timestamp for the equinox and/or solstice is less than a predefined threshold. The value of the predefined threshold can be set ranging from 1 day to 30 days or more. In other implementations, less than 2× weightage can be assigned to the first Boolean flag such as 1.25×, 1.5× or 1.75×, etc.

In one implementation, the technology disclosed comprises two trained machine learning models. A first trained machine learning model predicts increase in sea surface temperature and/or decrease sea surface temperature. The output from the first machine learning model is provided as input to a second machine learning model that predicts a probability of occurrence of an extreme climate event. As described above, the probability of an extreme climate event increases when eclipse seasons, comprising both solar and lunar eclipses that occur near the equinoxes and solstices, coinciding with extreme apogee and perigee values and repeat over consecutive years. Each of these variables, or input features, is assigned a specific weight that serves as a parameter in the model, determining its influence on the overall model output. The second trained model is trained using a plurality of outputs from the first trained model to predict the probability of the occurrence of an extreme climate event. In one implementation, the second trained machine learning model is trained using the plurality of time series data to predict a probability of an extreme climate event when the plurality of predicted probability of increase in the average sea surface temperature and/or decrease in the average sea surface temperature values as predicted by the first trained machine learning model corresponding to the plurality of calendar years are above a second pre-defined threshold. For example, the outputs from the first machine learning model for two, three, four, five, six or more time periods can be provided as input to the second machine learning model. A time period can correspond to one eclipse season or the time period can correspond to a time duration such as six months, eight months, one year, two years, three years, five years, seven years, ten years or more than ten years, etc. The time periods can be from consecutive calendar years or any plurality of calendar years that are non-consecutive.

The second machine learning model outputs the probability of the occurrence of the extreme climate event for any time interval in the future. For example, the second machine learning model predicts the probability of occurrence of the extreme climate event after one month, six months, one year, ten years, a hundred years or a thousand years in future following the plurality of calendar years in the eighteen-year Saros Cycle. The plurality of calendar years can be consecutive or non-consecutive calendar years.

Figure 14B:
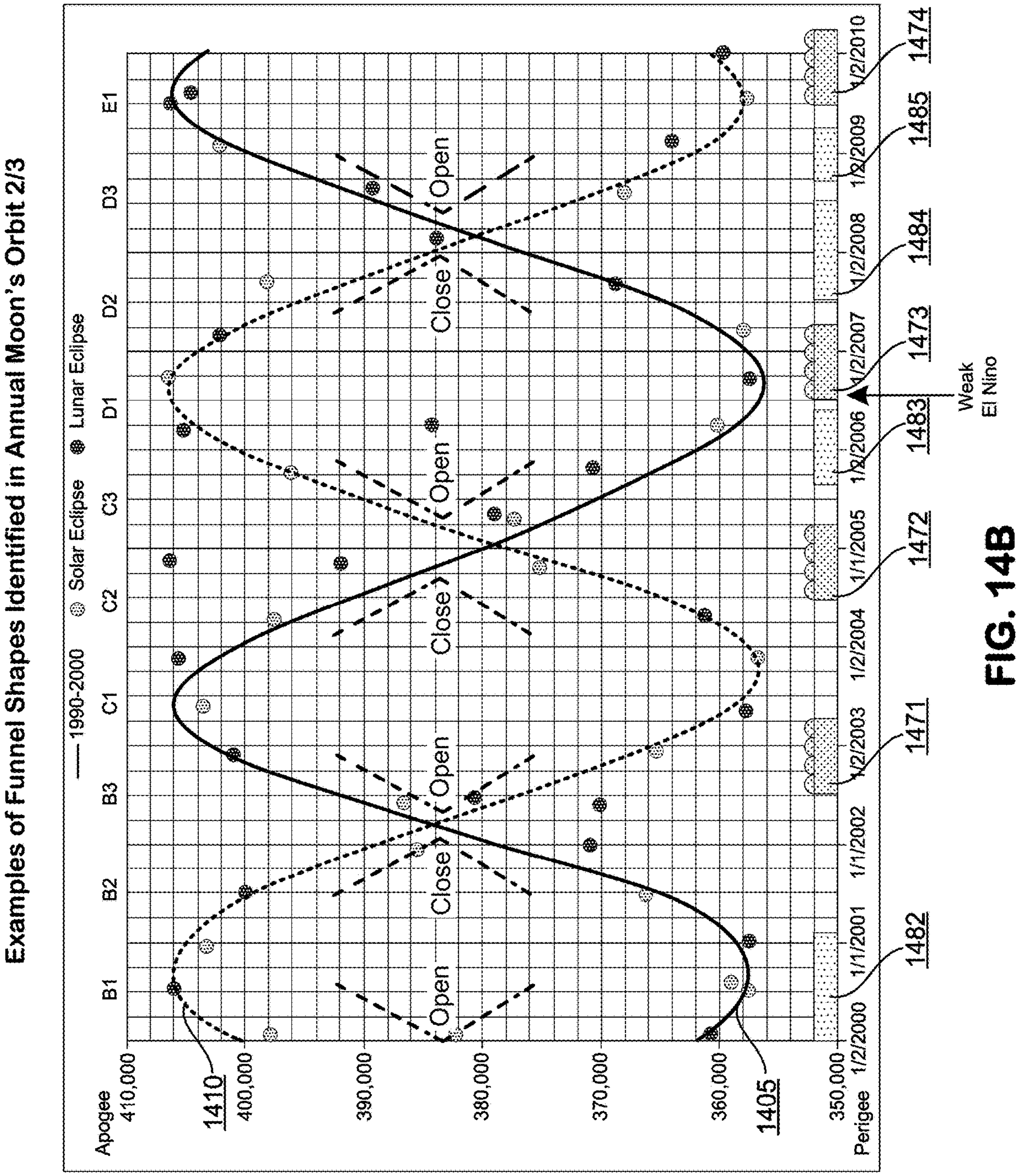
Figure 14C:
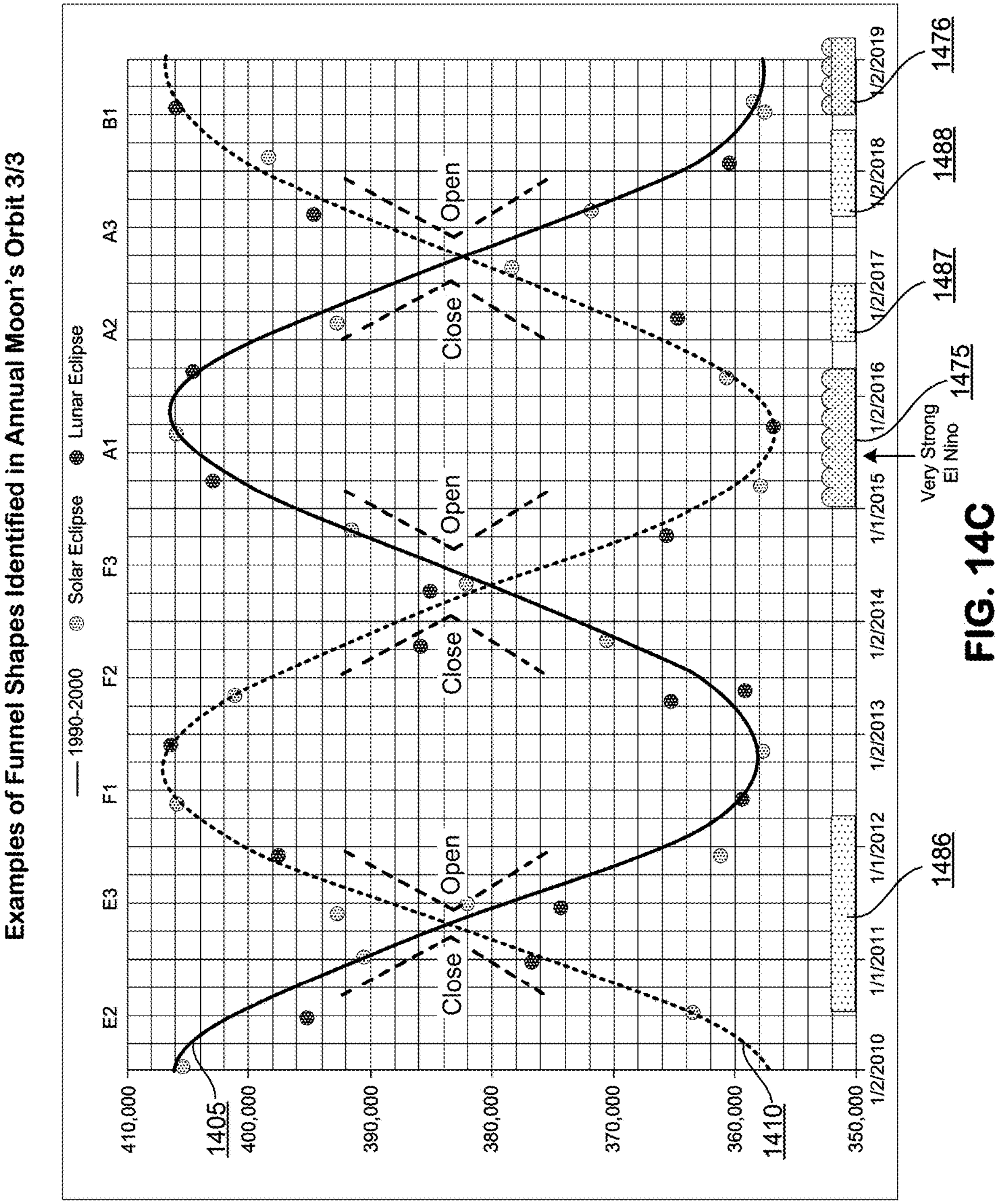

The technology disclosed includes logic to extract additional signals from lunar orbit characteristics as depicted in FIGS. 14A, 14B and 14C. The graphical illustrations in FIGS. 14A, 14B and 14C correspond to FIGS. 12A, 12B and 12C and illustrate the two sinusoidal waves superimposed on the graphs illustrating lunar orbit around the Earth. A first sinusoidal wave is labeled as 1405 and a second sinusoidal wave is labeled as 1410 in FIGS. 14A, 14B and 14C. The two sinusoidal waves are 180 degrees apart. The two sinusoidal waves are generated using a plurality of lunar orbit characteristics identifying a position of the Moon in space and time with respect to the position of the Earth at occurrences of a plurality of solar eclipses and a plurality of lunar eclipses in respective plurality of eclipse seasons. Each of these two sinusoidal waves repeats at least every 6.2 years in the 18.6 years lunar nodal cycle. The first sinusoidal wave starts at a peak position (1412) corresponding lunar apogee, troughing at 3.1 years from the start date at a trough position 1420 corresponding to lunar perigee and ends at 3.1 years from the date corresponding to the trough position 1420 at a peak position 1422 corresponding to the lunar apogee. The second sinusoidal wave starts at a trough position 1414 corresponding to lunar perigee, peaking at 3.1 years from the start date at a peak position 1418 corresponding to lunar apogee and ending at 3.1 years from the date corresponding to the peak position 1418 at a trough position 1424 corresponding to the lunar perigee. The first sinusoidal wave 1405 and the second sinusoidal wave 1410, intersect each other, at a first intersection 1416, at 1.55 years from the start of the first sinusoidal wave 1405 and the second sinusoidal wave 1410. The intersection of the first sinusoidal wave and the second sinusoidal wave is repeated every 3.55 years from the first intersection 1416 of the first sinusoidal wave 1405 and the second sinusoidal wave 1410. These intersections are indicated by labels 1426 and 1428. Note that the respective start positions 1412 and 1414 of the two sinusoidal waves 1405 and 1410 are indicated for illustrative purposes. It is understood that the two sinusoidal waves 1405 and 1410 extend infinitely in both forward (future) and backward (past) directions.

The technology disclosed includes logic to identify values of so-called funnel shape indicators for pre-defined time intervals using the formation the two overlapping sinusoidal waves that are out of phase by 180 degrees. The value of the funnel shape indicator can be set as "open" or "close" for a given pre-defined time interval. A weighted value can be assigned to the funnel shape indicator based on its alignment and timing relative to the equinoxes and solstice. For example, if an open funnel shape precedes an eclipse season that coincides with equinox, the funnel shape indicator could have a higher weighting. In one implementation, the value of the funnel shape indicator is provided as input to a machine learning model, along with one or more other lunar orbit characteristics to predict a probability of occurrence of an extreme climate event during a pre-define time interval in future.

The value of the funnel shape indicator is set as an opened-shaped funnel when the starting date of the predefined time interval is after a date corresponding to a particular intersection of the two sinusoidal waves and the starting date of the predefined time interval is before a date corresponding to the peak or the trough of the first and/or the second sinusoidal wave following the particular intersection of the two sinusoidal waves. Predefined time interval can range from one second to one year or more. A first trained machine learning model outputs a probability of an increase in average sea surface temperature or probability of decrease in average sea surface temperature. A second machine learning model outputs a probability of occurrence of an extreme climate event such as El Niño and La Niña events. The predefined time interval is provided as input to the first and/or the second machine learning model identifying the time interval in future for which a prediction is required indicating whether the average sea surface temperature will likely increase during this time interval or whether the average sea surface temperature will likely decrease during this time interval or whether an extreme climate event will occur during this time interval. An example of a predefined time interval is presented in FIG. 14A labeled as 1464. The predefined time interval 1464 starts from a timestamp "T1" and ends at a timestamp "T2". As the starting time "T1" of the predefined time interval is positioned (along the time axis or the horizontal axis) after the intersection 1416 of the two sinusoidal waves and is positioned before the following peak 1418 and trough 1420 of the respective sinusoidal waves, therefore, a value of the funnel shape indicator for the time interval 1464 is set as "open". Another example of a predefined time interval is presented in FIG. 14A labeled as 1466. The predefined time interval 1466 starts from a timestamp "T3" and ends at a timestamp "T4". As the starting time "T3" of the predefined time interval is positioned (along the time axis or the horizontal axis) before the intersection 1426 of the two sinusoidal waves and is positioned after the preceding peak 1418 and trough 1420 of the respective sinusoidal waves, therefore, a value of the funnel shape indicator for the time interval 1466 is set as "close". In general, the open-shaped funnel indicator values and close-shaped funnel indicator values are shown in FIG. 14A using respective labels 1450, 1452, 1454, 1456, 1458, 1460 and 1462. FIGS. 14B and 14C are similar to FIG. 14A illustrating the continuation of the two sinusoidal waves 1405 and 1410.

The technology disclosed includes logic to provide the funnel shape indicator as an input to a trained machine learning model to predict the probability of occurrence of an extreme climate event such as El Niño and La Niña events. It can be observed from FIGS. 14A, 14B and 14C that in general when the value of funnel shape indicator for a predefined time interval, for which the prediction is to be made for the occurrence of the extreme climate event, is "open", it is more likely that an El Niño extreme climate event will occur. Similarly, in general, it can be observed that when the value of funnel shape indicator for a predefined time interval is "close", it is more likely that a La Niña event will occur during this time interval. However, it should be noted that a variety of other climate events such as volcanic activity can impact the occurrence of the El Niño and La Niña events. We further review this in reference to FIGS. 15B and 15C that describe the impact of incoming and outgoing radiations in the atmosphere. These radiations can have an impact on occurrence of El Niño and La Niña events.

Referring to FIG. 14A, it can be observed that El Niño events labeled as 1467, 1468 and 1469 started when the funnel shape indicator was set as "open". Similarly, referring to FIG. 14B, it can be observed that El Niño events labeled as 1471, 1473 and 1474 started when the funnel shape indicator was set as "open". However, the El Niño event labeled as 1472 did not follow this pattern. Other external environmental factors can impact the occurrence of extreme climate events as described above. Referring to FIG. 14C, it can be observed that El Niño events labeled as 1475 and 1476 started when the funnel shape indicator was set as "open".

Referring to FIG. 14A, it can be observed that La Niña events labeled as 1481 and 1482 started when the funnel shape indicator was set as "close". Similarly, referring to FIG. 14B, it can be observed that La Niña event labeled as 1484 started when the funnel shape indicator was set as "close". However, La Niña events labeled as 1483 and 1485 started when the funnel shape indicator was set as "open". As described above, other external environmental factors can impact the occurrence of extreme climate events. Referring to FIG. 14C, it can be observed that La Niña events labeled as 1486 and 1487 started when the funnel shape indicator was set as "close". However, La Niña events labeled as 1488 started when the funnel shape indicator was set as "open". This can be due to impact of other environmental factors that can cause delay in occurrence of El Niño and La Niña events. For example, the expected La Niña event did not occur in 1993 as shown on FIG. 14A. This could be related to the eruption of Mount Pinatubo in the Philippines in 1991, which was one of the largest volcanic eruptions in the last century, and it also occurred near the equatorial Pacific. Volcanic eruptions often emit large amounts of gas and particulate matter into the atmosphere. This can influence the onset of La Niña conditions, due to an insulating effect that traps outgoing infrared (IR) radiation near the surface of the earth.

Similarly, in 1996 and 1997, the eclipse season coincided with equinox, which is a very strong signal and resulted in a "very strong" El Niño event in 1997. The "very strong" El Niño removed a considerable amount of heat and energy from the equatorial Pacific by sending atmospheric rivers poleward and northward from the equator and this resulted in extreme rainfall amounts to the northwest coast of the United States. After this event, a sufficient amount of energy was removed from the equatorial Pacific leading to an unusual triple year La Niña event that followed from 1998 through 2001 that is labeled as 1482 in FIGS. 14A and 14B. This shows how external forcing factors can affect the timing of El Niño and La Niña events. As the technology disclosed inputs various different types of input signals (e.g., funnel shape indicators, solar and lunar eclipses that occur near the equinoxes and solstices, and coincide with extreme apogee and perigee values) and repeats over consecutive years, therefore, the machine learning model is able to predict, with a high degree of confidence, the probability of occurrence of extreme climate events such as the El Niño and La Niña events.

FIGS. 15B and 15C present graphical illustrations of annual solar energy and occurrences of El Niño and La Niña events (also referred to as ENSO events). Earth's climate system comprises radiative energy balance between the solar shortwave radiation (SW) absorbed by the atmosphere and the surface of the Earth and the thermal longwave radiation (LW) emitted by the Earth to space. The ENSO events are expected to be associated with the variability of the radiative energy balance over the equatorial Pacific Ocean. The technology disclosed includes logic to access historical solar radiation data stored in the historical solar radiation database 110. The technology disclosed further includes logic to use that historical data for prediction of fluctuations in sea surface temperatures and for prediction of occurrences of extreme climate events. The graph in FIG. 15B is adapted from Pavlakis et al. 2008, "ENSO surface shortwave radiation forcing over the tropical Pacific". The graph in FIG. 15C is adapted from Pavlakis et al. 2007, "ENSO surface longwave radiation forcing over the tropical Pacific".

The El Niño Southern Oscillation (ENSO) is the dominant natural interannual climate fluctuation on Earth and involves the interaction between the tropical Pacific Ocean and the overlying atmosphere. However, its impact extends worldwide since heating of the tropical atmosphere creates changes in the global atmospheric circulation. ENSO (El Niño-Southern Oscillation) is a natural climate pattern involving periodic changes in sea surface temperatures and atmospheric pressure in the tropical Pacific Ocean, affecting global weather. It has three phases: El Niño (warmer ocean, weaker trade winds), La Niña (cooler ocean, stronger trade winds), and Neutral (near-average conditions).

El Niño occurs when Pacific trade winds weaken or reverse, allowing warm water to spread eastward across the central and eastern Pacific. This leads to warmer-than-normal sea surface temperatures, reduced upwelling, and shifts in global weather patterns, bringing wetter conditions to the southern United States and drier weather to the northern United States.

La Niña occurs when Pacific trade winds strengthen, pushing more warm water westward and enhancing upwelling of cold water in the eastern Pacific. This results in cooler-than-normal sea surface temperatures and shifts in global weather, bringing wetter conditions to the northern U.S. and drier, warmer weather to the southern United States.

Neutral ENSO conditions occur when sea surface temperatures and trade winds are near average, meaning no strong El Niño or La Niña influences on global weather. Neutral ENSO conditions create weather patterns that follow typical seasonal variations without major disruptions.

Many studies have been conducted and various models have been proposed to predict the occurrence of ENSO events, however, none have been successful in this task. During these investigations, measurements have been made regarding various atmospheric conditions.

Downward shortwave radiation (DSR) consists of sunlight, including visible, ultraviolet, and near-infrared wavelengths, that reaches the Earth's surface either directly or after scattering. Downward longwave radiation (DLR) is thermal infrared energy emitted by the atmosphere after greenhouse gases, water vapor, and clouds absorb and re-emit radiation. DSR directly warms the surface, while DLR enhances the greenhouse effect by warming the surface from above. Both are measured in watts per square meter ($W/m^2$), representing the amount of shortwave and longwave radiation reaching the Earth's surface.

During El Niño events, elevated sea surface temperatures in the equatorial Pacific enhance convection and increase cloud formation. The increased cloud cover reflects more incoming sunlight, reducing DSR at the surface, which explains the negative correlation between El Niño and DSR, shown in FIG. 15B. Simultaneously, a warmer and more humid atmosphere, combined with more clouds, emits greater amounts of DLR, resulting in a positive correlation with El Niño, shown in FIG. 15C.

In contrast, La Niña conditions typically exhibit reduced convection and fewer clouds. This leads to less reflection of incoming sunlight (resulting in higher DSR) and lower emission of thermal infrared radiation (resulting in lower DLR). FIGS. 15B and 15C present a comparison of the Niño-3.4 Index (dashed line) with DSR and DLR radiation respectively (solid lines).

FIG. 15B includes a graph 1505 presenting a time series comparison of the Niño-3.4 Index and Downward Shortwave Radiation (DSR) for the period 1984 to 2004. The DSR values represent downward shortwave radiation reaching the Earth's surface and DSR-A values represent DSR anomaly defined with respect to the average monthly DSR for the period 1984-2004, in the Niño-3.4 region. The left vertical axis of graph 1505 shows DSR-A values in units of W m-2 and the time-series of the DSR-A values are illustrated with a solid line. On the right vertical axis, the broken line (1515) illustrates the time-series of the Niño-3.4 index in units of degree C. The Niño-3.4 index, based on sea surface temperature (SST), is widely used to identify El Niño and La Niña events. The strength of these events is measured by the three-month smoothed SST anomalies in the Niño-3.4 region of the equatorial Pacific. It can be observed that DSR-A values have a strong inverse correlation with Niño-3.4 index values. The higher values and peaks of the Niño-3.4 index values are closely aligned with El Niño events as shown by labels in graph 1505. While lower values of Niño-3.4 index values are closely aligned with La Niña events as shown by labels in graph 1505.

FIG. 15C includes a graph 1550 presenting a time series comparison of the Niño-3.4 Index and Downward Longwave Radiation (DLR) for the period 1984 to 2004. The DLR values represent downward shortwave radiation reaching the Earth's surface and DLR-A values represent DLR anomaly defined with respect to the average monthly DLR for the period 1984-2004, in the Niño-3.4 region. The left vertical axis of graph 1550 shows DLR-A values in units of W m-2 and the time-series of the DLR-A values are illustrated with a solid line. On the right vertical axis, the broken line (1515) illustrates the time-series of the Niño-3.4 index in units of degree C. The Niño-3.4 index, based on sea surface temperature (SST), is widely used to identify El Niño and La Niña events. The strength of these events is measured by the three-month smoothed SST anomalies in the Niño-3.4 region of the equatorial Pacific. It can be observed that DLR-A values have a strong inverse correlation with Niño-3.4 index values. The higher values and peaks of the Niño-3.4 index values are closely aligned with El Niño events as shown by labels in graph 1550. While lower values of Niño-3.4 index values are closely aligned with La Niña events as shown by labels in graph 1550.

Features extracted from time series in FIGS. 15B and 15C are used to train the machine learning model for predicting increases in sea surface temperatures and for predicting decrease in sea surface temperatures. Further, the time series in FIGS. 15B and 15C are used to train the machine learning model to predict probability of occurrences of extreme climate events such as El Niño events and La Niña events.

Figure 16:
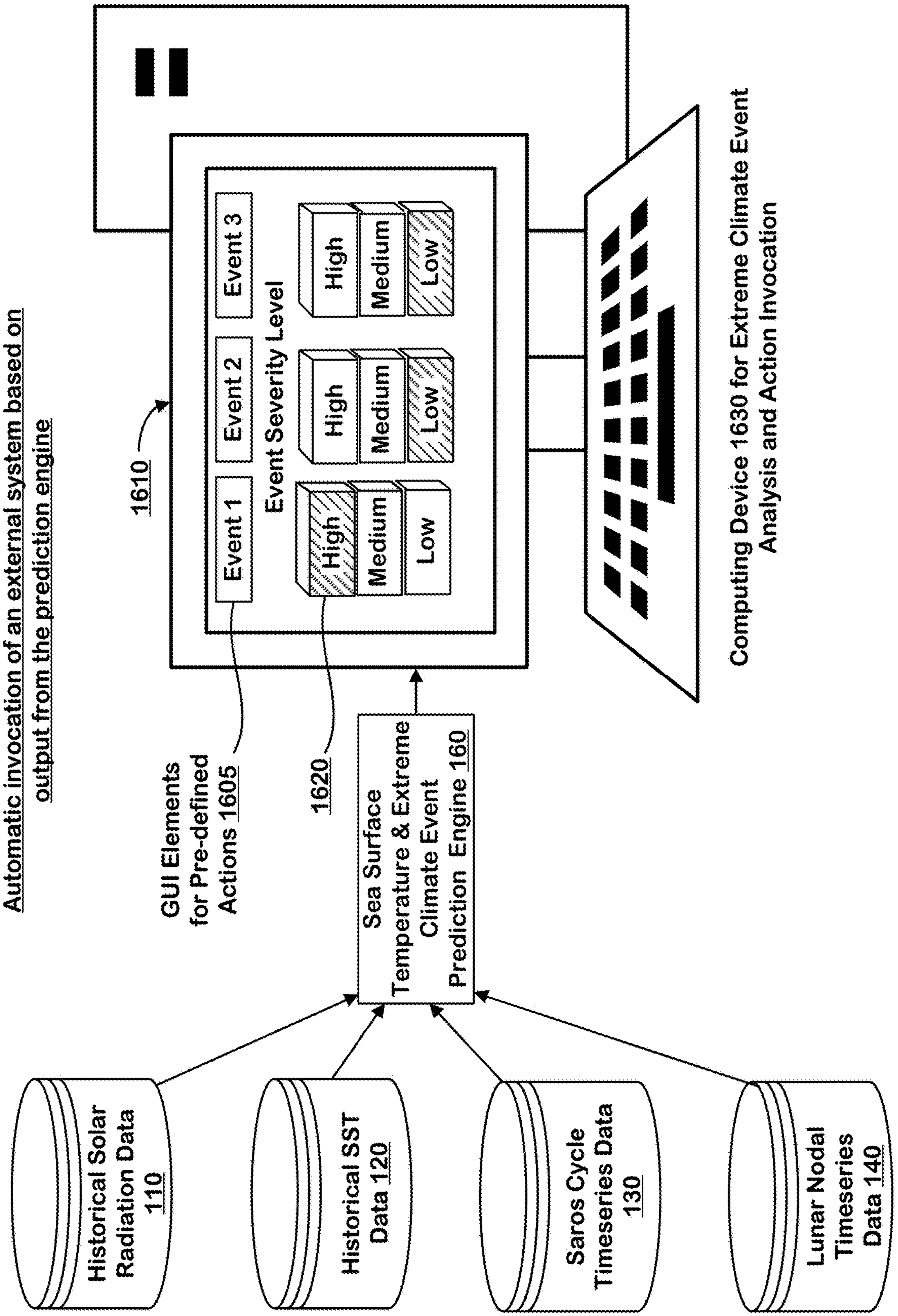
FIG. 16 presents an example implementation of the technology disclosed illustrating automatic invocation of an external system based on output from the prediction engine.

FIG. 16 presents an implementation of the technology disclosed in which output from the prediction engine 160 is used to invoke an external system. Examples of such external systems include a weather forecasting system, a climate forecasting system, a sea and/or air traffic control system, a freight management system, an operational emergency response system, an energy allocation system, an agricultural planning system, an economic futures and commodity management system, etc. Various types of data from historical solar radiation database 110, historical sea surface temperature database 120, Saros cycle time series database 130 and lunar nodal time series database 140 are provided as input to the prediction engine 160 for prediction of increase in SST, decrease in SST and/or occurrence of an extreme climate event in a predefined time interval. Further details of how the inputs are generated for the machine learning models (such as SST prediction model 175 and extreme climate event prediction model 190) are presented above with reference to FIGS. 1, 12A to 14C. The output 178 from the SST prediction model 175 and/or the output 195 from the extreme climate event prediction model 190 is provided as input to one or more external systems to automatically perform actions in dependence on the output value. FIG. 16 presents a computing device 1630 that includes logic to display a graphical user interface 1610 to present one or more outputs from the prediction engine 160. The one or more outputs can be the outputs from the SST prediction model 175 and/or the output from the extreme climate event prediction model 190. The technology disclosed includes logic to present these outputs in a graphical form indicating severity level of events such as high, medium and low categories as shown in graphical user interface 1610. One or more thresholds can be defined and based on those thresholds one or more graphical user interface elements can be automatically highlighted to indicate the value of the output. For example, a graphical user interface element 1620 is highlighted to indicate that the output value indicates a high category for event 1 (1605). A high category event can indicate a high probability of an increase in sea surface temperature for the predefined time interval, or it can indicate a high probability for decrease in sea surface temperature for the predefined time interval. The high category can also indicate a high probability of the occurrence of an extreme climate event in the predefined time interval. In dependence on the value of the outputs (e.g., 1620), a signal is automatically sent to an external system such as a weather forecasting system. The weather forecasting system can then use this information (such as the output value from the prediction engine 160) to generate or re-generate the weather forecast for the predefined time interval. In one implementation, a user interface element such as 1605 is selected to send the output value to the external system. In case the external system is a freight transportation management system, the external system generates an updated freight transportation plan using the one or more outputs from the prediction engine 160. In one instance, the external system can be an emergency response plan generation system. When this external system receives one or more outputs from the prediction engine, the emergency response plan generation system generates a new or an updated emergency response plan using one or more outputs from the prediction engine 160. Therefore, the outputs from the prediction engine 160 can cause invocation of various functions of external systems. Different thresholds can be identified for one or more outputs from the prediction engine 160. Different actions by the external systems can be invoked in dependence of the values of one or more outputs with respect to corresponding thresholds.

Figure 17A:
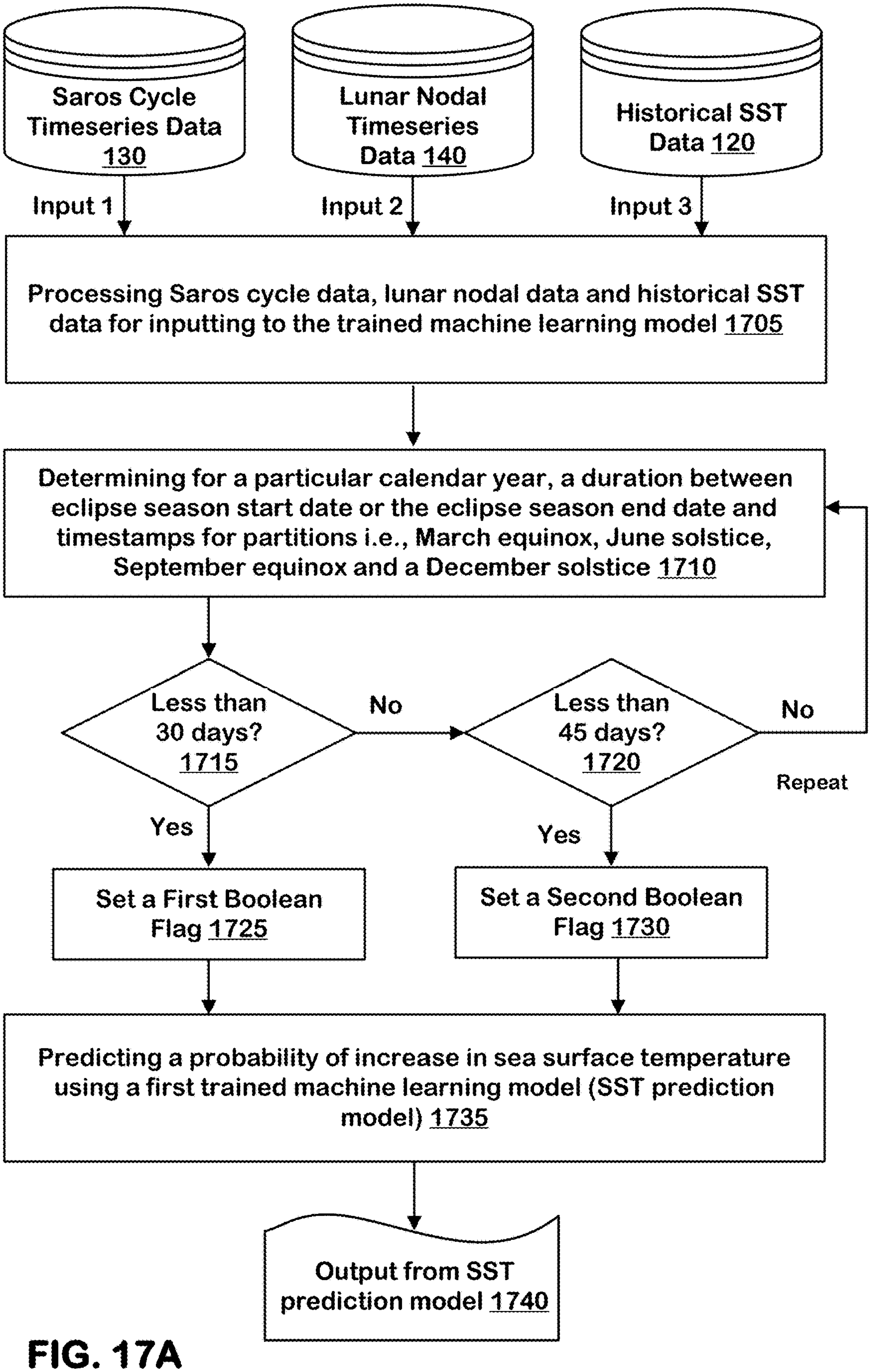
FIGS. 17A and 17B present an example process flow diagram comprising process operations to predict fluctuations in sea surface temperatures and to predict a probability of occurrence of extreme climate events.
Figure 17B:
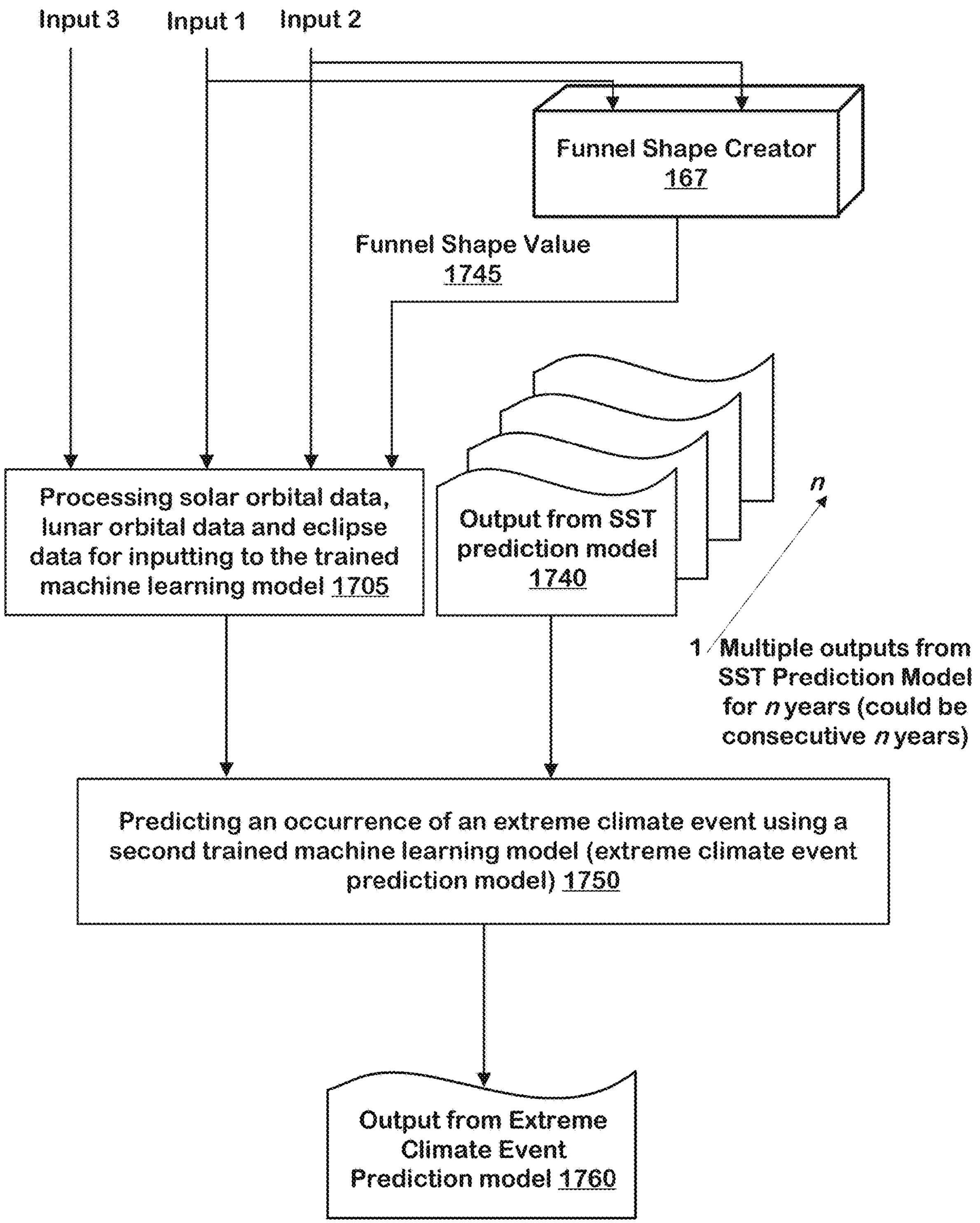

FIGS. 17A and 17B present an example process flow diagram comprising process operations to predict fluctuations in sea surface temperatures and to predict probability of occurrence of extreme climate events. The order of operations illustrated in the flow diagrams in FIGS. 17A and 17B is provided for the purposes of illustration, and can be modified to suit a particular implementation. Many of the operations, for example, can be executed in parallel. One or more operations in the flow diagrams in FIGS. 17A and 17B can be combined and performed together in a single operation. Similarly, one or more operations can be further divided into sub-operations that can be executed in parallel or in a serial manner. As with all flow diagrams (or flow charts) herein, it will be appreciated that many of the operations can be combined, performed in parallel or performed in a different sequence without affecting the functions achieved. In some cases, as the reader will appreciate, a re-arrangement of operations will achieve the same results only if certain other changes are made as well. In other cases, as the reader will appreciate, a re-arrangement of operations will achieve the same results only if certain conditions are satisfied. Furthermore, it will be appreciated that the process flow diagrams in FIGS. 17A and 17B show only operations that are pertinent to an understanding of the technology, and it will be understood that numerous additional operations for accomplishing other functions can be performed before, after and between those shown.

The process flow diagram (or process flow chart) in FIG. 17A starts with processing of time series data for input to the machine learning model (operation 1705). A plurality of time series data are provided as input to the processing operation (1705). In one implementation, three time series data including Saros cycle time series data 130, lunar nodal time series data 140 and historical sea surface temperature (SST) time series data (120) are provided as input to the processing operation 1705. The Saros cycle time series data can include the lunar and solar eclipse data. The data processing operation includes cleaning the data and organizing the data for further processing in the following operations. At an operation 1710, the duration between eclipse season start date and/or the eclipse season end date and the timestamp for a particular partition is determined. In one implementation, the partitions are the March equinox ($21^{st}$ of March), June solstice ($21^{st}$ of June), September equinox ($21^{st}$ of September) and December solstice ($21^{st}$ of December). The duration calculated in the operation 1710 is then compared with a first threshold (i.e., thirty days) at an operation 1715. If the duration is less than thirty days, then a first Boolean flag is set as true at an operation 1725. Otherwise, if the duration calculated at the operation 1710 is greater than thirty days but less than forty-five days i.e., a second threshold (operation 1720) then a second Boolean flag is set as true at an operation 1730. It is understood that the value of the first threshold can be set as less than thirty days or greater than thirty days. Similarly, the value of the second threshold can be set as less than forty-five days or greater than forty-five days. If the duration as calculated in the operation 1710 is greater than the second threshold then the process operation 1710 is repeated. In one implementation, the repeat of operation 1710 can be performed using another calendar year or another time period that is less than a calendar year or greater than a calendar year.

In one implementation, a first machine learning model is used to predict the probability of an increase in sea surface temperature at an operation 1735. The first Boolean flag and/or the second Boolean flag are provided as input to the first machine learning model. In one implementation, the first machine learning model is trained to predict decrease in sea surface temperature at the operation 1735. The output from the first machine learning model is shown in the flow diagram on FIG. 17A with a label 1740. Additional inputs can be provided to the first machine learning model at an operation 1735.

The process flow diagram in FIG. 17B presents operations for predicting a probability of occurrence of an extreme climate event using a second machine learning model. In one implementation, a plurality of outputs 1740 from the first machine learning model (as shown in FIG. 17A) are provided as input to the second machine learning model. The outputs 1740 can be for n consecutive years. For example, the outputs 1740 can be for two, three, four, five, six or more consecutive years. In one implementation, the outputs 1740 can be for time periods that are less than a calendar year. For example, the outputs 1740 can correspond to six-month durations. Such durations of time can be consecutive time periods in a plurality of calendar years. It is understood that the outputs from the first machine learning model can be for any time period less than six months or greater than six months. In addition, a value (1745) of the funnel shape indicator is provided as input to the trained machine learning model for predicting the probability of occurrence of an extreme climate event. The funnel shape creator 167 includes logic to generate the value (1745) of the funnel shape in dependence on Saros cycle time series data (input 1) and lunar nodal time series data (input 2). Details of how the value of the funnel shape indicator is determined are presented above with reference to FIGS. 14A, 14B and 14C. The funnel shape indicator value (1745) can be provided as input to the operation 1705 that processes input data for the machine learning model and transforms the input data in an appropriate form that can be accepted by the machine learning for predicting a probability of occurrence of an extreme climate event.

The plurality of outputs 1740 and the output from operation 1705 as described with reference to FIG. 17A are provided as input to the second machine learning model at an operation 1750. The operation 1750 includes predicting by a second trained machine learning model predicting an occurrence of an extreme climate event. The output 1760 from the second trained machine learning model includes a probability of occurrence of an extreme climate event i.e., El Niño or La Niña event.

In one implementation, a single trained machine learning model is used to predict an extreme climate event i.e., El Niño or La Niña event instead of a two separate trained machine learning models as described above with reference to FIGS. 17A and 17B. In such an implementation, the trained machine learning model is provided as input, the first and/or the second Boolean flag.

Example of a Machine Learning Model

Figure 18A:
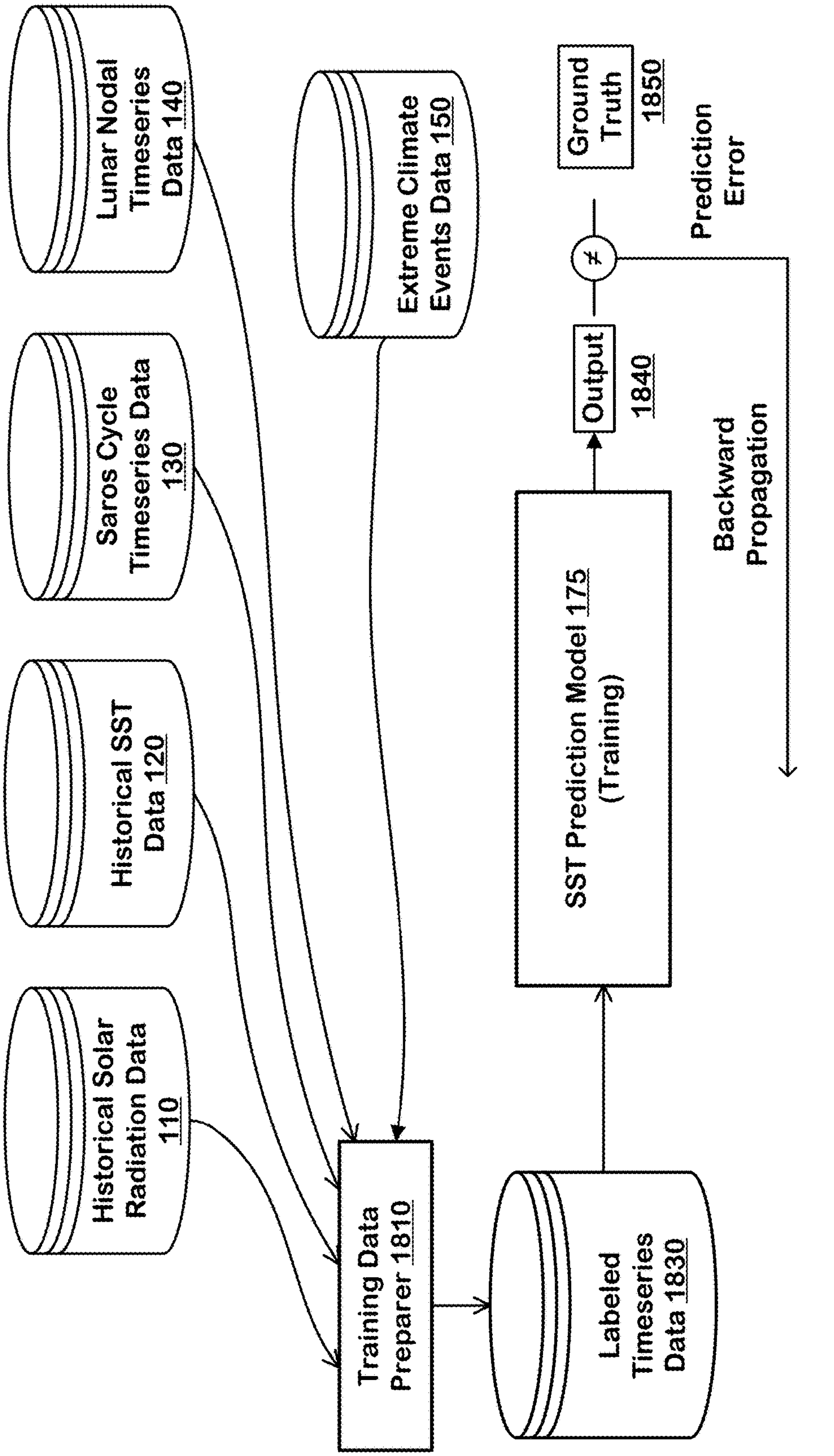
FIG. 18A presents an example high-level architecture to train a machine learning model to predict an increase in sea surface temperature.

FIG. 18A presents a high-level architecture for training the machine learning model. A training data preparer 1810 includes logic to prepare labeled time series data that is stored in the labeled time series database 1830 (also referred to as labeled training database). The labeled training data from the training database 1830 is used to train the machine learning model 175. In one implementation, labeled time series data for a hundred years is used to train the machine learning model. Training data for more than a hundred years can be used to train the machine learning model. The training data includes Saros cycle time series data 130 and lunar nodal time series data 140. The training data examples include historical sea surface temperature time series data from the historical SST database 120. The training data also includes extreme climate events data time series from the extreme climate events database 150. The training data preparer 1810 includes logic to extract time series data from the various databases 110, 120, 130, 140 and 150. The training data aligns the various time series data temporally and labels the time series with occurrences of extreme climate events. Labeled time series data is stored in a labeled time series database 1830 for input to the machine learning model during training phase of the model. FIG. 18A illustrates training of the SST prediction model 175, however similar process and labeled data is used for extreme climate event prediction machine learning model.

During training, the output (1840) from the machine learning model 175 is compared with ground truth labels (1850) and a prediction error is calculated. During backward propagation, the weights of the machine learning model are adjusted to reduce the prediction error. The trained machine learning model is then used for predicting the probability of an increase in sea surface temperatures for a given time period.

The technology disclosed can use a variety of machine learning models for predicting a probability of increase in sea surface temperature or for predicting a probability of decrease in sea surface temperature. Similarly, the technology disclosed can use a variety of machine learning models for predicting a probability of occurrence of extreme climate events. These models can be trained using labeled training data 1830. As more data is collected, the size of the training data increases. Machine learning models such as gradient boosted trees, random forest, recurrent neural networks (RNNs), long short-term memory (LSTM) networks, combination of convolutional neural networks (CNNs) for feature extraction with LSTMs to incorporate temporal information have been used to implement the technology disclosed. Principal Component Analysis (PCA) has been used by the technology disclosed for selecting features that have high impact on the probability of an increase in sea surface temperature or for predicting a probability of decrease in sea surface temperature or for predicting the probability of occurrence of extreme climate events. In the following paragraphs, we present examples of training a particular machine learning model for illustration purposes.

Figure 18B:
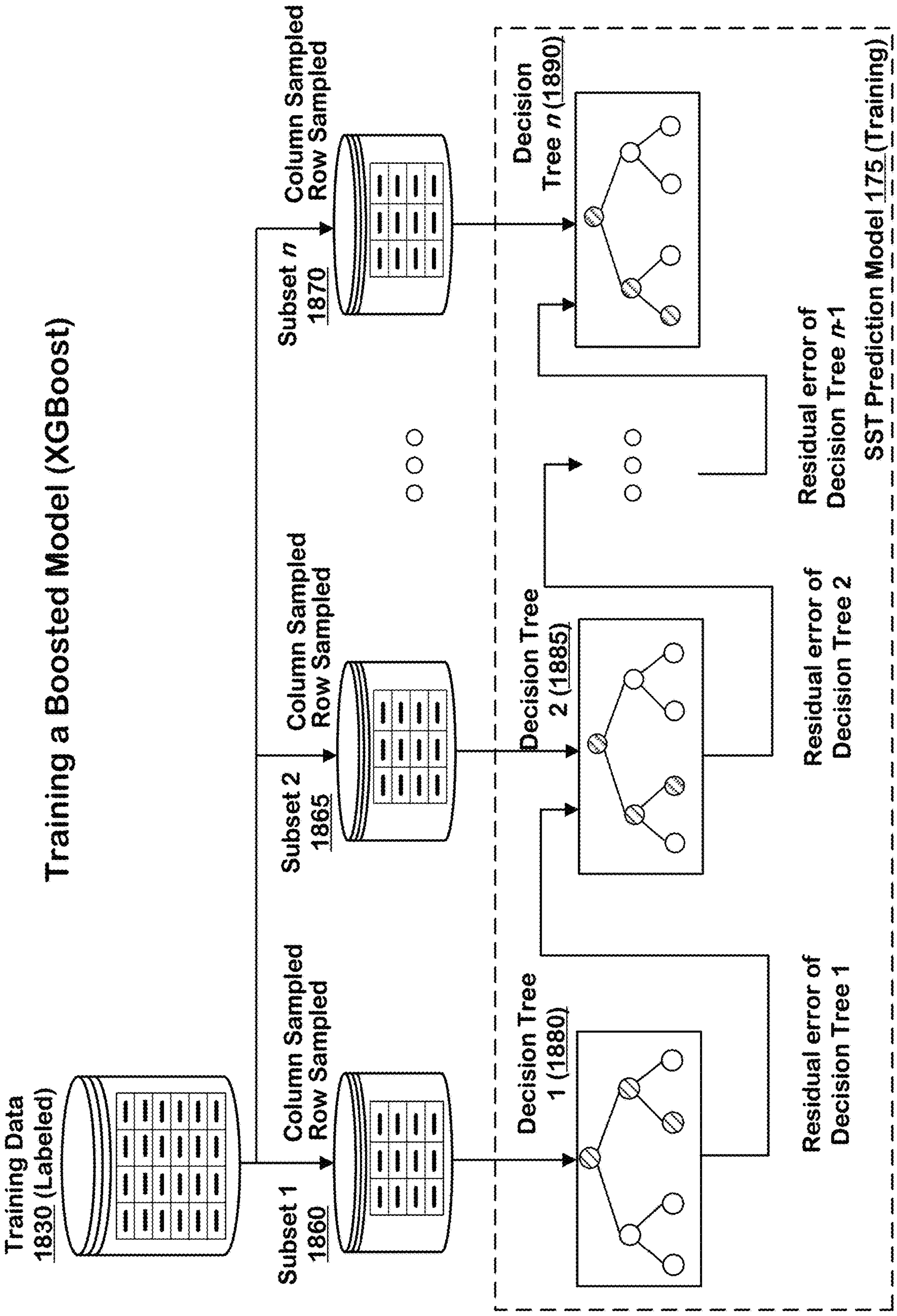
FIG. 18B presents training of a boosted tree model to predict an increase in sea surface temperature.

Details of training a gradient boosted trees (XGBoost) model for predicting a probability of increase in sea surface temperature or for predicting a probability of decrease in sea surface temperature or for predicting the probability of occurrence of extreme climate events are presented with reference to FIG. 18B for illustration purposes. Gradient boosted trees (also referred to as gradient boosted decision trees) is an ensemble machine learning technique that sequentially combines the predictions of multiple simple (or weak) learners or models. XGBoost attempts to improve the overall predictive performance by optimizing a model's weights based on the errors of previous iterations, gradually reducing prediction errors and enhancing the prediction accuracy.

We briefly describe the hyperparameters and their ranges selected for training the XGBoost model. As more experiments are conducted, the ranges of the hyperparameters can change.

Learning rate is an important hyperparameter of XGBoost model. The predictions of simple models (or weak learners) are summed (or added) together sequentially. In XGBoost, the weak learners are often decision trees. The contribution of each decision tree to the sum can be weighted to slow down the learning by the model. This weighting is called shrinkage or the learning rate. Smaller values of learning rate (close to zero) decrease the contribution of a weak learner in the ensemble. This requires building more decision trees and therefore increases the time to train the model. However, the final model is strong and resistant to overfitting. The range of learning rate values used for training the XGBoost is from 0.01 to 0.5.

The number of decision trees is another hyperparameter and is often referred to as number of estimators (n_estimators) or number of boosting rounds. The value of this hyperparameter determines the number of trees to build in the ensemble model. Higher number of trees can result in a stronger model as more trees allow the model to capture more patterns in the data. However, this can also increase the chances of overfitting. The range of values used for the number of estimators hyperparameter is between five hundred (500) and two thousand (2000).

The max depth (or maximum depth) hyperparameter controls the number of levels in each weak learner or decision tree. For example, a max depth of three (3) means that there are three levels in the tree including the leaf level. Deeper trees are more complex and computationally expensive. The max depth values for our XGBoost models range from four (4) to eight (8).

Subsampling (or row subsampling) hyperparameter determines the number of data samples (or rows) from the training data used to train each decision tree. A subsampling rate of less than one indicates that fewer data samples are randomly selected to train the model. The row subsample of 0.6 to 1 is used to train the XGBoost model.

Feature subsampling (or column subsampling) hyperparameter determines the number of features or columns that are selected for training a decision tree. XGBoost model is suitable when training data is arranged in tabular format. For large datasets with many features, we may want to reduce the number of features used for training a decision tree. The column subsample for the decision tree is selected in a range from 0.6 to 1.

Alpha regularization hyperparameter adds a penalty term to the loss function to reduce overfitting. Alpha hyperparameter is the L1 regularization term on model weights. When training an XGBoost model, we start with smaller values of alpha regularization and gradually increase until no further improvement in performance is achieved. We used alpha regularization values in a range from 0.01 to 1.

Lambda regularization hyperparameter also adds a penalty term to the loss function to reduce overfitting. Lambda hyperparameter is the L2 regularization term on model weights. We used lambda regularization values in a range from 0.01 to 1.

The objective hyperparameter is the loss function to be minimized. We have used root mean squared log error (RMSLE). RMSLE incurs larger penalty for the underestimation of the actual variable than overestimation. More penalty is incurred when predicted value is less than the actual value and less penalty is incurred when predicted value is more than the actual value.

FIG. 18B presents a high-level overview of training the XGBoost model for predicting fluctuations (i.e., increase or decrease) in average sea surface temperature or for predicting probability of occurrence of an extreme climate event. Separate models are trained for predicting increase in sea surface temperature, for predicting a probability of decrease in sea surface temperature and for predicting the probability of occurrence of extreme climate events. Gradient boosted trees (or XGBoost) is an ensemble machine learning model and it uses boosting to train simple models (such as decision trees) in a sequential manner. Each decision tree learns from the mistakes of the previous model in the sequence of models. Due to sequential connections, boosted models are slow to learn but they perform better.

Using the selected hyperparameter values for rows and column subsampling, smaller datasets or subsets are generated for training the learners or decision trees. For example, a subset 1 (1860) is selected from the labeled training database 1830 for input to the first decision tree (1880). The error from the first decision tree (1880) is passed to the second decision tree (1885). The second decision tree receives a subset 2 (1865) from the training database 1 830. The second decision tree (1885) then attempts to fit to the residuals of the first decision tree so that it improves the performance of the model overall. The process is repeated with the nth decision tree (1890) that receives a subset n (1870) from the training database 1830. The trained model 175 can then be used for predicting an increase in SST, decrease in SST or occurrence of an extreme climate event.

In one implementation, the machine learning model as shown in FIG. 18B is trained using up to one million examples (or samples). The machine learning model can perform well even when trained with smaller data sets including up to a hundred or more samples. The training data is split for training and validation. Around 20 percent of the training data is used for validation. It is understood that the size of the training data can increase as more data is collected. The various time series data can be combined in one table. This combined tabular data is then used for training the model as shown in FIG. 18B. Different rows and features (columns) can be selected for training different decision trees in the model. Similarly, this tabular data can be used for predictions. The machine learning model can be trained to predict an increase in SST, decrease in SST or the occurrence of an extreme climate event at any time in future.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure peri-odically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology dis-closed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

First Set

1. A computer-implemented method of predicting an increase in sea surface temperature, the method including:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of increase in the average sea surface temperature for a predefined time interval in the particular calendar year; and invoking a weather prediction system when a value of the probability of increase in the average sea surface temperature is above a pre-defined threshold to regenerate forecast for the predefined time interval in dependence on the value of the probability of increase in the average sea surface temperature.

2. The computer-implemented method of clause 1, wherein the setting of the value of the first Boolean flag is performed when at least one of the eclipse season start date and the eclipse season end date in the particular calendar year occurs in a period of forty five days preceding the timestamp for the particular partition in the plurality of partitions segmenting the particular calendar year.

3. The computer-implemented method of clause 1, wherein a duration of the predefined time interval ranges from one minute to one year.

4. The computer-implemented method of clause 1, wherein the trained machine learning model is trained to assign (a higher) at least a 2× (double) weightage to the value of the first Boolean flag for the predicting of the probability of increase in the average sea surface temperature when a difference between the eclipse season start date and the timestamp for the particular partition in the plurality of partitions is less than a predefined threshold.

5. The computer-implemented method of clause 1, further including:

inputting a plurality of predicted probability of increase in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of increase in the average sea surface temperature values as predicted by the trained machine learning model corresponding to the plurality of calendar years are above a second pre-defined threshold; and predicting, using the second trained machine learning model, a probability of occurrence of the extreme climate event following the plurality of calendar years in the eighteen-year Saros Cycle.

6. The computer-implemented method of clause 5, wherein the predicting the probability of occurrence of the extreme climate event is performed for a predefined time interval following the plurality of calendar years in the eighteen-year Saros Cycle.

7. The computer-implemented method of clause 1, wherein the plurality of partitions segmenting the particular calendar year include at least a March equinox, a June solstice, a September equinox and a December solstice.

8. The computer-implemented method of clause 1, further including:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

9. The computer-implemented method of clause 8, wherein the setting the value of the second Boolean flag is performed when the at least one of the eclipse season start date and the eclipse season end date in the particular calendar year occurs in a period of forty five days succeeding the timestamp for the particular partition in the plurality of partitions segmenting the particular calendar year.

10. The computer-implemented method of clause 1, further including:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

11. The computer-implemented method of clause 8, further including:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

12. The computer-implemented method of clause 1, further including:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

13. The computer-implemented method of clause 1, further including:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

14. The computer-implemented method of clause 1, further including:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

15. The computer-implemented method of clause 1, further including:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

16. The computer-implemented method of clause 1, further including:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

17. The computer-implemented method of clause 16, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

18. The computer-implemented method of clause 16, wherein the value of the funnel shape indicator is at least one of an opened-shaped funnel and a closed-shaped funnel.

19. A system including one or more processors coupled to memory, the memory loaded with computer instructions to predict an increase in sea surface temperature, the instructions, when executed on the processors, implement actions comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of increase in the average sea surface temperature for a predefined time interval in the particular calendar year; and invoking a weather prediction system when a value of the probability of increase in the average sea surface temperature is above a pre-defined threshold to regenerate forecast for the predefined time interval in dependence on the value of the probability of increase in the average sea surface temperature.

20. The system of clause 19, wherein the setting of the value of the first Boolean flag is performed when at least one of the eclipse season start date and the eclipse season end date in the particular calendar year occurs in a period of forty-five days preceding the timestamp for the particular partition in the plurality of partitions segmenting the particular calendar year.

21. The system of clause 19, wherein a duration of the predefined time interval ranges from one minute to one year.

22. The system of clause 19, wherein the trained machine learning model is trained to assign (a higher) at least a 2× (double) weightage to the value of the first Boolean flag for the predicting of the probability of increase in the average sea surface temperature when a difference between the eclipse season start date and the timestamp for the particular partition in the plurality of partitions is less than a predefined threshold.

23. The system of clause 19, further implementing actions comprising:

inputting a plurality of predicted probability of increase in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of increase in the average sea surface temperature values as predicted by the trained machine learning model corresponding to the plurality of calendar years are above a second pre-defined threshold; and predicting, using the second trained machine learning model, a probability of occurrence of the extreme climate event following the plurality of calendar years in the eighteen-year Saros Cycle.

24. The system of clause 23, wherein the predicting the probability of occurrence of the extreme climate event is performed for a predefined time interval following the plurality of calendar years in the eighteen-year Saros Cycle.

25. The system of clause 19, wherein the plurality of partitions segmenting the particular calendar year include at least a March equinox, a June solstice, a September equinox and a December solstice.

26. The system of clause 19, further implementing actions comprising:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

27. The system of clause 26, wherein the setting the value of the second Boolean flag is performed when the at least one of the eclipse season start date and the eclipse season end date in the particular calendar year occurs in a period of forty-five days succeeding the timestamp for the particular partition in the plurality of partitions segmenting the particular calendar year.

28. The system of clause 19, further implementing actions comprising:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

29. The system of clause 26, further implementing actions comprising:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

30. The system of clause 19, further implementing actions comprising:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

31. The system of clause 19, further implementing actions comprising:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

32. The system of clause 19, further implementing actions comprising:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

33. The system of clause 19, further implementing actions comprising:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

34. The system of clause 19, further implementing actions comprising:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

35. The system of clause 34, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

36. The system of clause 34, wherein the value of the funnel shape indicator is at least one of an opened-shaped funnel and a closed-shaped funnel.

37. A non-transitory computer readable storage medium impressed with computer program instructions to predict an increase in sea surface temperature, the instructions, when executed on a processor, implement a method, of a server node, comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of increase in the average sea surface temperature for a predefined time interval in the particular calendar year; and invoking a weather prediction system when a value of the probability of increase in the average sea surface temperature is above a pre-defined threshold to regenerate forecast for the predefined time interval in dependence on the value of the probability of increase in the average sea surface temperature.

38. The non-transitory computer readable storage medium of clause 37, wherein the setting of the value of the first Boolean flag is performed when at least one of the eclipse season start date and the eclipse season end date in the particular calendar year occurs in a period of forty-five days preceding the timestamp for the particular partition in the plurality of partitions segmenting the particular calendar year.

39. The non-transitory computer readable storage medium of clause 37, wherein a duration of the predefined time interval ranges from one minute to one year.

40. The non-transitory computer readable storage medium of clause 37, wherein the trained machine learning model is trained to assign (a higher) at least a 2× (double) weightage to the value of the first Boolean flag for the predicting of the probability of increase in the average sea surface temperature when a difference between the eclipse season start date and the timestamp for the particular partition in the plurality of partitions is less than a predefined threshold.

41. The non-transitory computer readable storage medium of clause 37, implementing the method further comprising:

inputting a plurality of predicted probability of increase in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of increase in the average sea surface temperature values as predicted by the trained machine learning model corresponding to the plurality of calendar years are above a second pre-defined threshold; and predicting, using the second trained machine learning model, a probability of occurrence of the extreme climate event following the plurality of calendar years in the eighteen-year Saros Cycle.

42. The non-transitory computer readable storage medium of clause 41, wherein the predicting the probability of occurrence of the extreme climate event is performed for a predefined time interval following the plurality of calendar years in the eighteen-year Saros Cycle.

43. The non-transitory computer readable storage medium of clause 37, wherein the plurality of partitions segmenting the particular calendar year include at least a March equinox, a June solstice, a September equinox and a December solstice.

44. The non-transitory computer readable storage medium of clause 37, implementing the method further comprising:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

45. The non-transitory computer readable storage medium of clause 44, wherein the setting the value of the second Boolean flag is performed when the at least one of the eclipse season start date and the eclipse season end date in the particular calendar year occurs in a period of forty five days succeeding the timestamp for the particular partition in the plurality of partitions segmenting the particular calendar year.

46. The non-transitory computer readable storage medium of clause 37, implementing the method further comprising:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

47. The non-transitory computer readable storage medium of clause 44, implementing the method further comprising:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

48. The non-transitory computer readable storage medium of clause 37, implementing the method further comprising:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

49. The non-transitory computer readable storage medium of clause 37, implementing the method further comprising:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

50. The non-transitory computer readable storage medium of clause 37, implementing the method further comprising:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

51. The non-transitory computer readable storage medium of clause 37, implementing the method further comprising:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

52. The non-transitory computer readable storage medium of clause 37, implementing the method further comprising:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

53. The non-transitory computer readable storage medium of clause 52, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

54. The non-transitory computer readable storage medium of clause 52, wherein the value of the funnel shape indicator is at least one of an opened-shaped funnel and a closed-shaped funnel.

Second Set

55. A computer-implemented method of predicting a decrease in sea surface temperature, the method including:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of decrease in the average sea surface temperature for a predefined time interval in the particular calendar year; and invoking a weather prediction system when a value of the probability of decrease in the average sea surface temperature is above a pre-defined threshold to regenerate forecast for the predefined time interval in dependence on the value of the probability of decrease in the average sea surface temperature.

56. The computer-implemented method of clause 55, wherein the setting of the value of the first Boolean flag is performed when at least one of the eclipse season start date and the eclipse season end date in the particular calendar year occurs in a period of forty-five days preceding the timestamp for the particular partition in the plurality of partitions segmenting the particular calendar year.

57. The computer-implemented method of clause 55, wherein a duration of the predefined time interval ranges from one minute to one year.

58. The computer-implemented method of clause 55, wherein the trained machine learning model is trained to assign (a higher) at least a 2× (double) weightage to the value of the first Boolean flag for the predicting of the probability of decrease in the average sea surface temperature when a difference between the eclipse season start date and the timestamp for the particular partition in the plurality of partitions is less than a predefined threshold.

59. The computer-implemented method of clause 55, further including:

inputting a plurality of predicted probability of decrease in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of decrease in the average sea surface temperature values as predicted by the trained machine learning model corresponding to the plurality of calendar years are below a second pre-defined threshold; and predicting, using the second trained machine learning model, a probability of occurrence of the extreme climate event following the plurality of calendar years in the eighteen-year Saros Cycle.

60. The computer-implemented method of clause 59, wherein the predicting the probability of occurrence of the extreme climate event is performed for a predefined time interval following the plurality of calendar years in the eighteen-year Saros Cycle.

61. The computer-implemented method of clause 55, wherein the plurality of partitions segmenting the particular calendar year include at least a March equinox, a June solstice, a September equinox and a December solstice.

62. The computer-implemented method of clause 55, further including:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

63. The computer-implemented method of clause 62, wherein the setting the value of the second Boolean flag is performed when the at least one of the eclipse season start date and the eclipse season end date in the particular calendar year occurs in a period of forty-five days succeeding the timestamp for the particular partition in the plurality of partitions segmenting the particular calendar year.

64. The computer-implemented method of clause 55, further including:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

65. The computer-implemented method of clause 62, further including:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

66. The computer-implemented method of clause 55, further including:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

67. The computer-implemented method of clause 55, further including:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

68. The computer-implemented method of clause 55, further including:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

69. The computer-implemented method of clause 55, further including:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

70. The computer-implemented method of clause 55, further including:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

71. The computer-implemented method of clause 70, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

72. The computer-implemented method of clause 70, wherein the value of the funnel shape indicator is at least one of an opened-shaped funnel and a closed-shaped funnel.

73. A system including one or more processors coupled to memory, the memory loaded with computer instructions to predict a decrease in sea surface temperature, the instructions, when executed on the processors, implement actions comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of decrease in the average sea surface temperature for a predefined time interval in the particular calendar year; and invoking a weather prediction system when a value of the probability of decrease in the average sea surface temperature is above a pre-defined threshold to regenerate forecast for the predefined time interval in dependence on the value of the probability of decrease in the average sea surface temperature.

74. The system of clause 73, wherein the setting of the value of the first Boolean flag is performed when at least one of the eclipse season start date and the eclipse season end date in the particular calendar year occurs in a period of forty-five days preceding the timestamp for the particular partition in the plurality of partitions segmenting the particular calendar year.

75. The system of clause 73, wherein a duration of the predefined time interval ranges from one minute to one year.

76. The system of clause 73, wherein the trained machine learning model is trained to assign (a higher) at least a 2× (double) weightage to the value of the first Boolean flag for the predicting of the probability of decrease in the average sea surface temperature when a difference between the eclipse season start date and the timestamp for the particular partition in the plurality of partitions is less than a predefined threshold.

77. The system of clause 73, further implementing actions comprising:

inputting a plurality of predicted probability of decrease in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of decrease in the average sea surface temperature values as predicted by the trained machine learning model corresponding to the plurality of calendar years are below a second pre-defined threshold; and predicting, using the second trained machine learning model, a probability of occurrence of the extreme climate event following the plurality of calendar years in the eighteen-year Saros Cycle.

78. The system of clause 77, wherein the predicting the probability of occurrence of the extreme climate event is performed for a predefined time interval following the plurality of calendar years in the eighteen-year Saros Cycle.

79. The system of clause 73, wherein the plurality of partitions segmenting the particular calendar year include at least a March equinox, a June solstice, a September equinox and a December solstice.

80. The system of clause 73, further implementing actions comprising:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

81. The system of clause 80, wherein the setting the value of the second Boolean flag is performed when the at least one of the eclipse season start date and the eclipse season end date in the particular calendar year occurs in a period of forty-five days succeeding the timestamp for the particular partition in the plurality of partitions segmenting the particular calendar year.

82. The system of clause 73, further implementing actions comprising:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

83. The system of clause 73, further implementing actions comprising:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

84. The system of clause 73, further implementing actions comprising:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

85. The system of clause 73, further implementing actions comprising:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

86. The system of clause 73, further implementing actions comprising:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

87. The system of clause 73, further implementing actions comprising:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

88. The system of clause 73, further implementing actions comprising:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

89. The system of clause 88, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

90. The system of clause 88, wherein the value of the funnel shape indicator is at least one of an opened-shaped funnel and a closed-shaped funnel.

91. A non-transitory computer readable storage medium impressed with computer program instructions to predict a decrease in sea surface temperature, the instructions, when executed on a processor, implement a method, of a server node, comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag;

wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle;

predicting, using the trained machine learning model, a probability of decrease in the average sea surface temperature for a predefined time interval in the particular calendar year; and invoking a weather prediction system when a value of the probability of decrease in the average sea surface temperature is above a pre-defined threshold to regenerate forecast for the predefined time interval in dependence on the value of the probability of decrease in the average sea surface temperature.

92. The non-transitory computer readable storage medium of clause 91, wherein the setting of the value of the first Boolean flag is performed when at least one of the eclipse season start date and the eclipse season end date in the particular calendar year occurs in a period of forty-five days preceding the timestamp for the particular partition in the plurality of partitions segmenting the particular calendar year.

93. The non-transitory computer readable storage medium of clause 91, wherein a duration of the predefined time interval ranges from one minute to one year.

94. The non-transitory computer readable storage medium of clause 91, wherein the trained machine learning model is trained to assign (a higher) at least a 2× (double) weightage to the value of the first Boolean flag for the predicting of the probability of decrease in the average sea surface temperature when a difference between the eclipse season start date and the timestamp for the particular partition in the plurality of partitions is less than a predefined threshold.

95. The non-transitory computer readable storage medium of clause 91, implementing the method further comprising:

inputting a plurality of predicted probability of decrease in the average sea surface temperature values as predicted by the trained machine learning model corresponding to a plurality of calendar years in the eighteen-year Saros Cycle to a second trained machine learning model;

wherein the second trained machine learning model is trained using the plurality of time series data to predict a probability of an extreme climate event when the plurality of predicted probability of decrease in the average sea surface temperature values as predicted by the trained machine learning model corresponding to the plurality of calendar years are below a second pre-defined threshold; and predicting, using the second trained machine learning model, a probability of occurrence of the extreme climate event following the plurality of calendar years in the eighteen-year Saros Cycle.

96. The non-transitory computer readable storage medium of clause 95, wherein the predicting the probability of occurrence of the extreme climate event is performed for a predefined time interval following the plurality of calendar years in the eighteen-year Saros Cycle.

97. The non-transitory computer readable storage medium of clause 91, wherein the plurality of partitions segmenting the particular calendar year include at least a March equinox, a June solstice, a September equinox and a December solstice.

98. The non-transitory computer readable storage medium of clause 91, implementing the method further comprising:

setting a value of a second Boolean flag when at least one of the eclipse season start date and the eclipse season end date in the particular calendar year occurs in a period of thirty days succeeding a timestamp for the particular partition in the plurality of partitions segmenting the particular calendar year; and the inputting to the trained machine learning model further includes, inputting the second Boolean flag.

99. The non-transitory computer readable storage medium of clause 98, wherein the setting the value of the second Boolean flag is performed when the at least one of the eclipse season start date and the eclipse season end date in the particular calendar year occurs in a period of forty five days succeeding the timestamp for the particular partition in the plurality of partitions segmenting the particular calendar year.

100. The non-transitory computer readable storage medium of clause 91, implementing the method further comprising:

determining, a first time interval, between occurrence of the least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a selected time interval that is shorter in duration than the other time interval; and the inputting, further includes, providing the selected time interval as input to the trained machine learning model.

101. The non-transitory computer readable storage medium of clause 91, implementing the method further comprising:

determining, a third time interval, between occurrence of the least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a selected time interval that is shorter in duration than the other time interval; and the inputting, further includes, providing the selected time interval as input to the trained machine learning model.

102. The non-transitory computer readable storage medium of clause 91, implementing the method further comprising:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

103. The non-transitory computer readable storage medium of clause 91, implementing the method further comprising:

determining, for the particular calendar year, respective distances between the Moon and the Earth for each lunar perigee and each lunar apogee wherein the lunar perigee is a point in the lunar orbit where the Moon is positioned nearest to the Earth and the lunar apogee is a point in the lunar orbit where the Moon is positioned farthest from the Earth; and the inputting further includes providing, as input to the trained machine learning model, the determined respective distances between the Moon and the Earth for each lunar perigee and each lunar apogee in the particular calendar year and respective timestamps for lunar perigee and each lunar apogee in the particular calendar year.

104. The non-transitory computer readable storage medium of clause 91, implementing the method further comprising:

determining, for the particular calendar year, a plurality of distances between the Moon and the Earth corresponding to occurrence of plurality of lunar eclipses in the particular calendar year; and the inputting further includes providing, as input to the trained machine learning model, the determined plurality of distances between the Moon and the Earth.

105. The non-transitory computer readable storage medium of clause 91, implementing the method further comprising:

determining, for the particular calendar year, a plurality of distances between the Moon and the Earth corresponding to occurrence of plurality of solar eclipses in the particular calendar year; and the inputting further includes providing, as input to the trained machine learning model, the determined plurality of distances between the Moon and the Earth.

106. The non-transitory computer readable storage medium of clause 91, implementing the method further comprising:

inputting to the trained machine learning model a value of a funnel shape indicator determined by a formation of two overlapping sinusoidal waves that are out of phase by 180 degrees wherein the sinusoidal waves are generated using a plurality of positions of the Moon with respect to the position of the Earth at occurrences of a plurality of Solar Eclipses and a plurality of Lunar Eclipses in the eighteen-year Saros Cycle, wherein the trained machine learning model is trained using a second plurality of time series data, a particular time series data in the second plurality of time series data comprises (i) a plurality of values of the funnel shape indicator and corresponding timestamps (ii) a plurality of values indicating an occurrence of an extreme climate event; and predicting, using the trained machine learning model, a probability of occurrence of the extreme climate event.

107. The non-transitory computer readable storage medium of clause 106, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

108. The non-transitory computer readable storage medium of clause 106, wherein the value of the funnel shape indicator is at least one of an opened-shaped funnel and a closed-shaped funnel.

Third Set

109. A computer-implemented method of predicting an extreme climate event, the method including:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag and a value of a funnel shape indicator determined by a formation of at least two overlapping sinusoidal waves that are out of phase by 180 degrees, wherein the sinusoidal waves are generated using a plurality of lunar orbit characteristics identifying a position of the Moon in space and time with respect to the position of the Earth at occurrences of a plurality of solar eclipses and a plurality of lunar eclipses in respective plurality of eclipse seasons and wherein the trained machine learning model is trained using a plurality of time series data, a particular time series data in the plurality of time series data comprises (1) a plurality of timestamps corresponding to respective plurality of solar eclipses and a plurality of timestamps corresponding to respective plurality of lunar eclipses in an eighteen-year (18 years) Saros Cycle, (2) a plurality of timestamps corresponding to the plurality of partitions segmenting respective plurality of calendar years in the eighteen-year (18 years) Saros Cycle (3) a plurality of values of respective funnel shape indicators and corresponding timestamps (4) a plurality of values indicating an occurrence of an extreme climate event; and predicting, using the trained machine learning model, a probability of occurrence of the extreme climate event in a predefined time interval in the particular calendar year; and invoking a weather prediction system, when a value of the probability of occurrence of the extreme climate event in the predefined time interval is above a predefined threshold, to regenerate forecast for the predefined time interval in dependence on the value of the probability of occurrence of the extreme climate event.

110. The computer-implemented method of clause 109, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

111. The computer-implemented method of clause 109, wherein the lunar orbit characteristics identifying the position of the Moon in space and time with respect to the position of the Earth further include identifying the Moon as at least one of a New Moon and a Full Moon.

112. The computer-implemented method of clause 109, wherein the lunar orbit characteristics identifying the position of the Moon in space and time with respect to the position of the Earth further include identifying a distance of the Moon from the Earth.

113. The computer-implemented method of clause 109, wherein the lunar orbit characteristics identifying the position of the Moon in space and time with respect to the position of the Earth further include identifying a distance of the Moon from lunar perigee wherein the lunar perigee is a point in the lunar orbit where the Moon is positioned nearest to the Earth.

114. The computer-implemented method of clause 109, wherein the lunar orbit characteristics identifying the position of the Moon in space and time with respect to the position of the Earth further include identifying a distance of the Moon from lunar apogee wherein the lunar apogee is a point in the lunar orbit where the Moon is positioned farthest from the Earth.

115. The computer-implemented method of clause 109, wherein a first sinusoidal wave from the at least two overlapping sinusoidal waves repeats at least every 6.2 years in the 18.6 years lunar nodal cycle starting at a peak position corresponding lunar apogee, troughing at 3.1 years from the start date at a trough position corresponding to lunar perigee and ending at 3.1 years from the date corresponding to the trough position at a peak position corresponding to the lunar apogee.

116. The computer-implemented method of clause 115, wherein a second sinusoidal wave from the at least two overlapping sinusoidal waves repeats at least every 6.2 years in the 18.6 years lunar nodal cycle starting at a trough position corresponding lunar perigee, peaking at 3.1 years from the start date at a peak position corresponding to lunar apogee and ending at 3.1 years from the date corresponding to the peak position at a trough position corresponding to the lunar perigee.

117. The computer-implemented method of clause 116, wherein the first sinusoidal wave and the second sinusoidal wave, intersect each other, at a first intersection, at 1.55 years from the start of the first sinusoidal wave and the second sinusoidal wave.

118. The computer-implemented method of clause 117, wherein the intersection of the first sinusoidal wave and the second sinusoidal wave is repeated at every 3.55 years from the first intersection of the first sinusoidal wave and the second sinusoidal wave.

119. The computer-implemented method of clause 118, further including determining the value of a funnel shape indicator in dependence upon at least a starting date of the predefined time interval by:

setting the value of the funnel shape indicator as an opened-shaped funnel when the starting date of the predefined time interval is after a date corresponding to a particular intersection of the two sinusoidal waves and the starting date of the predefined time interval is before a date corresponding to the peak or the trough of the first sinusoidal wave following the particular intersection of the two sinusoidal waves; and setting the value of the funnel shape indicator as a closed-shaped funnel when the starting date of the predefined time interval is before the particular intersection of the two sinusoidal waves and the starting date of the predefined time interval is after a date corresponding to the peak or the trough of the first sinusoidal wave preceding the particular intersection of the two sinusoidal waves.

120. A system including one or more processors coupled to memory, the memory loaded with computer instructions to predicting an extreme climate event, the instructions, when executed on the processors, implement actions comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag and a value of a funnel shape indicator determined by a formation of at least two overlapping sinusoidal waves that are out of phase by 180 degrees, wherein the sinusoidal waves are generated using a plurality of lunar orbit characteristics identifying a position of the Moon in space and time with respect to the position of the Earth at occurrences of a plurality of solar eclipses and a plurality of lunar eclipses in respective plurality of eclipse seasons and wherein the trained machine learning model is trained using a plurality of time series data, a particular time series data in the plurality of time series data comprises (1) a plurality of timestamps corresponding to respective plurality of solar eclipses and a plurality of timestamps corresponding to respective plurality of lunar eclipses in an eighteen-year (18 years) Saros Cycle, (2) a plurality of timestamps corresponding to the plurality of partitions segmenting respective plurality of calendar years in the eighteen-year (18 years) Saros Cycle (3) a plurality of values of respective funnel shape indicators and corresponding timestamps (4) a plurality of values indicating an occurrence of an extreme climate event;

predicting, using the trained machine learning model, a probability of occurrence of the extreme climate event in a predefined time interval in the particular calendar year;

and invoking a weather prediction system, when a value of the probability of occurrence of the extreme climate event in the predefined time interval is above a predefined threshold, to regenerate forecast for the predefined time interval in dependence on the value of the probability of occurrence of the extreme climate event.

121. The system of clause 120, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

122. The system of clause 120, wherein the lunar orbit characteristics identifying the position of the Moon in space and time with respect to the position of the Earth further include identifying the Moon as at least one of a New Moon and a Full Moon.

123. The system of clause 120, wherein the lunar orbit characteristics identifying the position of the Moon in space and time with respect to the position of the Earth further include identifying a distance of the Moon from the Earth.

124. The system of clause 120, wherein the lunar orbit characteristics identifying the position of the Moon in space and time with respect to the position of the Earth further include identifying a distance of the Moon from lunar perigee wherein the lunar perigee is a point in the lunar orbit where the Moon is positioned nearest to the Earth.

125. The system of clause 120, wherein the lunar orbit characteristics identifying the position of the Moon in space and time with respect to the position of the Earth further include identifying a distance of the Moon from lunar apogee wherein the lunar apogee is a point in the lunar orbit where the Moon is positioned farthest from the Earth.

126. The system of clause 120, wherein a first sinusoidal wave from the at least two overlapping sinusoidal waves repeats at least every 6.2 years in the 18.6 years lunar nodal cycle starting at a peak position corresponding lunar apogee, troughing at 3.1 years from the start date at a trough position corresponding to lunar perigee and ending at 3.1 years from the date corresponding to the trough position at a peak position corresponding to the lunar apogee.

127. The system of clause 126, wherein a second sinusoidal wave from the at least two overlapping sinusoidal waves repeats at least every 6.2 years in the 18.6 years lunar nodal cycle starting at a trough position corresponding lunar perigee, peaking at 3.1 years from the start date at a peak position corresponding to lunar apogee and ending at 3.1 years from the date corresponding to the peak position at a trough position corresponding to the lunar perigee.

128. The system of clause 127, wherein the first sinusoidal wave and the second sinusoidal wave, intersect each other, at a first intersection, at 1.55 years from the start of the first sinusoidal wave and the second sinusoidal wave.

129. The system of clause 128, wherein the intersection of the first sinusoidal wave and the second sinusoidal wave is repeated at every 3.55 years from the first intersection of the first sinusoidal wave and the second sinusoidal wave.

130. The system of clause 129, further implementing actions comprising, determining the value of a funnel shape indicator in dependence upon at least a starting date of the predefined time interval by:

setting the value of the funnel shape indicator as an opened-shaped funnel when the starting date of the predefined time interval is after a date corresponding to a particular intersection of the two sinusoidal waves and the starting date of the predefined time interval is before a date corresponding to the peak or the trough of the first sinusoidal wave following the particular intersection of the two sinusoidal waves; and setting the value of the funnel shape indicator as a closed-shaped funnel when the starting date of the predefined time interval is before the particular intersection of the two sinusoidal waves and the starting date of the predefined time interval is after a date corresponding to the peak or the trough of the first sinusoidal wave preceding the particular intersection of the two sinusoidal waves.

131. A non-transitory computer readable storage medium impressed with computer program instructions to predict an extreme climate event, the instructions, when executed on a processor, implement a method, of a server node, comprising:

setting, by a processor, a value of a first Boolean flag when at least one of an eclipse season start date and an eclipse season end date in a particular calendar year occurs in a period of thirty days preceding a timestamp for a particular partition in a plurality of partitions segmenting the particular calendar year, wherein the eclipse season comprises at least one lunar eclipse and at least one solar eclipse within a predefined eclipse season duration starting from the eclipse season start date and ending at the eclipse season end date;

inputting to a trained machine learning model the first Boolean flag and a value of a funnel shape indicator determined by a formation of at least two overlapping sinusoidal waves that are out of phase by 180 degrees, wherein the sinusoidal waves are generated using a plurality of lunar orbit characteristics identifying a position of the Moon in space and time with respect to the position of the Earth at occurrences of a plurality of solar eclipses and a plurality of lunar eclipses in respective plurality of eclipse seasons and wherein the trained machine learning model is trained using a plurality of time series data, a particular time series data in the plurality of time series data comprises (1) a plurality of timestamps corresponding to respective plurality of solar eclipses and a plurality of timestamps corresponding to respective plurality of lunar eclipses in an eighteen-year (18 years) Saros Cycle, (2) a plurality of timestamps corresponding to the plurality of partitions segmenting respective plurality of calendar years in the eighteen-year (18 years) Saros Cycle (3) a plurality of values of respective funnel shape indicators and corresponding timestamps (4) a plurality of values indicating an occurrence of an extreme climate event;

predicting, using the trained machine learning model, a probability of occurrence of the extreme climate event in a predefined time interval in the particular calendar year; and invoking a weather prediction system, when a value of the probability of occurrence of the extreme climate event in the predefined time interval is above a predefined threshold, to regenerate forecast for the predefined time interval in dependence on the value of the probability of occurrence of the extreme climate event.

132. The non-transitory computer readable storage medium of clause 131, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

133. The non-transitory computer readable storage medium of clause 131, wherein the lunar orbit characteristics identifying the position of the Moon in space and time with respect to the position of the Earth further include identifying the Moon as at least one of a New Moon and a Full Moon.

134. The non-transitory computer readable storage medium of clause 131, wherein the lunar orbit characteristics identifying the position of the Moon in space and time with respect to the position of the Earth further include identifying a distance of the Moon from the Earth.

135. The non-transitory computer readable storage medium of clause 131, wherein the lunar orbit characteristics identifying the position of the Moon in space and time with respect to the position of the Earth further include identifying a distance of the Moon from lunar perigee wherein the lunar perigee is a point in the lunar orbit where the Moon is positioned nearest to the Earth.

136. The non-transitory computer readable storage medium of clause 131, wherein the lunar orbit characteristics identifying the position of the Moon in space and time with respect to the position of the Earth further include identifying a distance of the Moon from lunar apogee wherein the lunar apogee is a point in the lunar orbit where the Moon is positioned farthest from the Earth.

137. The non-transitory computer readable storage medium of clause 131, wherein a first sinusoidal wave from the at least two overlapping sinusoidal waves repeats at least every 6.2 years in the 18.6 years lunar nodal cycle starting at a peak position corresponding lunar apogee, troughing at 3.1 years from the start date at a trough position corresponding to lunar perigee and ending at 3.1 years from the date corresponding to the trough position at a peak position corresponding to the lunar apogee.

138. The non-transitory computer readable storage medium of clause 137, wherein a second sinusoidal wave from the at least two overlapping sinusoidal waves repeats at least every 6.2 years in the 18.6 years lunar nodal cycle starting at a trough position corresponding lunar perigee, peaking at 3.1 years from the start date at a peak position corresponding to lunar apogee and ending at 3.1 years from the date corresponding to the peak position at a trough position corresponding to the lunar perigee.

139. The non-transitory computer readable storage medium of clause 138, wherein the first sinusoidal wave and the second sinusoidal wave, intersect each other, at a first intersection, at 1.55 years from the start of the first sinusoidal wave and the second sinusoidal wave.

140. The non-transitory computer readable storage medium of clause 139, wherein the intersection of the first sinusoidal wave and the second sinusoidal wave is repeated at every 3.55 years from the first intersection of the first sinusoidal wave and the second sinusoidal wave.

141. The non-transitory computer readable storage medium of clause 140, further including determining the value of a funnel shape indicator in dependence upon at least a starting date of the predefined time interval by:

setting the value of the funnel shape indicator as an opened-shaped funnel when the starting date of the predefined time interval is after a date corresponding to a particular intersection of the two sinusoidal waves and the starting date of the predefined time interval is before a date corresponding to the peak or the trough of the first sinusoidal wave following the particular intersection of the two sinusoidal waves; and setting the value of the funnel shape indicator as a closed-shaped funnel when the starting date of the predefined time interval is before the particular intersection of the two sinusoidal waves and the starting date of the predefined time interval is after a date corresponding to the peak or the trough of the first sinusoidal wave preceding the particular intersection of the two sinusoidal waves.

Fourth Set

142. A computer-implemented method of predicting an increase in sea surface temperature, the method including:

mapping timestamps of lunar and solar eclipses on at least one eighteen-year Saros Cycle indicating the time required for the Sun, the Earth and the Moon to align wherein each year in the at least one eighteen-year Saros Cycle has a particular lunar configuration that repeats in at least one corresponding year in a succeeding eighteen-year Saros Cycle and in a preceding eighteen-year Saros Cycle;

determining, for a particular year in the at least one eighteen-year Saros Cycle, a time interval between each solar eclipse in the particular year and each solstice in the particular year and selecting a shortest determined time interval as a first time interval and setting value for a first Boolean flag indicating whether the solar eclipse corresponding to the shortest determined time interval occurred before or after the corresponding solstice;

determining, for the particular year in the at least one eighteen-year Saros Cycle, a time interval between each lunar eclipse in the particular year and each solstice in the particular year and selecting a shortest determined time interval as a second time interval and setting value for a second Boolean flag indicating whether the lunar eclipse corresponding to the shortest determined time interval occurred before or after the corresponding solstice;

inputting to a trained machine learning model the first time interval, the first Boolean flag, the second time interval and the second Boolean flag, wherein the trained machine learning model is trained using a plurality of time series data, a particular time series data in the plurality of time series data comprises (i) a plurality of timestamps for solar eclipses and lunar eclipses in an eighteen-year Saros Cycle, (ii) a plurality of timestamps for equinoxes and solstices in the eighteen-year Saros Cycle and (iii) a plurality of average sea surface temperatures corresponding to each year in the eighteen-year Saros Cycle; and predicting a probability of increase in the average sea surface temperature in the particular year in the at least one eighteen-year Saros Cycle.

143. The computer-implemented method of clause 142, wherein the lunar configuration is at least one of:

a spatiotemporal lunar configuration identifies multiple factors that describe the Moon's orbit within the Earth-Moon-Sun system, which also includes other planets in the solar system. This dynamic system is characterized by the spatial and temporal interactions, as well as the orbital and gravitational forces, among all its components. Over time, these interactions cause orbital perturbations, leading to changes in the spatial arrangements of the planetary bodies as they continuously influence one another, an orbital lunar configuration identifies a series of phases of the Moon, a distance between the Moon and Earth for each phase of the Moon, a distance between the Moon and Earth in the Moon's elliptical orbit around Earth, occurrences of the Moon's elliptical orbit perigee and apogee, a position and orientation of the moon as it orbits around the Earth and Sun, an ecliptic lunar configuration identifies occurrences of eclipses relative to the Moon's orbit around Earth, an alignment of the Earth-Moon-Sun system, occurrences of eclipses relative to a distance between the Moon and Earth, occurrences of eclipses relative to the Moon's perigee and apogee, occurrences of eclipses relative to equinoxes and solstices, and a recurring ecliptic Saros Cycle of 6,585.321 days (18 years and 10-12 days), a precession lunar configuration identifies an orientation and location of lunar nodes relative to a vernal equinox, a precession of lunar nodes with a cycle of 18.6-years, an axial precession of the Moon with a cycle of 18.6-years, an apsidal precession of the Moon's elliptical orbit around Earth with a period of 8.85 years, a planetary precession of the Moon caused by the gravitational influence of other planets in the solar system, and changes in the Moon's obliquity (the tilt of its rotational axis relative to its orbital plane) resulting in lunar libration, a planar lunar configuration identifies a lunar declination and angular distance of the Moon north or south of the celestial equator that changes over time due to the tilt of the Moon's orbit relative to Earth's equator and follows an 18.6-year cycle, an angle of the Moon relative to Earth's equatorial plane, an angle of the Moon relative to an ecliptic and an ecliptic plane, an angle of the Moon relative to a magnetic equatorial plane of the Earth, an angle and orientation of a lunar orbital plane relative to an equatorial plane of the Earth, an angle and orientation of a lunar orbital plane relative to a magnetic equatorial plane of the Earth, an angle and orientation of an elliptical orbit within a lunar orbital plane and relative to an ecliptic plane, an angle and orientation of a plurality of planes including, an orbital plane of the Moon, an orbital plane of the Earth, an ecliptic plane, an equatorial plane of the Earth, and a magnetic equatorial plane of the Earth, a standstill lunar configuration identifies a series of lunar standstills, a monthly lunar standstill when the Moon reaches its maximum and minimum declinations within a single lunar month (a 27.3-day period known as the sidereal month), a major lunar standstill when the Moon's maximum declination reaches its greatest extremes, approximately ±28.6° north and south of the celestial equator, occurring every 18.6 years due to the precession of the lunar nodes, which gradually changes the tilt of the Moon's orbital plane relative to the celestial equator and during which the tilt aligns to its maximum inclination relative to the celestial equator, and a minor lunar standstill when the Moon's maximum declination is at its minimum range, approximately ±18.3° north and south of the celestial equator, which occurs approximately 9.3 years after a major standstill, as part of the same 18.6-year precessional cycle of the lunar nodes, a during which the tilt of the Moon's orbital plane aligns more closely with the Earth's equator.

144. The computer-implemented method of clause 142, wherein:

the determining, for the particular year in the at least one eighteen-year Saros Cycle, further includes determining a time interval between each solar eclipse in the particular year and each equinox in the particular year and selecting a shortest determined time interval as a third time interval and setting value for a third Boolean flag indicating whether the solar eclipse corresponding to the shortest determined time interval occurred before or after the corresponding equinox;

the determining, for the particular year in the at least one eighteen-year Saros Cycle, further includes determining a time interval between each lunar eclipse in the particular year and each equinox in the particular year and selecting a shortest determined time interval as a fourth time interval and setting value for a fourth Boolean flag indicating whether the lunar eclipse corresponding to the shortest determined time interval occurred before or after the corresponding equinox; and the inputting further includes providing as input to the trained machine learning model the third time interval, the third Boolean flag, the fourth time interval and the fourth Boolean flag.

145. The computer-implemented method of clause 142, further including:

determining, for the particular year in the at least one eighteen-year Saros Cycle, respective distances between the Moon and the Earth for each new-moon phase and each full-moon phase in the particular year; and the inputting further includes providing, as input to the trained machine learning model, the determined respective distances between the Moon and the Earth for each new-moon phase and each full-moon phase in the particular year and respective timestamps for each new-moon phase and each full-moon phase.

146. The computer-implemented method of clause 142, further including:

determining, for the particular year in the at least one eighteen-year Saros Cycle, respective distances between the Moon and the Earth for each lunar perigee and each lunar apogee wherein the lunar apogee is a point in the lunar orbit where the Moon is positioned farthest from the Earth and the lunar perigee is a point in the lunar orbit where the Moon is positioned nearest to the Earth; and the inputting further includes providing, as input to the trained machine learning model, the determined respective distances between the Moon and the Earth for each lunar perigee and each lunar apogee in the particular year and respective timestamps for lunar perigee and each lunar apogee in the particular year.

147. The computer-implemented method of clause 142, further including:

determining, for the particular year in the at least one eighteen-year Saros Cycle, time intervals between a plurality of lunar perigees in the particular year and new-moon phases wherein a particular time interval is determined by comparing the timestamp of a particular lunar perigee in the plurality of lunar perigees and a new-moon phase that occurs closest to the particular lunar perigee;

setting values of a plurality of fifth Boolean flags corresponding to the time intervals wherein a value of a particular fifth Boolean flag in the plurality of fifth Boolean flags identifies whether the particular lunar perigee occurred before the new-moon phase or after the new-moon phase; and the inputting further includes providing, as input to the trained machine learning model, the determined time intervals and respective plurality of fifth Boolean flags.

148. The computer-implemented method of clause 142, further including:

determining, for the particular year in the at least one eighteen-year Saros Cycle, time intervals between a plurality of lunar apogees in the particular year and new-moon phases wherein a particular time interval is determined by comparing the timestamp of a particular lunar apogee in the plurality of lunar apogees and a new-moon phase that occurs closest to the particular lunar apogee;

setting values of a plurality of sixth Boolean flags corresponding to the time intervals wherein a value of a particular sixth Boolean flag in the plurality of sixth Boolean flags identifies whether the particular lunar apogee occurred before the new-moon phase or after the new-moon phase; and the inputting further includes providing, as input to the trained machine learning model, the determined time intervals and respective plurality of sixth Boolean flags.

149. The computer-implemented method of clause 142, further including:

determining, for the particular year in the at least one eighteen-year Saros Cycle, time intervals between a plurality of lunar perigees in the particular year and full-moon phases wherein a particular time interval is determined by comparing the timestamp of a particular lunar perigee in the plurality of lunar perigees and a full-moon phase that occurs closest to the particular lunar perigee;

setting values of a plurality of seventh Boolean flags corresponding to the time intervals wherein a value of a particular seventh Boolean flag in the plurality of seventh Boolean flags identifies whether the particular lunar perigee occurred before the full-moon phase or after the full-moon phase; and the inputting further includes providing, as input to the trained machine learning model, the determined time intervals and respective plurality of seventh Boolean flags.

150. The computer-implemented method of clause 142, further including:

determining, for the particular year in the at least one eighteen-year Saros Cycle, time intervals between a plurality of lunar apogees in the particular year and full-moon phases wherein a particular time interval is determined by comparing the timestamp of a particular lunar apogee in the plurality of lunar apogees and a full-moon phase that occurs closest to the particular lunar apogee;

setting values of a plurality of eighth Boolean flags corresponding to the time intervals wherein a value of a particular eighth Boolean flag in the plurality of eighth Boolean flags identifies whether the particular lunar apogee occurred before the full-moon phase or after the full-moon phase; and the inputting further includes providing, as input to the trained machine learning model, the determined time intervals and respective plurality of eighth Boolean flags.

151. The computer-implemented method of clause 142, further including:

determining, for the particular year in the at least one eighteen-year Saros Cycle, a plurality of distances between the Moon and the Earth corresponding to occurrence of plurality of lunar eclipses in the particular year; and the inputting further includes providing, as input to the trained machine learning model, the determined plurality of distances between the Moon and the Earth.

152. The computer-implemented method of clause 142, further including:

determining, for the particular year in the at least one eighteen-year Saros Cycle, a plurality of distances between the Moon and the Earth corresponding to occurrence of plurality of solar eclipses in the particular year; and the inputting further includes providing, as input to the trained machine learning model, the determined plurality of distances between the Moon and the Earth.

153. The computer-implemented method of clause 142, further including:

assigning an identifier to each year in the eighteen-year Saros Cycle wherein the identifier identifies an year with a particular lunar configuration in a plurality of eighteen-year Saros Cycles.

Fifth Set

154. A computer-implemented method of predicting a decrease in sea surface temperature, the method including:

mapping timestamps of lunar and solar eclipses on at least one eighteen-year Saros Cycle indicating the time required for the Sun, the Earth and the Moon to align wherein each year in the at least one eighteen-year Saros Cycle has a particular lunar configuration that repeats in at least one corresponding year in a succeeding eighteen-year Saros Cycle and in a preceding eighteen-year Saros Cycle;

determining, for a particular year in the at least one eighteen-year Saros Cycle, a time interval between each solar eclipse in the particular year and each solstice in the particular year and selecting a shortest determined time interval as a first time interval and setting value for a first Boolean flag indicating whether the solar eclipse corresponding to the shortest determined time interval occurred before or after the corresponding solstice;

determining, for the particular year in the at least one eighteen-year Saros Cycle, a time interval between each lunar eclipse in the particular year and each solstice in the particular year and selecting a shortest determined time interval as a second time interval and setting value for a second Boolean flag indicating whether the lunar eclipse corresponding to the shortest determined time interval occurred before or after the corresponding solstice;

inputting to a trained machine learning model the first time interval, the first Boolean flag, the second time interval and the second Boolean flag, wherein the trained machine learning model is trained using a plurality of time series data, a particular time series data in the plurality of time series data comprises (i) a plurality of timestamps for solar eclipses and lunar eclipses in an eighteen-year Saros Cycle, (ii) a plurality of timestamps for equinoxes and solstices in the eighteen-year Saros Cycle and (iii) a plurality of average sea surface temperatures corresponding to each year in the eighteen-year Saros Cycle; and predicting a probability of decrease in the average sea surface temperature in the particular year in the at least one eighteen-year Saros Cycle.

155. The computer-implemented method of clause 154, wherein the lunar configuration is at least one of:

a spatiotemporal lunar configuration identifies multiple factors that describe the Moon's orbit within the Earth-Moon-Sun system, which also includes other planets in the solar system. This dynamic system is characterized by the spatial and temporal interactions, as well as the orbital and gravitational forces, among all its components. Over time, these interactions cause orbital perturbations, leading to changes in the spatial arrangements of the planetary bodies as they continuously influence one another, an orbital lunar configuration identifies a series of phases of the Moon, a distance between the Moon and Earth for each phase of the Moon, a distance between the Moon and Earth in the Moon's elliptical orbit around Earth, occurrences of the Moon's elliptical orbit perigee and apogee, a position and orientation of the moon as it orbits around the Earth and Sun, an ecliptic lunar configuration identifies occurrences of eclipses relative to the Moon's orbit around Earth, an alignment of the Earth-Moon-Sun system, occurrences of eclipses relative to a distance between the Moon and Earth, occurrences of eclipses relative to the Moon's perigee and apogee, occurrences of eclipses relative to equinoxes and solstices, and a recurring ecliptic Saros Cycle of 6,585.321 days (18 years and 10-12 days), a precession lunar configuration identifies an orientation and location of lunar nodes relative to a vernal equinox, a precession of lunar nodes with a cycle of 18.6-years, an axial precession of the Moon with a cycle of 18.6-years, an apsidal precession of the Moon's elliptical orbit around Earth with a period of 8.85 years, a planetary precession of the Moon caused by the gravitational influence of other planets in the solar system, and changes in the Moon's obliquity (the tilt of its rotational axis relative to its orbital plane) resulting in lunar libration, a planar lunar configuration identifies a lunar declination and angular distance of the Moon north or south of the celestial equator that changes over time due to the tilt of the Moon's orbit relative to Earth's equator and follows an 18.6-year cycle, an angle of the Moon relative to Earth's equatorial plane, an angle of the Moon relative to an ecliptic and an ecliptic plane, an angle of the Moon relative to a magnetic equatorial plane of the Earth, an angle and orientation of a lunar orbital plane relative to an equatorial plane of the Earth, an angle and orientation of a lunar orbital plane relative to a magnetic equatorial plane of the Earth, an angle and orientation of an elliptical orbit within a lunar orbital plane and relative to an ecliptic plane, an angle and orientation of a plurality of planes including, an orbital plane of the Moon, an orbital plane of the Earth, an ecliptic plane, an equatorial plane of the Earth, and a magnetic equatorial plane of the Earth, a standstill lunar configuration identifies a series of lunar standstills, a monthly lunar standstill when the Moon reaches its maximum and minimum declinations within a single lunar month (a 27.3-day period known as the sidereal month), a major lunar standstill when the Moon's maximum declination reaches its greatest extremes, approximately ±28.6° north and south of the celestial equator, occurring every 18.6 years due to the precession of the lunar nodes, which gradually changes the tilt of the Moon's orbital plane relative to the celestial equator and during which the tilt aligns to its maximum inclination relative to the celestial equator, and a minor lunar standstill when the Moon's maximum declination is at its minimum range, approximately ±18.3° north and south of the celestial equator, which occurs approximately 9.3 years after a major standstill, as part of the same 18.6-year precessional cycle of the lunar nodes, a during which the tilt of the Moon's orbital plane aligns more closely with the Earth's equator.

156. The computer-implemented method of clause 154, wherein:

the determining, for the particular year in the at least one eighteen-year Saros Cycle, further includes determining a time interval between each solar eclipse in the particular year and each equinox in the particular year and selecting a shortest determined time interval as a third time interval and setting value for a third Boolean flag indicating whether the solar eclipse corresponding to the shortest determined time interval occurred before or after the corresponding equinox;

the determining, for the particular year in the at least one eighteen-year Saros Cycle, further includes determining a time interval between each lunar eclipse in the particular year and each equinox in the particular year and selecting a shortest determined time interval as a fourth time interval and setting value for a fourth Boolean flag indicating whether the lunar eclipse corresponding to the shortest determined time interval occurred before or after the corresponding equinox; and the inputting further includes providing as input to the trained machine learning model the third time interval, the third Boolean flag, the fourth time interval and the fourth Boolean flag.

157. The computer-implemented method of clause 154, further including:

determining, for the particular year in the at least one eighteen-year Saros Cycle, respective distances between the Moon and the Earth for each new-moon phase and each full-moon phase in the particular year; and the inputting further includes providing, as input to the trained machine learning model, the determined respective distances between the Moon and the Earth for each new-moon phase and each full-moon phase in the particular year and respective timestamps for each new-moon phase and each full-moon phase.

158. The computer-implemented method of clause 154, further including:

determining, for the particular year in the at least one eighteen-year Saros Cycle, respective distances between the Moon and the Earth for each lunar perigee and each lunar apogee wherein the lunar apogee is a point in the lunar orbit where the Moon is positioned farthest from the Earth and the lunar perigee is a point in the lunar orbit where the Moon is positioned nearest to the Earth; and the inputting further includes providing, as input to the trained machine learning model, the determined respective distances between the Moon and the Earth for each lunar perigee and each lunar apogee in the particular year and respective timestamps for lunar perigee and each lunar apogee in the particular year.

159. The computer-implemented method of clause 154, further including:

determining, for the particular year in the at least one eighteen-year Saros Cycle, time intervals between a plurality of lunar perigees in the particular year and new-moon phases wherein a particular time interval is determined by comparing the timestamp of a particular lunar perigee in the plurality of lunar perigees and a new-moon phase that occurs closest to the particular lunar perigee;

setting values of a plurality of fifth Boolean flags corresponding to the time intervals wherein a value of a particular fifth Boolean flag in the plurality of fifth Boolean flags identifies whether the particular lunar perigee occurred before the new-moon phase or after the new-moon phase; and the inputting further includes providing, as input to the trained machine learning model, the determined time intervals and respective plurality of fifth Boolean flags.

160. The computer-implemented method of clause 154, further including:

determining, for the particular year in the at least one eighteen-year Saros Cycle, time intervals between a plurality of lunar apogees in the particular year and new-moon phases wherein a particular time interval is determined by comparing the timestamp of a particular lunar apogee in the plurality of lunar apogees and a new-moon phase that occurs closest to the particular lunar apogee;

setting values of a plurality of sixth Boolean flags corresponding to the time intervals wherein a value of a particular sixth Boolean flag in the plurality of sixth Boolean flags identifies whether the particular lunar apogee occurred before the new-moon phase or after the new-moon phase; and the inputting further includes providing, as input to the trained machine learning model, the determined time intervals and respective plurality of sixth Boolean flags.

161. The computer-implemented method of clause 154, further including:

determining, for the particular year in the at least one eighteen-year Saros Cycle, time intervals between a plurality of lunar perigees in the particular year and full-moon phases wherein a particular time interval is determined by comparing the timestamp of a particular lunar perigee in the plurality of lunar perigees and a full-moon phase that occurs closest to the particular lunar perigee;

setting values of a plurality of seventh Boolean flags corresponding to the time intervals wherein a value of a particular seventh Boolean flag in the plurality of seventh Boolean flags identifies whether the particular lunar perigee occurred before the full-moon phase or after the full-moon phase; and the inputting further includes providing, as input to the trained machine learning model, the determined time intervals and respective plurality of seventh Boolean flags.

162. The computer-implemented method of clause 154, further including:

determining, for the particular year in the at least one eighteen-year Saros Cycle, time intervals between a plurality of lunar apogees in the particular year and full-moon phases wherein a particular time interval is determined by comparing the timestamp of a particular lunar apogee in the plurality of lunar apogees and a full-moon phase that occurs closest to the particular lunar apogee;

setting values of a plurality of eighth Boolean flags corresponding to the time intervals wherein a value of a particular eighth Boolean flag in the plurality of eighth Boolean flags identifies whether the particular lunar apogee occurred before the full-moon phase or after the full-moon phase; and the inputting further includes providing, as input to the trained machine learning model, the determined time intervals and respective plurality of eighth Boolean flags.

163. The computer-implemented method of clause 154, further including:

determining, for the particular year in the at least one eighteen-year Saros Cycle, a plurality of distances between the Moon and the Earth corresponding to occurrence of plurality of lunar eclipses in the particular year; and the inputting further includes providing, as input to the trained machine learning model, the determined plurality of distances between the Moon and the Earth.

164. The computer-implemented method of clause 154, further including:

determining, for the particular year in the at least one eighteen-year Saros Cycle, a plurality of distances between the Moon and the Earth corresponding to occurrence of plurality of solar eclipses in the particular year; and the inputting further includes providing, as input to the trained machine learning model, the determined plurality of distances between the Moon and the Earth.

165. The computer-implemented method of clause 154, further including:

assigning an identifier to each year in the eighteen-year Saros Cycle wherein the identifier identifies an year with a particular lunar configuration in a plurality of eighteen-year Saros Cycles.

Computer System

Figure 19:
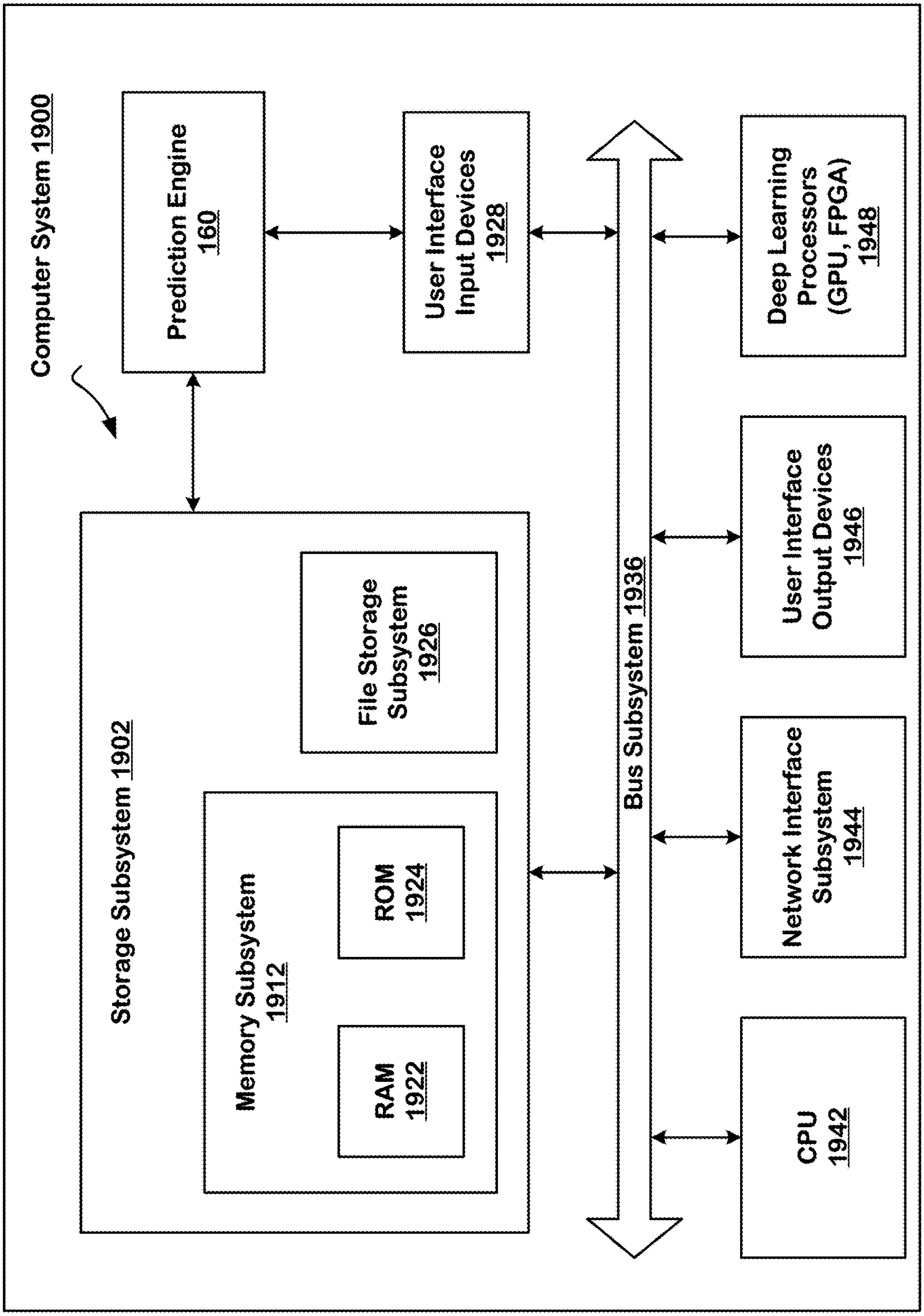
FIG. 19 presents an example computer system that can be used to implement the technology disclosed to predict fluctuations in sea surface temperature and to predict probability of occurrence of extreme climate events.

FIG. 19 shows an example computer system 1900 that can be used to implement the technology disclosed. Computer system 1900 includes at least one central processing unit (CPU) 1942 that communicates with a number of peripheral devices via bus subsystem 1926. These peripheral devices can include a storage subsystem 1902 including, for example, memory devices and a file storage subsystem 1926, user interface input devices 1928, user interface output devices 1946, and a network interface subsystem 1944. The input and output devices allow user interaction with computer system 1900. Network interface subsystem 1944 provides an interface to outside networks, including an interface to corresponding interface devices in other computer systems.

In one implementation, the disclosed AI system(s) including the prediction engine 160 are communicably linked to the storage subsystem 1902 and the user interface input devices 1928.

User interface input devices 1928 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1900.

User interface output devices 1946 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1900 to the user or to another machine or computer system.

Storage subsystem 1902 stores programming and data constructs that provide the functionality of some or all of the modules and methods described herein. These software modules are generally executed by processors 1948.

Processors 1948 can be graphics processing units (GPUs), field-programmable gate arrays (FPGAs), application-specific integrated circuits (ASICs), and/or coarse-grained reconfigurable architectures (CGRAs). Processors 1948 can be hosted by a deep learning cloud platform such as Google Cloud Platform™, Xilinx™, and Cirrascale™ Examples of processors 1948 include Google's Tensor Processing Unit (TPU)™, rackmount solutions like GX4 Rackmount Series™, GX13 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™ NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1912 used in the storage subsystem 1902 can include a number of memories including a main random access memory (RAM) 1922 for storage of instructions and data during program execution and a read only memory (ROM) 1924 in which fixed instructions are stored. A file storage subsystem 1926 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1926 in the storage subsystem 1902, or in other machines accessible by the processor.

Bus subsystem 1936 provides a mechanism for letting the various components and subsystems of computer system 1900 communicate with each other as intended. Although bus subsystem 1936 is shown schematically as a single bus, alternative implementations of the bus subsystem can use multiple busses.

Computer system 1900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1900 depicted in FIG. 19 is intended only as a specific example for purposes of illustrating the preferred implementations of the present technology disclosed. Many other configurations of computer system 1900 are possible having more or less components than the computer system depicted in FIG. 19.

In various implementations, a learning system is provided. In some implementations, a feature vector is provided to a learning system. Based on the input features, the learning system generates one or more outputs. In some implementations, the output of the learning system is a feature vector. In some implementations, the learning system comprises an SVM. In other implementations, the learning system comprises an artificial neural network. In some implementations, the learning system is pre-trained using training data. In some implementations training data is retrospective data. In some implementations, the retrospective data is stored in a data store. In some implementations, the learning system may be additionally trained through manual curation of previously generated outputs.

In some implementations, an object detection pipeline is a trained classifier. In some implementations, the trained classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

FIG. 19 is a schematic of an exemplary computing node. Computing node 1900 is only one example of a suitable computing node and is not intended to suggest any limitation as to the scope of use or functionality of embodiments described herein. Regardless, computing node 1900 is capable of being implemented and/or performing any of the functionality set forth hereinabove.

In the Computing node 1900 there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, mobile computing devices including mobile phones, multiprocessor systems, microprocessor-based systems, set top boxes, programmable consumer electronics, network PCs, minicomputer systems, mainframe computer systems, and distributed computing environments that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed computing environments where tasks are performed by remote processing devices that are linked through a communications network. In a distributed computing environment, program modules may be located in both local and remote computer system storage media including memory storage devices.

As shown in FIG. 19, computer system/server in computing node 1900 is shown in the form of a general-purpose computing device. The components of computer system/server may include, but are not limited to, one or more processors or processing units, a system memory, and a bus that couples various system components including system memory to processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server typically includes a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. Algorithm Computer system/server may further include other removable/non-removable, volatile/non-volatile computer system storage media. By way of example only, storage system can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, memory may include at least one program product having a set (e.g., at least one) of program modules that are configured to carry out the functions of embodiments of the disclosure.

Program/utility, having a set (at least one) of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments as described herein.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope and spirit as set forth. Therefore, many modifications may be made to adapt a particular situation or material to the essential scope and spirit.

What is claimed is:

1. A computer-implemented method of predicting a decrease in average sea surface temperature, the method including:

setting, by a processor, a value of a first Boolean flag to true when at least one of an eclipse season start date and an eclipse season end date in a particular calendar year occurs in a first predefined number of days preceding a timestamp for a particular partition in a plurality of partitions segmenting the particular calendar year;

training a machine learning model, wherein the training comprises comparing an output of the machine learning model with ground truth labels;

predicting, using the trained machine learning model, a probability of decrease in average sea surface temperature relative to a historical average sea surface temperature for a predefined time interval in the particular calendar year, wherein the predicting is based at least in part on inputting, to the trained machine learning model, the value of the first Boolean flag; and invoking an external system to predict occurrence of an extreme climate event in the predefined time interval when the probability of decrease in average sea surface temperature is above a first predefined threshold.

2. The method of claim 1, wherein the eclipse season comprises at least one lunar eclipse and at least one solar eclipse within a predefined eclipse season duration starting from the eclipse season start date and ending at the eclipse season end date.

3. The computer-implemented method of claim 2, further including:

determining, a first time interval, between occurrence of the at least one lunar eclipse in the eclipse season and the timestamp for the particular partition and a second time interval, between occurrence of the at least one solar eclipse in the eclipse season and the timestamp for the particular partition;

selecting from amongst the first time interval and the second time interval, at least one time interval as a first selected time interval that is shorter in duration than the other time interval; and the inputting, further includes providing the first selected time interval as input to the trained machine learning model.

4. The computer-implemented method of claim 3, further including:

determining, a third time interval, between occurrence of the at least one lunar eclipse in the eclipse season and the timestamp for the particular partition and a fourth time interval, between occurrence of the at least one solar eclipse in the eclipse season and the timestamp for the particular partition;

selecting from amongst the third time interval and the fourth time interval, at least one time interval as a second selected time interval that is shorter in duration than the other time interval; and the inputting, further includes providing the second selected time interval as input to the trained machine learning model.

5. The computer-implemented method of claim 2, further including:

determining, for the particular calendar year, a plurality of distances between the Moon and the Earth corresponding to occurrence of plurality of the at least one lunar eclipse and the at least one solar eclipse within the predefined eclipse season in the particular calendar year; and the inputting further includes providing, as input to the trained machine learning model, the determined plurality of distances between the Moon and the Earth.

6. The method of claim 1, wherein the trained machine learning model is trained using a plurality of time series data, a particular time series data in the plurality of time series data comprises (i) a plurality of timestamps corresponding to respective plurality of solar eclipses and a plurality of timestamps corresponding to respective plurality of lunar eclipses in an eighteen-year Saros Cycle, (ii) a plurality of timestamps corresponding to the plurality of partitions segmenting respective plurality of calendar years in the eighteen-year Saros Cycle and (iii) a plurality of average sea surface temperatures corresponding to the plurality of calendar years in the eighteen-year Saros Cycle.

7. The computer-implemented method of claim 6, further including:

inputting a plurality of predicted probability of decrease in the average sea surface temperature as predicted by the trained machine learning model corresponding to a plurality of calendar years in the eighteen-year Saros Cycle to a second trained machine learning model;

wherein the second trained machine learning model is trained using the plurality of time series data to predict a probability of occurrence of an extreme climate event when the plurality of predicted probability of decrease in the average sea surface temperature as predicted by the trained machine learning model corresponding to the plurality of calendar years are above a second predefined threshold; and predicting, using the second trained machine learning model, the probability of occurrence of the extreme climate event following the plurality of calendar years in the eighteen-year Saros Cycle.

8. The computer-implemented method of claim 7, wherein the predicting the probability of occurrence of the extreme climate event is performed for the predefined time interval following the plurality of calendar years in the eighteen-year Saros Cycle.

9. The computer-implemented method of claim 1, wherein the setting of the value of the first Boolean flag is performed when at least one of the eclipse season start date and the eclipse season end date in the particular calendar year occurs in a second predefined number of days preceding the timestamp for the particular partition in the plurality of partitions segmenting the particular calendar year.

10. The computer-implemented method of claim 9, wherein the trained machine learning model is trained to assign at least a double weightage to the value of the first Boolean flag for the predicting of the probability of decrease in the average sea surface temperature when a difference between the eclipse season start date and the timestamp for the particular partition in the plurality of partitions is less than a third predefined number of days.

11. The computer-implemented method of claim 10, further including:

setting a value of a second Boolean flag when at least one of the eclipse season start date and the eclipse season end date in the particular calendar year occurs in the first predefined number of days succeeding a timestamp for the particular partition in the plurality of partitions segmenting the particular calendar year; and the inputting to the trained machine learning model further includes, inputting the second Boolean flag.

12. The computer-implemented method of claim 11, wherein the setting the value of the second Boolean flag is performed when the at least one of the eclipse season start date and the eclipse season end date in the particular calendar year occurs in the second predefined number of days succeeding the timestamp for the particular partition in the plurality of partitions segmenting the particular calendar year.

13. The method of claim 12, wherein the first predefined number of days range between twenty five and thirty four, the second predefined number of days range between thirty five and forty five and the third predefined number of days are less than ten.

14. The computer-implemented method of claim 1, wherein a duration of the predefined time interval ranges from one minute to one year.

15. The computer-implemented method of claim 1, wherein the plurality of partitions segmenting the particular calendar year include at least a March equinox, a June solstice, a September equinox and a December solstice.

16. The computer-implemented method of claim 1, further including:

determining, for the particular calendar year, respective distances between the Moon and the Earth for each new-moon phase and each full-moon phase; and the inputting further includes providing, as input to the trained machine learning model, the determined respective distances between the Moon and the Earth for each new-moon phase and each full-moon phase in the particular calendar year and respective timestamps for each new-moon phase and each full-moon phase.

17. The computer-implemented method of claim 1, wherein the extreme climate event is at least one of an El Nino event indicating above average temperatures in Niño 3.4 region of equatorial Pacific Ocean and a La Nina event indicating below average temperatures in Niño 3.4 region of equatorial Pacific Ocean.

18. The computer-implemented method of claim 1, wherein the extreme climate event indicates occurrence of an interaction across a lower atmosphere of the Earth and an upper atmosphere of the Earth causing an extreme weather event.

19. A system including one or more processors coupled to memory, the memory loaded with computer instructions to predict a decrease in average sea surface temperature, the instructions, when executed on the processors, implement actions comprising:

setting, by a processor, a value of a first Boolean flag to true when at least one of an eclipse season start date and an eclipse season end date in a particular calendar year occurs in a first predefined number of days preceding a timestamp for a particular partition in a plurality of partitions segmenting the particular calendar year;

training a machine learning model, wherein the training comprises comparing an output of the machine learning model with ground truth labels;

predicting, using the trained machine learning model, a probability of decrease in average sea surface temperature relative to a historical average sea surface temperature for a predefined time interval in the particular calendar year wherein the predicting is based at least in part on inputting, to the trained machine learning model, the value of the first Boolean flag; and invoking an external system to predict occurrence of an extreme climate event in the predefined time interval when the probability of decrease in average sea surface temperature is above a first predefined threshold.

20. A non-transitory computer readable storage medium impressed with computer program instructions to predict a decrease in average sea surface temperature, the instructions, when executed on a processor, implement a method, comprising:

setting, by the processor, a value of a first Boolean flag to true when at least one of an eclipse season start date and an eclipse season end date in a particular calendar year occurs in a first predefined number of days preceding a timestamp for a particular partition in a plurality of partitions segmenting the particular calendar year;

training a machine learning model, wherein the training comprises comparing an output of the machine learning model with ground truth labels;

predicting, using the trained machine learning model, a probability of decrease in average sea surface temperature relative to a historical average sea surface temperature for a predefined time interval in the particular calendar year, wherein the predicting is based at least in part on inputting, to the trained machine learning model, the value of the first Boolean flag; and invoking an external system to predict occurrence of an extreme climate event in the predefined time interval when the probability of decrease in average sea surface temperature is above a first predefined threshold.

* * * * *